(12) United States Patent
Fujie et al.

(10) Patent No.: US 9,023,138 B2
(45) Date of Patent: *May 5, 2015

(54) COMPOUND HAVING XANTHENE SKELETON, COLORING COMPOSITION, INK FOR INK JET RECORDING AND INK JET RECORDING METHOD

(71) Applicant: FUJIFILM Corporation, Tokyo (JP)

(72) Inventors: Yoshihiko Fujie, Kanagawa (JP); Clive Edwin Foster, Blackley (GB); Keiichi Tateishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/314,162

(22) Filed: Jun. 25, 2014

(65) Prior Publication Data

US 2014/0305336 A1     Oct. 16, 2014

Related U.S. Application Data

(63) Continuation of application No. PCT/JP2012/082670, filed on Dec. 17, 2012.

(30) Foreign Application Priority Data

Dec. 26, 2011  (JP) ................. 2011-284369
Dec. 26, 2011  (JP) ................. 2011-284370
Dec. 26, 2011  (JP) ................. 2011-284371
Dec. 26, 2011  (JP) ................. 2011-284372

(51) Int. Cl.
  *C09D 11/328* (2014.01)
  *C07D 311/88* (2006.01)
  (Continued)

(52) U.S. Cl.
  CPC ............. *C09D 11/328* (2013.01); *B41J 2/01* (2013.01); *C09B 29/30* (2013.01); *C09D 11/00* (2013.01);
  (Continued)

(58) Field of Classification Search
  CPC .... C09D 11/328; C07D 311/88; C09B 11/24; C09B 67/0041
  USPC .......... 106/31.43, 31.47, 31.48; 549/388, 394
  See application file for complete search history.

(56) References Cited

U.S. PATENT DOCUMENTS 4,935,059 A * 6/1990 Mayer et al. ............... 106/31.43
5,599,386 A   2/1997 Sano et al.
(Continued)

FOREIGN PATENT DOCUMENTS

GB      2134129 A      8/1984
JP    60-067575 A      4/1985
(Continued)

OTHER PUBLICATIONS

International Search Report (PCT/ISA/210) issued Mar. 19, 2013, in International Application No. PCT/JP2012/082670.
(Continued)

*Primary Examiner* — Helene Klemanski
(74) *Attorney, Agent, or Firm* — Sughrue Mion, PLLC

(57) ABSTRACT

There is provided a compound represented by the following Formula (3):

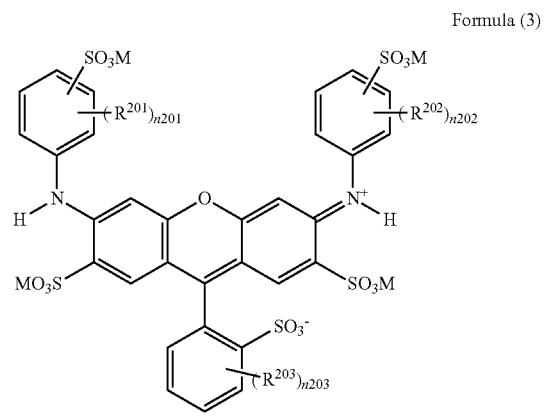

wherein in Formula (3), $R^{201}$, $R^{202}$ and $R^{203}$ each independently represent a monovalent substituent, n201 and n202 each independently represent a number of 0 to 4, and n203 represents a number of 0 to 4, when n201, n202 and n203 each represent a number of 2 or more, a plurality of $R^{201}$'s, $R^{202}$'s and $R^{203}$'s may be the same or different, M represents a hydrogen atom or a counter cation, and M's may be the same or different, and a coloring composition containing the compound.

35 Claims, 1 Drawing Sheet

(51) Int. Cl.
  *C09B 67/22*    (2006.01)
  *B41J 2/01*     (2006.01)
  *C09D 11/00*    (2014.01)
  *C09D 17/00*    (2006.01)
  *C09B 5/14*     (2006.01)
  *C09B 11/24*    (2006.01)
  *C09B 29/036*   (2006.01)
  *C09B 29/095*   (2006.01)
  *C09B 29/42*    (2006.01)
  *C09B 29/30*    (2006.01)

(52) U.S. Cl.
  CPC . *C09D 17/00* (2013.01); *C09B 5/14* (2013.01); *C09B 11/24* (2013.01); *C09B 29/0037* (2013.01); *C09B 29/095* (2013.01); *C09B 29/3639* (2013.01); *C09B 67/0033* (2013.01); *C09B 67/0041* (2013.01)

(56) References Cited

U.S. PATENT DOCUMENTS

| | | | |
|---|---|---|---|
| 6,998,493 B2 * | 2/2006 | Banning et al. | 549/212 |
| 7,141,342 B2 * | 11/2006 | Toyoda et al. | 430/108.14 |
| 8,343,269 B2 * | 1/2013 | Takahashi et al. | 106/31.43 |
| 8,628,588 B2 * | 1/2014 | Fujie et al. | 106/31.47 |
| 8,636,814 B2 * | 1/2014 | Fujie et al. | 106/31.47 |
| 2004/0239739 A1 | 12/2004 | Matsumoto et al. | |
| 2005/0171351 A1 | 8/2005 | Matsumoto et al. | |
| 2006/0009357 A1 | 1/2006 | Fujiwara et al. | |
| 2006/0230545 A1 * | 10/2006 | Lagrange | 8/405 |
| 2007/0062413 A1 | 3/2007 | Matsumoto et al. | |
| 2011/0067598 A1 | 3/2011 | Takahashi et al. | |
| 2014/0170538 A1 * | 6/2014 | Fujie | 106/31.47 |
| 2014/0176653 A1 * | 6/2014 | Fujie et al. | 549/390 |

FOREIGN PATENT DOCUMENTS

| | | |
|---|---|---|
| JP | 07-097539 A | 4/1995 |
| JP | 08-073791 A | 3/1996 |
| JP | 09-255882 A | 9/1997 |
| JP | 2003-192930 A | 7/2003 |
| JP | 2006-143989 A | 6/2006 |
| JP | 2011-148973 A | 8/2011 |
| WO | 2004104108 A1 | 12/2004 |

OTHER PUBLICATIONS

Written Opinion (PCT/ISA/237) issued Mar. 19, 2013, in International Application No. PCT/JP2012/082670.

IPER (PCT/IPEA/409) issued Jan. 8, 2014; in International Application No. PCT/JP2012/082670.

Office Action issued Jan. 6, 2015, by the Japanese Patent Office in related Application No. 2011-284372.

Office Action issued Jan. 6, 2015, by the Japanese Patent Office in related Application No. 2011-284371.

Office Action issued Jan. 6, 2015, by the Japanese Patent Office in related Application No. 2011-284369.

Office Action issued Jan. 6, 2015, by the Japanese Patent Office in related Application No. 2011-284370.

* cited by examiner

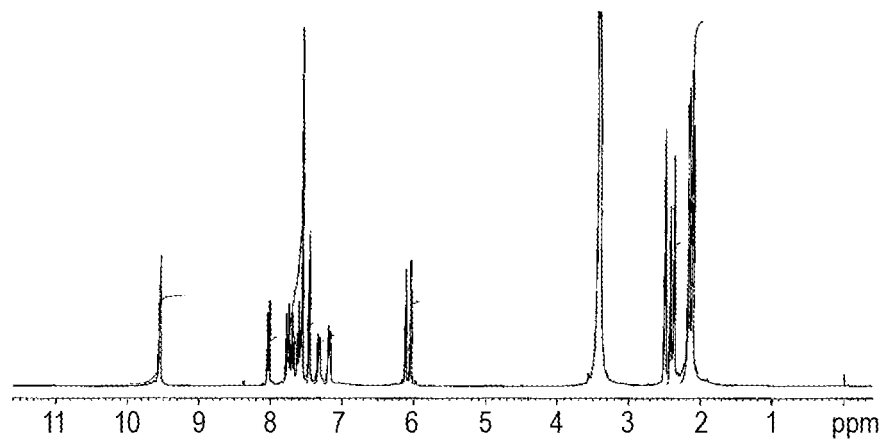

COMPOUND HAVING XANTHENE SKELETON, COLORING COMPOSITION, INK FOR INK JET RECORDING AND INK JET RECORDING METHOD

CROSS REFERENCE TO RELATED APPLICATION

This is a continuation of International Application No. PCT/JP2012/082670 filed on Dec. 17, 2012, and claims priority from Japanese Patent Application No. 2011-284369 filed on Dec. 26, 2011, Japanese Patent Application No. 2011-284370 filed on Dec. 26, 2011, Japanese Patent Application No. 2011-284371 filed on Dec. 26, 2011, Japanese Patent Application No. 2011-284372 filed on Dec. 26, 2011, the entire disclosures of which are incorporated therein by reference.

TECHNICAL FIELD

The present invention relates to a compound having a xanthene skeleton, a coloring composition including the compound, an ink for inkjet recording and an inkjet recording method.

BACKGROUND ART

An inkjet recording method is a method of performing printing by jetting and attaching small liquid drops of ink to a recording medium such as paper, as well-known in the art. By this printing method, it is possible to conveniently print a high-resolution and high-quality image at a high speed with an inexpensive apparatus, and particularly, in color printing, a technical development for the printing method has been recently performed as an image forming method which may replace photographs.

When a color image is formed using an inkjet recording method, it is common to use at least a yellow ink, a magenta ink, a cyan ink and a black ink. In the related art, water-based inks have been mainly used as these inkjet inks in terms of safety, such as malodor and hazards associated with firefighting. These inks are required to fall within suitable ranges in physical property values such as viscosity and surface tension, to be excellent in storage stability and prevent clogging of a nozzle, to impart a recording image at a high concentration, and to be excellent in light fastness, ozone resistance, water resistance and moisture resistance.

Such a performance is mostly satisfied by using a water-based ink containing water or a mixture solution of water and a water-soluble organic solvent as a main solvent, but since color tone, saturation, light fastness, ozone resistance, water resistance, moisture resistance and the like are influenced considerably by coloring agents, various dyes have been studied in the related art.

In particular, in a color recording method using a plurality of color inks, uniform characteristics are required for all the constituting inks. Among them, a magenta dye has a problem in that discoloration or change in color tone by ozone or light (sunlight, fluorescent light and the like) occurs significantly, as compared to the other dyes (a cyan dye and a yellow dye). Accordingly, when ozone resistance or light fastness of the magenta ink is inferior to that of the other inks, discoloration of the magenta ink causes the color tone of the overall image of printed matters to be changed, resulting in deteriorating the quality.

In the related art, an acidic dye having good chromogentic property and high water solubility, for example, C. I. Acid Red 52, 249 and 289, is known as a magenta dye for inkjet, but when such a dye is used alone, clogging of a nozzle hardly occurs due to the high water solubility, but the performances of the ozone resistance, and light fastness are very low.

Patent Document 1 discloses a water-based ink for inkjet recording, which contains a dye composed of C.I. Acid Red 289 that is a xanthene derivative, or a xanthene derivative having more sulfo groups than C.I. Acid Red 289.

Further, as the magenta dye for inkjet, an azo-based dye is also known. Patent Document 2 discloses an azo colorant having a specific structure.

In addition, as an azo colorant having a good hue, Patent Document 3 discloses a coloring composition having a good hue and fastness to light and ozone by using a heteryl azo dye having a specific substituent.

Furthermore, Patent Documents 4 and 5 disclose that a magenta dye having a good hue and fastness to light, ozone and humidity is provided by a specific compound having an anthrapyridone skeleton.

Patent Document 6 discloses an ink in which a xanthene-based compound and an azo-based compound are used in combination.

PRIOR ART DOCUMENT

Patent Document

Patent Document 1: British Patent No. 2134129
Patent Document 2: Japanese Patent Application Laid-Open No. H8-73791
Patent Document 3: Japanese Patent Application Laid-Open No. 2006-143989
Patent Document 4: Japanese Patent Application Laid-Open No. 2003-192930
Patent Document 5: International Publication No. 04/104108
Patent Document 6: U.S. Patent Application Publication No. 2011/0067598

SUMMARY OF INVENTION

Problems to be Solved

However, the colorant specifically described in Patent Document 1 is required to have further enhancement in ozone resistance and light fastness. Further, the colorant described in Patent Document 2 is excellent in moisture resistance, but is insufficient in hue, saturation (chroma) and ozone resistance. The dye described in Patent Document 3 is good in fastness such as light fastness or ozone resistance, but there is room for further improvement in hue. The dyes described in Patent Documents 4 and 5 are good in fastness such as light fastness or ozone resistance, but insufficient in print concentration. In addition, Patent Document 6 is also required to have further enhancement in performance likewise.

An object of the present invention is to provide a compound capable of forming an image which is excellent in ozone resistance as well as image fastness such as light fastness, moisture resistance, print concentration, saturation and hue, and a coloring composition. Another object of the present invention is to provide an ink for inkjet recording, which contains the compound and the coloring composition, and an inkjet recording method using the ink for inkjet recording.

As a result of intensive investigations in consideration of the aforementioned circumstances, the present inventors have found that a compound having a xanthene skeleton in which a specific number of sulfo groups are introduced may form an image which is excellent in hue as well as in ozone resistance and light fastness, thereby completing the present invention.

As a result of intensive investigations in consideration of the aforementioned circumstances, the present inventors have found that a coloring composition including a compound having a xanthene skeleton in which a specific number of sulfo groups are introduced and a specific heteryl azo compound is better in performances of image fastness such as ozone resistance and light fastness and hue than is expected, thereby completing the present invention.

As a result of intensive investigations in consideration of the aforementioned circumstances, the present inventors have found that a coloring composition including a compound having a xanthene skeleton in which a specific number of sulfo groups are introduced and a specific dye having an anthrapyridone skeleton is better in performances of image fastness such as ozone resistance, light fastness and moisture resistance and print concentration than is expected, thereby completing the present invention.

As a result of intensive investigations in consideration of the aforementioned circumstances, the present inventors have found that in a compound having a xanthene skeleton in which a specific number of sulfo groups are introduced and a coloring composition including a specific azo compound, performances of image fastness such as moisture resistance and ozone resistance, hue and chroma are better than is expected, thereby completing the present invention.

Means for Solving the Problems

That is, the present invention is as follows.
<1> A compound represented by the following Formula (3):

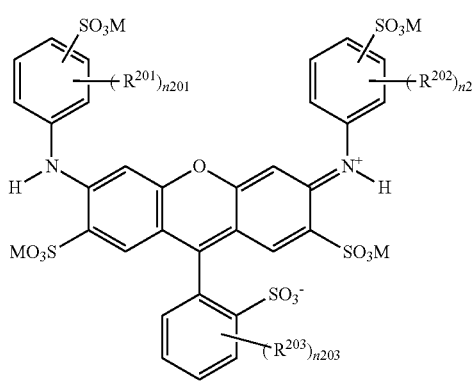

Formula (3)

wherein in Formula (3),
$R^{201}$, $R^{202}$ and $R^{203}$ each independently represent a monovalent substituent,
n201 and n202 each independently represent a number of 0 to 4, and
n203 represents a number of 0 to 4, when n201, n202 and n203 each represent a number of 2 or more, a plurality of $R^{201}$'s, $R^{202}$'s and $R^{203}$'s may be the same or different,
M represents a hydrogen atom or a counter cation, and M's may be the same or different.
<2> The compound described in <1>,
wherein $R^{203}$ represents a halogen atom, an aryl group, an alkoxy group, an alkyl group or an acylamino group.
<3> The compound described in <1> or <2>,
wherein $R^{201}$, $R^{202}$ and $R^{203}$ each independently represent an alkyl group or an acylamino group.

<4> The compound described in any one of <1> to <3>,
wherein $R^{201}$, $R^{202}$ and $R^{203}$ each independently represent an alkyl group having 1 to 6 carbon atoms.
<5> The compound described in any one of <1> to <4>,
wherein n201 and n202 each independently represent a number of 2 to 4.
<6> The compound described in any one of <1> to <5>,
wherein n203 represents 0.
<7> The compound described in any one of <1> to <6>,
wherein M is a lithium ion, a sodium ion or a potassium ion.
<8> A coloring composition containing the compound described in any one of <1> to <7>.
<9> A coloring composition containing the compound described in any one of <1> to <7> in an amount of 1% by mass to 20% by mass.
<10> A coloring composition containing:
a compound represented by the following Formula (3) and a compound represented by the following Formula (14):

[Chem. 102]

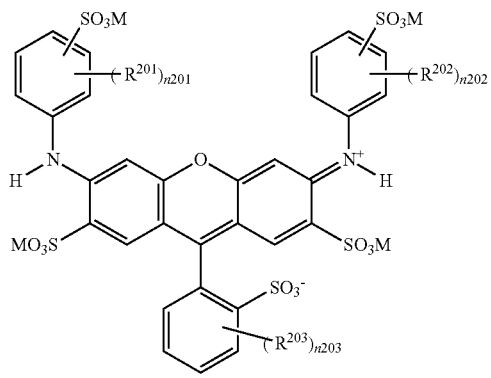

Formula (3)

wherein in Formula (3),
$R^{201}$, $R^{202}$ and $R^{203}$ each independently represent a monovalent substituent,
n201 and n202 each independently represent a number of 0 to 4,
n203 represents a number of 0 to 4, when n201, n202 and n203 each represent a number of 2 or more, a plurality of $R^{201}$'s, $R^{202}$'s and $R^{203}$'s may be the same or different,
M represents a hydrogen atom or a counter cation, M's may be the same or different:

[Chem. 103]

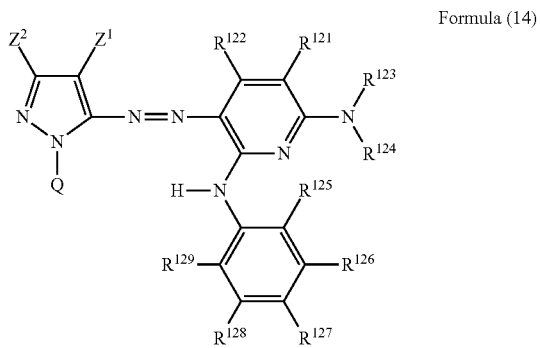

Formula (14)

in Formula (14), $Z^1$ represents an electron-withdrawing group having a Hammett's substituent constant σp value of 0.20 or more, $Z^2$ represents a hydrogen atom, an aliphatic group, an aromatic group, an acyl group or a heterocyclic group, $R^{123}$ and $R^{124}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, provided that there is no case where both $R^{123}$ and $R^{124}$ are a hydrogen atom, $R^{121}$ and $R^{122}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an alkylamino group, an arylamino group, a heterocyclic amino group, an acylamino group, a ureido group, a sulfamoylamino group, an alkoxycarbonylamino group, an aryloxycarbonylamino group, an alkyl or arylsulfonylamino group, an aryloxycarbonylamino group, a nitro group, an alkyl or arylthio group, an alkyl or arylsulfonyl group, an alkyl or arylsulfinyl group, a sulfamoyl group, a sulfo group or a heterocyclic thio group, $R^{121}$ and $R^{123}$ or $R^{123}$ and $R^{124}$ may combine with each other to form a 5- or 6-membered ring, $R^{125}$ and $R^{129}$ each independently represent an alkyl group, an alkoxy group or a halogen atom, provided that when both $R^{125}$ and $R^{129}$ are an alkyl group, the sum of the number of carbon atoms constituting the alkyl group is 3 or more, and these groups may be further substituted, $R^{126}$, $R^{127}$ and $R^{128}$ each independently have the same meaning as $R^{121}$ and $R^{122}$, and $R^{125}$ and $R^{126}$, or $R^{128}$ and $R^{129}$ may be condensed with each other to form a ring, Q represents a hydrogen atom, an aliphatic group, an aromatic group or a heterocyclic group, each group of $Z^1$, $Z^2$, $R^{121}$, $R^{122}$, $R^{123}$, $R^{124}$ and Q may further have a substituent, provided that Formula (14) has at least one ionic hydrophilic group.

<11> The coloring composition described in <10>, wherein the ionic hydrophilic group in Formula (14) is at least one group selected from a sulfo group, a carboxyl group, a phosphono group and a quaternary ammonium group.

<12> The coloring composition described in <10> or <11>, wherein in Formula (14), $R^{123}$ and $R^{124}$ each independently represent a hydrogen atom, an aromatic group or a hetero group.

<13> The coloring composition described in any one of <10> to <12>, wherein the composition contains the compound represented by Formula (14) in an amount of 1% by mass to 10% by mass.

<14> The coloring composition described in any one of <10> to <13>, wherein a mass ratio of the compound represented by Formula (3) to the compound represented by Formula (14) is 1/9 to 9/1.

<15> A coloring composition containing:
a compound represented by the following Formula (3); and
at least one selected from the group consisting of a compound represented by the following Formula (24) and a compound represented by the following Formula (25):

[Chem. 104]

Formula (3)

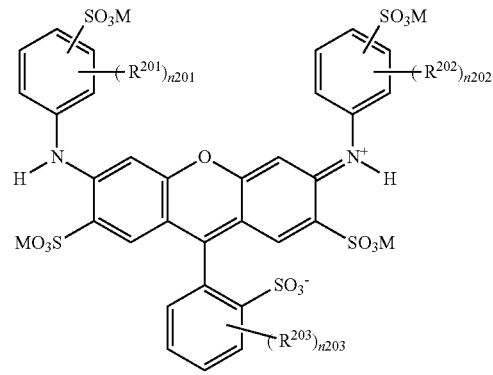

wherein in Formula (3), $R^{201}$, $R^{202}$ and $R^{203}$ each independently represent a monovalent substituent, n201 and n202 each independently represent a number of 0 to 4, n203 represents a number of 0 to 4, when n201, n202 and n203 each represent a number of 2 or more, a plurality of $R^{201}$'s, $R^{202}$'s and $R^{203}$'s may be the same or different, M represents a hydrogen atom or a counter cation, M's may be the same or different:

[Chem. 105]

Formula (24)

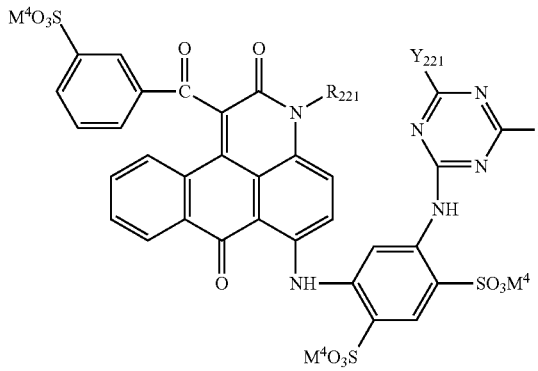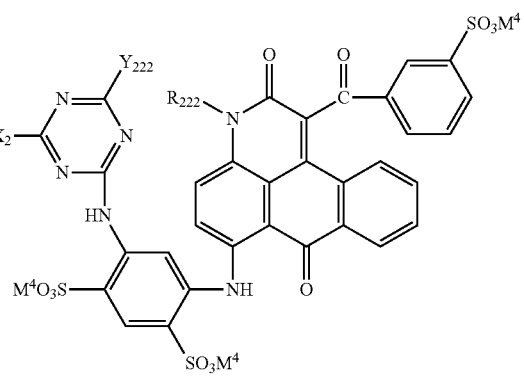

in Formula (24), $R_{221}$ and $R_{222}$ each independently represent a hydrogen atom or a substituted or unsubstituted alkyl group, $Y_{221}$ and $Y_{222}$ each independently represent a chlorine atom, a hydroxyl group, a substituted or unsubstituted amino group, an alkoxy group and a substituted or unsubstituted phenoxy group, $X_2$ represents a divalent linking group, $M^4$ represents a hydrogen atom or a counter cation, $M^4$'s may be the same or different:

[Chem. 106]

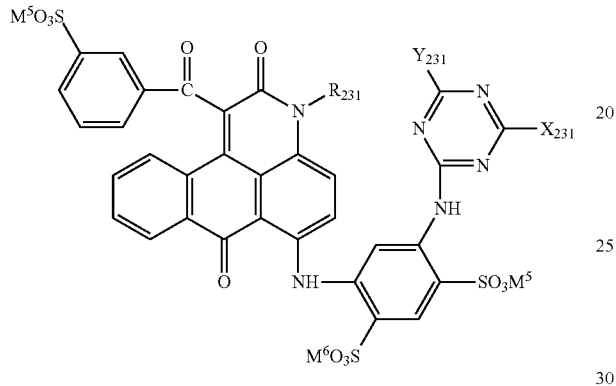

Formula (25)

in Formula (25), $R_{231}$ represents a hydrogen atom or a substituted or unsubstituted alkyl group, $Y_{231}$ represents a chlorine atom, a hydroxyl group, a substituted or unsubstituted amino group or a morpholino group, $M^5$ represents a hydrogen atom or a counter cation, $M^5$'s may the same or different, $X_{231}$ represents a group represented by the following Formula (25-1):

[Chem. 107]

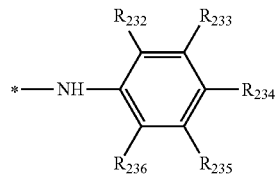

Formula (25-1)

in Formula (25-1), $R_{232}$, $R_{233}$, $R_{234}$, $R_{235}$ and $R_{236}$ each independently represent a hydrogen atom, an alkyl group having 1 to 8 carbon atoms or —COOM' (M' represents a hydrogen atom or a counter cation), provided that at least one of $R_{232}$, $R_{233}$, $R_{234}$, $R_{235}$ and $R_{236}$ represents an alkyl group having 1 to 8 carbon atoms or —COOM'.

<16> The coloring composition described in <15>,
wherein $R_{221}$, $R_{222}$ and $R_{231}$ each independently represent a hydrogen atom or an unsubstituted alkyl group.

<17> The coloring composition described in <15> or <16>,
wherein $Y_{221}$, $Y_{222}$ and $Y_{231}$ each independently represent a chlorine atom, a hydroxyl group or an unsubstituted amino group.

<18> The coloring composition described in any one of <15> to <17>,
wherein a combined content ratio of the compound represented by Formula (24) and the compound represented by Formula (25) is 1 to 20% by mass.

<19> The coloring composition described in any one of <15> to <18>,
wherein a mass ratio of a content of the compound represented by Formula (3) to a combined content of the compound represented by Formula (24) and the compound represented by Formula (25) is 9/1 to 1/9.

<20> A coloring composition containing:
a compound represented by the following Formula (3); and
a compound represented by the following Formula (34):

[Chem. 108]

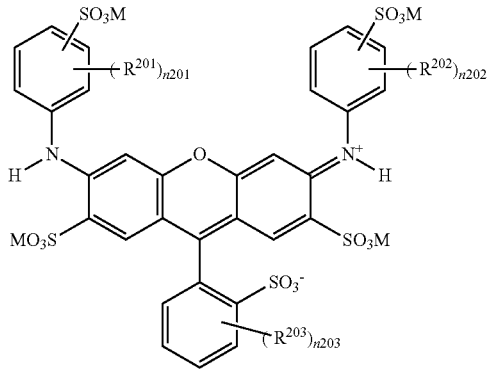

Formula (3)

wherein in Formula (3),
$R^{201}$, $R^{202}$ and $R^{203}$ each independently represent a monovalent substituent,
n201 and n202 each independently represent a number of 0 to 4,
n203 represents a number of 0 to 4, when n201, n202 and n203 each represent a number of 2 or more, a plurality of $R^{201}$'s, $R^{202}$'s and $R^{203}$'s may be the same or different,
M represents a hydrogen atom or a counter cation, M's may be the same or different:

[Chem. 109]

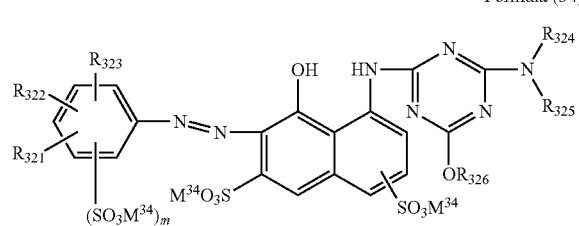

Formula (34)

in Formula (34),
$R_{321}$, $R_{322}$ and $R_{323}$ each independently represent a hydrogen atom, a substituted or unsubstituted alkyl group having 1 to 9 carbon atoms, an alkoxy group having 1 to 9 carbon atoms, a halogen atom, a hydroxyl group, a substituted or unsubstituted carbamoyl group, a substituted or unsubstituted sulfamoyl group, a substituted or unsubstituted amino group, a nitro group, a sulfonic acid ester group, a substituted or unsubstituted alkylsulfonyl group having 1 to 9 carbon atoms, an arylsulfonyl group having 6 to 15 carbon atoms, a carboxyl group or a carboxylic acid ester group, m represents 0, 1 or 2, $R_{324}$, $R_{325}$ and $R_{326}$ each independently represent a hydrogen atom, a substituted or unsubstituted alkyl group having 1 to 18 carbon atoms, a substituted or unsubstituted alkenyl group having 2 to 18 carbon atoms, a substituted or unsubstituted aryl group, a substituted or unsubstituted aralkyl group or a substituted or unsubstituted heterocyclic group, $M^{34}$ represents a hydrogen atom or a counter cation, $M^{34}$'s may be the same or different.

<21> The coloring composition described in <20>, wherein in Formula (34), at least one of $R_{324}$, $R_{325}$ and $R_{326}$ represents an alkyl group, an alkenyl group, an aryl group or an aralkyl group, which is substituted with 1 to 4 carboxyl groups.

<22> The coloring composition described in <20> or <21>, wherein in Formula (34), one of $R_{324}$ and $R_{325}$ represents a hydrogen group and the other represents an alkyl group, an alkenyl group, an aryl group or an aralkyl group, which is substituted with 1 to 4 carboxyl groups.

<23> The coloring composition described in any one of <20> to <22>, wherein in Formula (34), $R_{321}$, $R_{322}$ and $R_{323}$ each independently represent a hydrogen atom, an alkyl group having 1 to 3 carbon atoms, a halogen atom or a carboxyl group.

<24> The coloring composition described in any one of <20> to <23>, wherein in Formula (34), $R_{321}$, $R_{322}$ and $R_{323}$ each independently represent a hydrogen atom, a halogen atom or a carboxyl group.

<25> The coloring composition described in any one of <20> to <24>, wherein a content ratio of the compound represented by Formula (34) is 1% by mass to 20% by mass.

<26> The coloring composition described in any one of <20> to <25>, wherein a mass ratio of a content of the compound represented by Formula (3) to a content of the compound represented by Formula (34) is 9/1 to 1/9.

<27> The coloring composition described in any one of <10> to <26>, wherein $R^{203}$ represents a halogen atom, an aryl group, an alkoxy group, an alkyl group or an acylamino group.

<28> The coloring composition described in any one of <10> to <27>, wherein $R^{201}$, $R^{202}$ and $R^{203}$ each independently represent an alkyl group or an acylamino group.

<29> The coloring composition described in any one of <10> to <28>, wherein $R^{201}$, $R^{202}$ and $R^{203}$ each independently represent an alkyl group having 1 to 6 carbon atoms.

<30> The coloring composition described in any one of <10> to <29>, wherein n201 and n202 each independently represent a number of 2 to 4.

<31> The coloring composition described in any one of <10> to <30>, wherein n203 represents 0.

<32> The coloring composition described in any one of <10> to <31>, wherein M is a lithium ion, a sodium ion or a potassium ion.

<33> The coloring composition described in any one of <10> to <32>, wherein a content ratio of the compound represented by Formula (3) is 1% by mass to 20% by mass.

<34> An ink for inkjet recording containing the coloring composition described in any one of <8> to <33>.

<35> An inkjet recording method which forms an image by using the coloring composition described in any one of <8> to <33> or the ink for inkjet recording described in <34>.

The present invention refers to the above <1> to <35>. For a reference, other matters (for examples, the matters described in the following [1] to [52] and the like) are also described.

[1] A compound represented by the following Formula (1).

[Chem. 1]

$$D\text{-}(SO_3M)_4 \qquad \text{Formula (1)}$$

In Formula (1), D represents a residue wherein four hydrogen atoms are removed from a compound represented by the following Formula (2). M represents a hydrogen atom or a counter cation. A plurality of M's may be the same or different.

[Chem. 2]

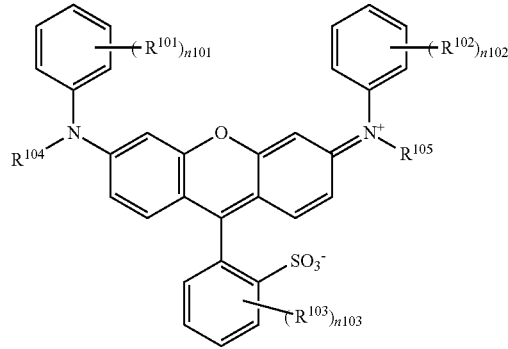

Formula (2)

In Formula (2), $R^{101}$, $R^{102}$ and $R^{103}$ each independently represent a monovalent substituent, $R^{104}$ and $R^{105}$ each independently represent a hydrogen atom or a monovalent substituent, n101 and n102 each independently represent a number of 0 to 5, and n103 represents a number of 0 to 4. When n101, n102 and n103 each represent a number of 2 or more, a plurality of $R^{101}$'s, $R^{102}$'s and $R^{103}$'s may be the same or different.

[2] The compound described in [1], wherein the compound represented by Formula (1) is a compound represented by the following Formula (3).

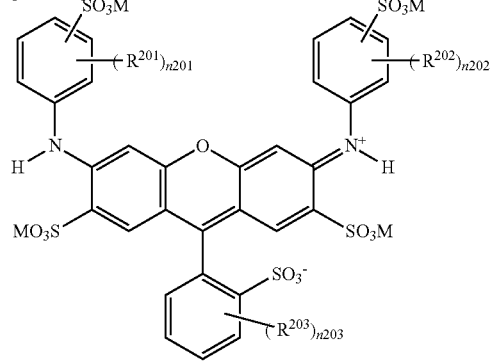

Formula (3)

In Formula (3), $R^{201}$, $R^{202}$ and $R^{203}$ each independently represent a monovalent substituent, n201 and n202 each independently represent a number of 0 to 4, and n203 represents a number of 0 to 4. When n201, n202 and n203 each represent a number of 2 or more, a plurality of R201's, R202's and R203's may be the same or different. M represents a hydrogen atom or a counter cation. A plurality of M's may be the same or different.

[3] The compound described in [1] or [2], wherein $R^{101}$, $R^{102}$, $R^{103}$, $R^{201}$, $R^{202}$ and $R^{203}$ each independently represent an alkyl group or an acylamino group.

[4] The compound described in any one of [1] to [3], wherein $R^{101}$, $R^{102}$, $R^{103}$, $R^{201}$, $R^{202}$ and $R^{203}$ each independently represent an alkyl group having 1 to 6 carbon atoms.

[5] The compound described in any one of [1] to [4], wherein n101, n102, n201 and n202 each independently represent a number of 2 to 4.

[6] The compound described in any one of [1] to [5], in which n103 and n203 represent 0.

[7] The compound described in any one of [1] to [6], wherein M is a lithium ion, a sodium ion or a potassium ion.

[8] A coloring composition containing the compound described in any one of [1] to [7].

[9] A coloring composition containing the compound described in any one of [1] to [7] in an amount of 1% by mass to 20% by mass.

[10] A coloring composition including a compound represented by the following Formula (11) and a compound represented by the following Formula (14).

[Chem. 4]

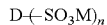

Formula (11)

In Formula (11), D represents a residue in which n hydrogen atoms are removed from a compound represented by the following Formula (2), and n represents a number of 3 to 6. M represents a hydrogen atom or a counter cation. A plurality of M's may be the same or different.

[Chem. 5]

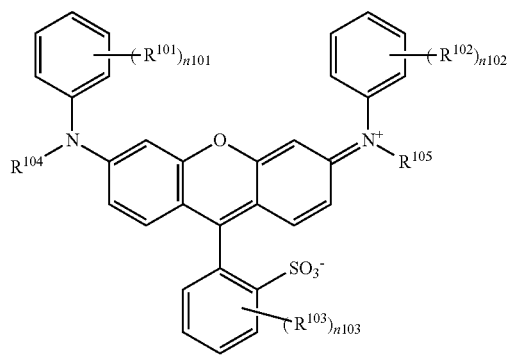

Formula (2)

In Formula (2), $R^{101}$, $R^{102}$ and $R^{103}$ each independently represent a monovalent substituent, $R^{104}$ and $R^{105}$ each independently represent a hydrogen atom or a monovalent substituent, n101 and n102 each independently represent a number of 0 to 5, and n103 represents a number of 0 to 4. When n101, n102 and n103 each represent a number of 2 or more, a plurality of $R^{101}$'s, $R^{102}$'s and $R^{103}$'s may be the same or different.

[Chem. 6]

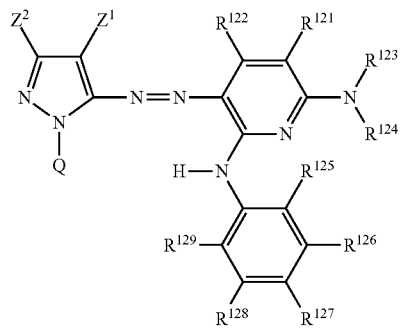

Formula (14)

In Formula (14), $Z^1$ represents an electron-withdrawing group having a Hammett's substituent constant σp value of 0.20 or more.

$Z^2$ represents a hydrogen atom, an aliphatic group, an aromatic group, an acyl group or a heterocyclic group.

$R^{123}$ and $R^{124}$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group. Provided that there is no case where both $R^{123}$ and $R^{124}$ are a hydrogen atom at the same time.

$R^{121}$ and $R^{122}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an alkylamino group, an arylamino group, a heterocyclic amino group, an acylamino group, a ureido group, a sulfamoylamino group, an alkoxycarbonylamino group, an aryloxycarbonylamino group, an alkyl or arylsulfonylamino group, an aryloxycarbonylamino group, a nitro group, an alkyl or arylthio group, an alkyl or arylsulfonyl group, an alkyl or arylsulfinyl group, a sulfamoyl group, a sulfo group or a heterocyclic thio group. Further, $R^{121}$ and $R^{123}$ or $R^{123}$ and $R^{124}$ may combine with each other to form a 5- or 6-membered ring.

$R^{125}$ and $R^{129}$ each independently represent an alkyl group, an alkoxy group or a halogen atom. Provided that when both $R^{125}$ and $R^{129}$ are an alkyl group at the same time, the sum of the number of carbon atoms constituting the alkyl group is 3 or more, and these groups may be further substituted.

$R^{126}$, $R^{127}$ and $R^{128}$ each independently have the same meaning as $R^{121}$ and $R^{122}$, and $R^{125}$ and $R^{126}$, or $R^{128}$ and $R^{129}$ may be condensed with each other to form a ring.

Q represents a hydrogen atom, an aliphatic group, an aromatic group or a heterocyclic group.

Each group of $Z^1$, $Z^2$, $R^{121}$, $R^{122}$, $R^{123}$, $R^{124}$ and Q may further have a substituent.

Provided that Formula (14) has at least one ionic hydrophilic group.

[11] The coloring composition described in [10],
wherein n in Formula (11) is 4.

[12] The coloring composition described in [10] or [11], wherein the compound represented by Formula (11) is a compound represented by the following Formula (3).

[Chem. 7]

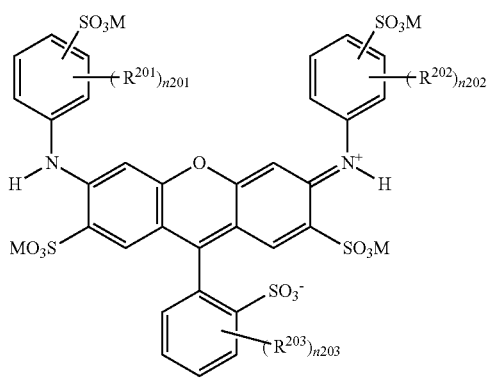

Formula (3)

In Formula (3), $R^{201}$, $R^{202}$ and $R^{203}$ each independently represent a monovalent substituent, n201 and n202 each independently represent a number of 0 to 4, and n203 represents a number of 0 to 4. When n201, n202 and n203 each represent a number of 2 or more, a plurality of $R^{201}$'s, $R^{202}$'s and $R^{203}$'s may be the same or different. M represents a hydrogen atom or a counter cation. A plurality of M's may be the same or different.

[13] The coloring composition described in any one of [10] to [12],
wherein $R^{101}$, $R^{102}$, $R^{103}$, $R^{201}$, $R^{202}$ and $R^{203}$ each independently represent an alkyl group or an acylamino group.

[14] The coloring composition described in any one of [10] to [13],
wherein $R^{101}$, $R^{102}$, $R^{103}$, $R^{201}$, $R^{202}$ and $R^{203}$ each independently represent an alkyl group having 1 to 6 carbon atoms.

[15] The coloring composition described in any one of [10] to [14],
wherein n101, n102, n201 and n202 each independently represent a number of 2 to 4.

[16] The coloring composition described in any one of [10] to [15],
wherein n103 and n203 represent 0.

[17] The coloring composition described in any one of [10] to [16],
wherein a salt of the compound represented by Formula (11) is a lithium salt, a sodium salt or a potassium salt.

[18] The coloring composition described in any one of [10] to [17],
wherein the ionic hydrophilic group in Formula (14) is at least one group selected from a sulfo group, a carboxyl group, a phosphono group and a quaternary ammonium group.

[19] The coloring composition described in any one of [10] to [18],
wherein in Formula (14), $R^{123}$ and $R^{124}$ each independently represent a hydrogen atom, an aromatic group or a hetero group.

[20] The coloring composition described in any one of [10] to [19],
wherein the coloring composition contains the compound represented by Formula (11) or a salt thereof in an amount of 1% by mass to 10% by mass.

[21] The coloring composition described in any one of [10] to [20],
wherein the coloring composition contains the compound represented by Formula (14) in an amount of 1% by mass to 10% by mass.

[22] The coloring composition in any one of [10] to [21],
wherein a mass ratio of the compound represented by Formula (11) and the compound represented by Formula (14) is 1/9 to 9/1.

[23] A coloring composition including a compound represented by the following Formula (11) and at least one selected from the group consisting of a compound represented by the following Formula (24) and a compound represented by the following Formula (25).

[Chem. 8]

$$D\text{--}(SO_3M)_n \qquad \text{Formula (11)}$$

In Formula (11), D represents a residue in which n hydrogen atoms are removed from a compound represented by the following Formula (2), and n represents a number of 3 to 6. M represents a hydrogen atom or a counter cation. A plurality of M's may be the same or different.

[Chem. 9]

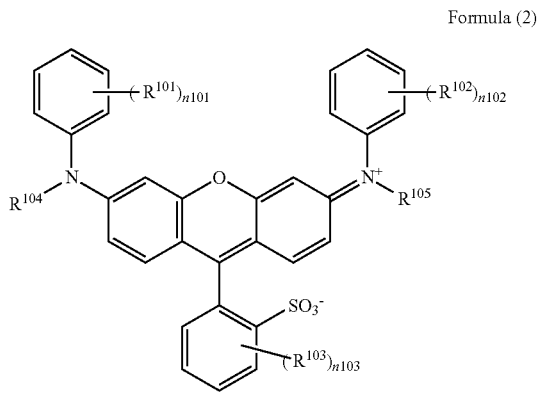

Formula (2)

In Formula (2), $R^{101}$, $R^{102}$ and $R^{103}$ each independently represent a monovalent substituent, $R^{104}$ and $R^{105}$ each independently represent a hydrogen atom or a monovalent substituent, n101 and n102 each independently represent a number of 0 to 5, and n103 represents a number of 0 to 4. When n101, n102 and n103 each represent a number of 2 or more, a plurality of $R^{101}$'s, $R^{102}$'s and $R^{103}$'s may be the same or different.

[Chem. 10]

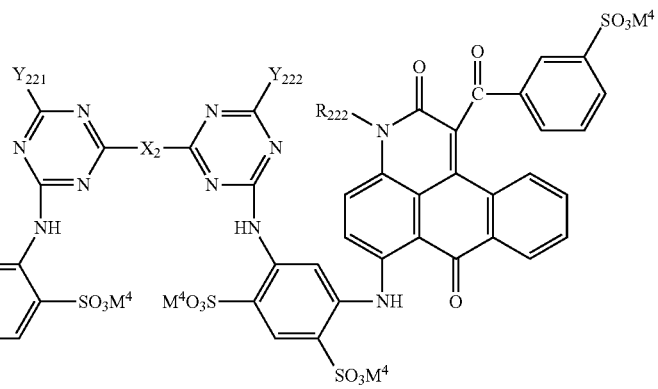

Formula (24)

In Formula (24), $R_{221}$ and $R_{222}$ each independently represent a hydrogen atom or a substituted or unsubstituted alkyl group.

$Y_{221}$ and $Y_{222}$ each independently represent a chlorine atom, a hydroxyl group, a substituted or unsubstituted amino group, an alkoxy group and a substituted or unsubstituted phenoxy group.

$X_2$ represents a divalent linking group.

$M^4$ represents a hydrogen atom or a counter cation. A plurality of $M^4$'s may be the same or different.

[Chem. 11]

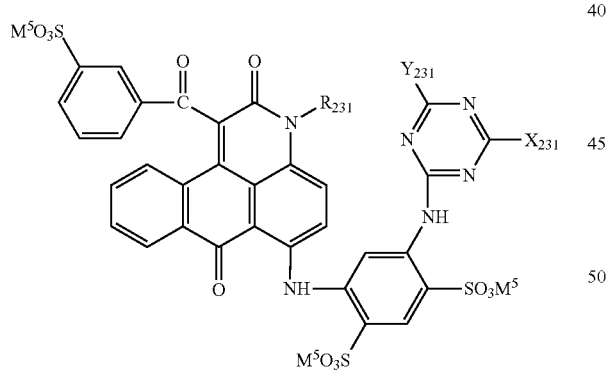

Formula (25)

In Formula (25), $R_{231}$ represents a hydrogen atom or a substituted or unsubstituted alkyl group.

$Y_{231}$ represents a chlorine atom, a hydroxyl group, a substituted or unsubstituted amino group or a morpholino group.

$M^5$ represents a hydrogen atom or a counter cation. A plurality of $M^5$'s may be the same or different.

$X_{231}$ represents a group represented by the following Formula (25-1).

[Chem. 12]

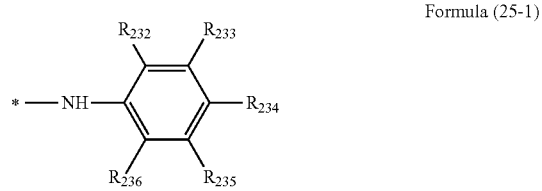

Formula (25-1)

In Formula (25-1), $R_{232}$, $R_{233}$, $R_{234}$, $R_{235}$ and $R_{236}$ each independently represent a hydrogen atom, an alkyl group having 1 to 8 carbon atoms or —COOM' (M' represents a hydrogen atom or a counter cation). Provided that at least one of $R_{232}$, $R_{233}$, $R_{234}$, $R_{235}$ and $R_{236}$ represents an alkyl group having 1 to 8 carbon atoms or —COOM'.

[24] The coloring composition described in [23], wherein n in Formula (11) is 4.

[25] The coloring composition described in [23] or [24], wherein the compound represented by Formula (11) is a compound represented by the following Formula (3).

[Chem. 13]

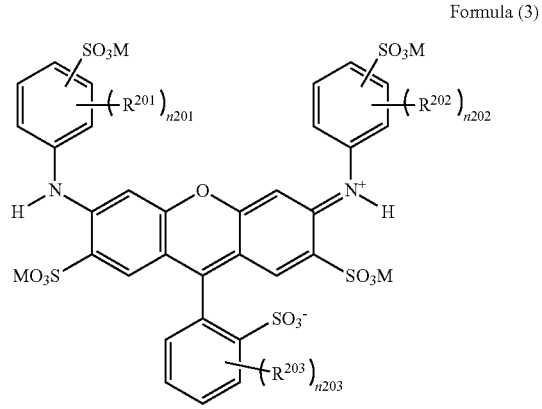

Formula (3)

In Formula (3), $R^{201}$, $R^{202}$ and $R^{203}$ each independently represent a monovalent substituent, n201 and n202 each independently represent a number of 0 to 4, and n203 represents a number of 0 to 4. When n201, n202 and n203 each represent a number of 2 or more, a plurality of $R^{201}$'s, $R^{202}$'s and $R^{203}$'s may be the same or different. M represents a hydrogen atom or a counter cation. A plurality of M's may be the same or different.

[26] The coloring composition described in any one of [23] to [25], wherein $R^{101}$, $R^{102}$, $R^{103}$, $R^{201}$, $R^{202}$ and $R^{203}$ each independently represent an alkyl group or an acylamino group.

[27] The coloring composition described in any one of [23] to [26], wherein $R^{101}$, $R^{102}$, $R^{103}$, $R^{201}$, $R^{202}$ and $R^{203}$ each independently represent an alkyl group having 1 to 6 carbon atoms.

[28] The coloring composition described in any one of [23] to [27], wherein n101, n102, n201 and n202 each independently represent a number of 2 to 4.

[29] The coloring composition described in any one of [23] to [28], wherein n103 and n203 represent 0.

[30] The coloring composition described in any one of [23] to [29], wherein M is a lithium ion, a sodium ion or a potassium ion.

[31] The coloring composition described in any one of [23] to [30], wherein $R_{221}$, $R_{222}$ and $R_{231}$ each independently represent a hydrogen atom or an unsubstituted alkyl group.

[32] The coloring composition described in any one of [23] to [31], wherein $R_{221}$, $R_{222}$ and $R_{231}$ each independently represent a chlorine atom, a hydroxyl group or an unsubstituted amino group.

[33] The coloring composition described in any one of [23] to [32], wherein a content ratio of the compound represented by Formula (11) is 1% by mass to 20% by mass.

[34] The coloring composition described in any one of [23] to [33], wherein a combined content ratio of the compound represented by Formula (24) and the compound represented by Formula (25) is 1% by mass to 20% by mass.

[35] The coloring composition in any one of [23] to [34], wherein a mass ratio of a content of the compound represented by Formula (11) and a combined content of the compound represented by Formula (24) and the compound represented by Formula (25) is 9/1 to 1/9.

[36] A coloring composition including a compound represented by the following Formula (11) and a compound represented by the following Formula (34).

[Chem. 14]

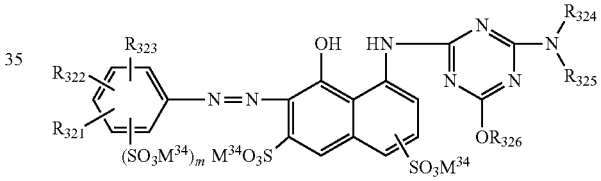

Formula (11)

In Formula (11), D represents a residue in which n hydrogen atoms are removed from a compound represented by the following Formula (2), and n represents a number of 3 to 6. M represents a hydrogen atom or a counter cation. A plurality of M's may be the same or different.

[Chem. 15]

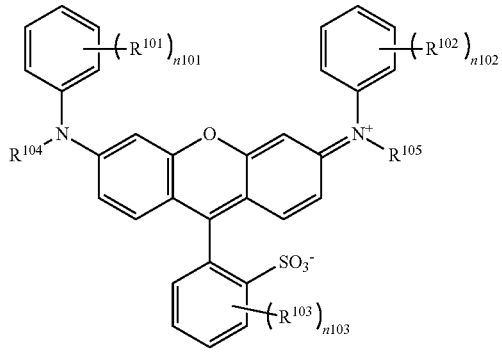

Formula (2)

In Formula (2), $R^{101}$, $R^{102}$ and $R^{103}$ each independently represent a monovalent substituent, $R^{104}$ and $R^{105}$ each independently represent a hydrogen atom or a monovalent substituent, n101 and n102 each independently represent a number of 0 to 5, and n103 represents a number of 0 to 4. When n101, n102 and n103 each represent a number of 2 or more, a plurality of $R^{101}$'s, $R^{102}$'s and $R^{103}$'s may be the same or different.

[Chem. 16]

Formula (34)

In Formula (34), $R_{321}$, $R_{322}$ and $R_{323}$ each independently represent a hydrogen atom, a substituted or unsubstituted alkyl group having 1 to 9 carbon atoms, an alkoxy group having 1 to 9 carbon atoms, a halogen atom, a hydroxyl group, a substituted or unsubstituted carbamoyl group, a substituted or unsubstituted sulfamoyl group, a substituted or unsubstituted amino group, a nitro group, a sulfonic acid ester group, a substituted or unsubstituted alkylsulfonyl group having 1 to 9 carbon atoms, an arylsulfonyl group having 6 to 15 carbon atoms, a carboxyl group or a carboxylic acid ester group.

m represents 0, 1 or 2.

$R_{324}$, $R_{325}$ and $R_{326}$ each independently represents a hydrogen atom, a substituted or unsubstituted alkyl group having 1 to 18 carbon atoms, a substituted or unsubstituted alkenyl group having 2 to 18 carbon atoms, a substituted or unsubstituted aryl group, a substituted or unsubstituted aralkyl group or a substituted or unsubstituted heterocyclic group.

$M^{34}$ represents a hydrogen atom or a counter cation. A plurality of $M^{34}$'s may be the same or different.

[37] The coloring composition described in [36], wherein n in Formula (11) is 4.

[38] The coloring composition described in [36] or [37], wherein the compound represented by Formula (11) is a compound represented by the following Formula (3).

[Chem. 17]

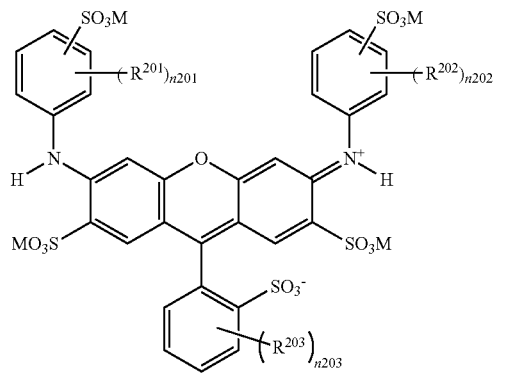

Formula (3)

In Formula (3), $R^{201}$, $R^{202}$ and $R^{203}$ each independently represent a monovalent substituent, n201 and n202 each independently represent a number of 0 to 4, and n203 represents a number of 0 to 4. When n201, n202 and n203 each represent a number of 2 or more, a plurality of $R^{201}$'s, $R^{202}$'s and $R^{203}$'s may be the same or different. M represents a hydrogen atom or a counter cation. A plurality of M's may be the same or different.

[39] The coloring composition described in any one of [36] to [38], wherein $R^{101}$, $R^{102}$, $R^{103}$, $R^{201}$, $R^{202}$ and $R^{203}$ each independently represent an alkyl group or an acylamino group.

[40] The coloring composition described in any one of [36] to [39], wherein $R^{101}$, $R^{102}$, $R^{103}$, $R^{201}$, $R^{202}$ and $R^{203}$ each independently represent an alkyl group having 1 to 6 carbon atoms.

[41] The coloring composition described in any one of [36] to [40],
wherein n101, n102, n201 and n202 each independently represent an integer of 2 to 4.

[42] The coloring composition described in any one of [36] to [41],
wherein n103 and n203 represent 0.

[43] The coloring composition described in any one of [36] to [42],
wherein M is a lithium ion, a sodium ion or a potassium ion.

[44] The coloring composition described in any one of [36] to [43],
wherein in Formula (34), at least one of $R_{324}$, $R_{325}$ and $R_{326}$ represents an alkyl group, an alkenyl group, an aryl group or an aralkyl group, which is substituted with 1 to 4 carboxyl groups.

[45] The coloring composition described in any one of [36] to [44],
wherein in Formula (34), one of $R_{324}$ and $R_{325}$ represents a hydrogen group and the other represents an alkyl group, an alkenyl group, an aryl group or an aralkyl group, which is substituted with 1 to 4 carboxyl groups.

[46] The coloring composition described in any one of [36] to [45],
wherein in Formula (34), $R_{321}$, $R_{322}$ and $R_{323}$ each independently represent a hydrogen atom, an alkyl group having 1 to 3 carbon atoms, a halogen atom or a carboxyl group.

[47] The coloring composition described in any one of [36] to [46],
wherein in Formula (34), $R_{321}$, $R_{322}$ and $R_{323}$ each independently represent a hydrogen atom, a halogen atom or a carboxyl group.

[48] The coloring composition described in any one of [36] to [47],
wherein a content ratio of the compound represented by Formula (11) is 1% by mass to 20% by mass.

[49] The coloring composition described in any one of [36] to [48],
wherein a content ratio of the compound represented by Formula (34) is 1% by mass to 20% by mass.

[50] The coloring composition in any one of [36] to [49],
wherein a mass ratio of a content of the compound represented by Formula (11) and a content of the compound represented by Formula (34) is 9/1 to 1/9.

[51] An ink for inkjet recording, containing the coloring composition described in any one of [8] to [50].

[52] An inkjet recording method which forms an image by using the coloring composition described in any one of [8] to [50] or the ink for inkjet recording described in [51].

Advantage of the Invention

The compound of the present invention is useful as a colorant (particularly, a magenta dye). Further, the compound and the coloring composition of the present invention may form an image which is excellent in ozone resistance as well as image fastness such as light fastness, moisture resistance, print concentration, saturation and hue. In addition, according to the present invention, an ink for inkjet recording containing the compound and the coloring composition and an inkjet recording method using the ink for inkjet recording are provided.

BRIEF DESCRIPTION OF THE DRAWINGS

FIG. 1 is a view illustrating a $^1$H NMR spectrum of a compound (1A) as an example of the compound of the present invention in heavy dimethylsulfoxide.

MODE FOR CARRYING OUT THE INVENTION

Hereinafter, the present invention will be described in detail.
First, in the present invention, Group A of substituents will be defined.

(Group A of Substituents)

Examples thereof include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a silyl group, and an ionic hydrophilic group. The substituents may be further substituted, and examples of the group further substituted include groups selected from the Group A of substituents.

Examples of the halogen atom may include a fluorine atom, a chlorine atom, a bromine atom or an iodine atom.

Examples of the alkyl group include straight, branched and cyclic, substituted or unsubstituted alkyl groups, and also include a cycloalkyl group, a bicycloalkyl group, a tricyclo structure having more cyclic structures and the like. The alkyl group (for example, an alkyl group in an alkoxy group or an alkylthio group) in the substituents described below also represents an alkyl group of such concept.

Preferred examples of the alkyl group include an alkyl group having 1 to 30 carbon atoms, for example, a methyl group, an ethyl group, an n-propyl group, an i-propyl group, a t-butyl group, an n-octyl group, an eicosyl group, a 2-chloroethyl group, a 2-cyanoethyl group, a 2-ethylhexyl group and the like, preferred examples of the cycloalkyl group include a substituted or unsubstituted cycloalkyl group having 3 to 30 carbon atoms, for example, a cyclohexyl group, a cyclopentyl group, a 4-n-dodecylcyclohexyl group and the like, and preferred examples of the bicycloalkyl group include a substituted or unsubstituted bicycloalkyl group having 5 to 30 carbon atoms, that is, a monovalent group in which one hydrogen atom is removed from bicycloalkane having 5 to 30 carbon atoms, for example, a bicyclo[1,2,2]heptan-2-yl group, a bicyclo[2,2,2]octan-3-yl group and the like.

Examples of the aralkyl group include a substituted or unsubstituted aralkyl group, and preferred examples of the substituted or unsubstituted aralkyl group include an aralkyl group having 7 to 30 carbon atoms. Examples thereof include a benzyl group and a 2-phenethyl group.

Examples of the alkenyl group include a straight, branched or cyclic, substituted or unsubstituted alkenyl group, and include a cycloalkenyl group and a bicycloalkenyl group.

Preferred examples of the alkenyl group include a substituted or unsubstituted alkenyl group having 2 to 30 carbon atoms, for example, a vinyl group, an allyl group, a prenyl group, a geranyl group, an oleyl group and the like, preferred examples of the cycloalkenyl group include a substituted or unsubstituted cycloalkenyl group having 3 to 30 carbon atoms, that is, a monovalent group in which one hydrogen atom is removed from cycloalkene having 3 to 30 carbon atoms, for example, a 2-cyclopenten-1-yl group, a 2-cyclohexen-1-yl group and the like, and examples of the bicycloalkenyl group include a substituted or unsubstituted bicycloalkenyl group, preferably, a substituted or unsubstituted bicycloalkenyl group having 5 to 30 carbon atoms, that is, a monovalent group in which one hydrogen atom is removed from bicycloalkene having one double bond, for example, a bicyclo[2,2,1]hept-2-en-1-yl group, a bicyclo[2,2,2]oct-2-en-4-yl group and the like.

Examples of the alkynyl group include a substituted or unsubstituted alkynyl group having 2 to 30 carbon atoms, for example, an ethynyl group, a propargyl group, a trimethylsilylethynyl group and the like.

Preferred examples of the aryl group include a substituted or unsubstituted aryl group having 6 to 30 carbon atoms, for example, a phenyl group, a p-tolyl group, a naphthyl group, an m-chlorophenyl group, an o-hexadecanoylaminophenyl group and the like.

Preferred examples of the heterocyclic group include a monovalent group in which one hydrogen atom is removed from a 5- or 6-membered substituted or unsubstituted aromatic or non-aromatic heterocyclic compound, and more preferred examples thereof include a 5- or 6-membered aromatic heterocyclic group having 3 to 30 carbon atoms, for example, a 2-furyl group, a 2-thienyl group, a 2-pyrimidinyl group, a 2-benzothiazolyl group and the like. Examples of the non-aromatic heterocyclic group include a morpholinyl group.

Preferred examples of the alkoxy group include a substituted or unsubstituted alkoxy group having 1 to 30 carbon atoms, for example, a methoxy group, an ethoxy group, an isopropoxy group, a t-butoxy group, an n-octyloxy group, a 2-methoxyethoxy group and the like.

Preferred example of the aryloxy group include a substituted or unsubstituted aryloxy group having 6 to 30 carbon atoms, for example, a phenoxy group, a 2-methylphenoxy group, a 4-t-butylphenoxy group, a 3-nitrophenoxy group, a 2-tetradecanoylaminophenoxy group and the like.

Preferred examples of the silyloxy group include a substituted or unsubstituted silyloxy group having 0 to 20 carbon atoms, for example, a trimethylsilyloxy group, a diphenylmethylsilyloxy group and the like.

Examples of the heterocyclic oxy group include a substituted or unsubstituted heterocyclic oxy group having 2 to 30 carbon atoms, for example, a 1-phenyltetrazol-5-oxy group, a 2-tetrahydropyranyloxy group and the like.

Preferred examples of the acyloxy group include a formyloxy group, a substituted or unsubstituted alkylcarbonyloxy group having 2 to 30 carbon atoms, and a substituted or unsubstituted arylcarbonyloxy group having 6 to 30 carbon atoms, for example, an acetyloxy group, a pyvaloyloxy group, a stearoyloxy group, a benzoyloxy group, a p-methoxyphenylcarbonyloxy group and the like.

Preferred examples of the carbamoyloxy group include a substituted or unsubstituted carbamoyloxy group having 1 to 30 carbon atoms, for example, an N,N-dimethylcarbamoyloxy group, an N,N-diethylcarbamoyloxy group, a morpholinocarbonyloxy group, an N,N-di-n-octylaminocarbonyloxy group, an N-n-octylcarbamoyloxy group and the like.

Preferred examples of the alkoxycarbonyloxy group include a substituted or unsubstituted alkoxycarbonyloxy group having 2 to 30 carbon atoms, for example, a methoxycarbonyloxy group, an ethoxycarbonyloxy group, a t-butoxycarbonyloxy group, an n-octylcarbonyloxy group and the like.

Preferred examples of the aryloxycarbonyloxy group include a substituted or unsubstituted aryloxycarbonyloxy group having 7 to 30 carbon atoms, for example, a phenoxycarbonyloxy group, a p-methoxyphenoxycarbonyloxy group, a p-n-hexadecyloxyphenoxycarbonyloxy group and the like.

Examples of the amino group include an alkylamino group, an arylamino group and a heterocyclic amino group, and preferred examples thereof include an amino group, a substituted or unsubstituted alkylamino group having 1 to 30 carbon atoms, and a substituted or unsubstituted anilino group having 6 to 30 carbon atoms, for example, a methylamino group, a dimethylamino group, an anilino group, an N-methyl-anilino group, a diphenylamino group, a triazinylamino group and the like.

Preferred examples of the acylamino group include a formylamino group, a substituted or unsubstituted alkylcarbonylamino group having 1 to 30 carbon atoms, and a substituted or unsubstituted arylcarbonylamino group having 6 to 30 carbon atoms, for example, an acetylamino group, a pyvaloylamino group, a lauroylamino group, a benzoylamino group, a 3,4,5-tri-n-octyloxyphenylcarbonylamino group and the like.

Preferred examples of the aminocarbonylamino group include a substituted or unsubstituted aminocarbonylamino group having 1 to 30 carbon atoms, for example, a carbamoylamino group, an N,N-dimethylaminocarbonylamino group, an N,N-diethylaminocarbonylamino group, a morpholinocarbonylamino group and the like.

Preferred examples of the alkoxycarbonylamino group include a substituted or unsubstituted alkoxycarbonylamino group having 2 to 30 carbon atoms, for example, a methoxycarbonylamino group, an ethoxycarbonylamino group, a t-butoxycarbonylamino group, an n-octadecyloxycarbonylamino group, an N-methyl-methoxycarbonylamino group and the like.

Preferred examples of the aryloxycarbonylamino group include a substituted or unsubstituted aryloxycarbonylamino group having 7 to 30 carbon atoms, for example, a phenoxycarbonylamino group, a p-chlorophenoxycarbonylamino group, an m-n-octyloxyphenoxycarbonylamino group and the like.

Preferred examples of the sulfamoylamino group include a substituted or unsubstituted sulfamoylamino group having 0 to 30 carbon atoms, for example, a sulfamoylamino group, an N,N-dimethylaminosulfonylamino group, an N-n-octylaminosulfonylamino group and the like.

Preferred examples of the alkyl or arylsulfonylamino group include a substituted or unsubstituted alkylsulfonylamino group having 1 to 30 carbon atoms, and a substituted or unsubstituted arylsulfonylamino group having 6 to 30 carbon atoms, for example, a methylsulfonylamino group, a butylsulfonylamino group, a phenylsulfonylamino group, a 2,3,5-trichlorophenylsulfonylamino group, a p-methylphenylsulfonylamino group and the like.

Preferred examples of the alkylthio group include a substituted or unsubstituted alkylthio group having 1 to 30 carbon atoms, for example, a methylthio group, an ethylthio group, an n-hexadecylthio group and the like.

Preferred examples of the arylthio group include a substituted or unsubstituted arylthio group having 6 to 30 carbon atoms, for example, a phenylthio group, a p-chlorophenylthio group, an m-methoxyphenylthio group and the like.

Preferred examples of the heterocyclic thio group include a substituted or unsubstituted heterocyclic thio group having 2 to 30 carbon atoms, for example, a 2-benzothiazolylthio group, a 1-phenyltetrazol-5-ylthio group and the like.

Preferred examples of the sulfamoyl group include a substituted or unsubstituted sulfamoyl group having 0 to 30 carbon atoms, for example, an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, an N—(N'-phenylcarbamoyl) sulfamoyl group and the like.

Preferred examples of the alkyl or arylsulfinyl group include a substituted or unsubstituted alkylsulfinyl group having 1 to 30 carbon atoms, and a substituted or unsubstituted arylsulfinyl group having 6 to 30 carbon atoms, for example, a methylsulfinyl group, an ethylsulfinyl group, a phenylsulfinyl group, a p-methylphenylsulfinyl group and the like.

Preferred examples of the alkyl or arylsulfonyl group include a substituted or unsubstituted alkylsulfonyl group having 1 to 30 carbon atoms, and a substituted or unsubstituted arylsulfonyl group having 6 to 30 carbon atoms, for example, a methylsulfonyl group, an ethylsulfonyl group, a phenylsulfonyl group, a p-methylphenylsulfonyl group and the like.

Preferred examples of the acyl group include a formyl group, a substituted or unsubstituted alkylcarbonyl group having 2 to 30 carbon atoms, a substituted or unsubstituted arylcarbonyl group having 7 to 30 carbon atoms, and a substituted or unsubstituted heterocyclic carbonyl group having 2 to 30 carbon atoms, which is bound via a carbon atom to a carbonyl group, for example, an acetyl group, a pyvaloyl group, a 2-chloroacetyl group, a stearoyl group, a benzoyl group, a p-n-octyloxyphenylcarbonyl group, a 2-pyridylcarbonyl group, a 2-furylcarbonyl group and the like.

Preferred examples of the aryloxycarbonyl group include a substituted or unsubstituted aryloxycarbonyl group having 7 to 30 carbon atoms, for example, a phenoxycarbonyl group, an o-chlorophenoxycarbonyl group, an m-nitrophenoxycarbonyl group, a p-t-butylphenoxycarbonyl group and the like.

Preferred examples of the alkoxycarbonyl group include a substituted or unsubstituted alkoxycarbonyl group having 2 to 30 carbon atoms, for example, a methoxycarbonyl group, an ethoxycarbonyl group, a t-butoxycarbonyl group, an n-octadecyloxycarbonyl group and the like.

Preferred examples of the carbamoyl group include a substituted or unsubstituted carbamoyl group having 1 to 30 carbon atoms, for example, a carbamoyl group, an N-methylcarbamoyl group, an N,N-dimethylcarbamoyl group, an N,N-di-n-octylcarbamoyl group, an N-(methylsulfonyl)carbamoyl group and the like.

Preferred examples of the aryl or heterocyclic azo group include a substituted or unsubstituted arylazo group having 6 to 30 carbon atoms, and a substituted or unsubstituted heterocyclic azo group having 3 to 30 carbon atoms, for example, phenylazo, p-chlorophenylazo, 5-ethylthio-1,3,4-thiadiazol-2-ylazo and the like.

Preferred examples of the imide group include an N-succinimide group, an N-phthalimide group and the like.

Preferred examples of the phosphino group include a substituted or unsubstituted phosphino group having 0 to 30 carbon atoms, for example, a dimethylphosphino group, a diphenylphosphino group, a methylphenoxyphosphino group and the like.

Preferred examples of the phosphinyl group include a substituted or unsubstituted phosphinyl group having 0 to 30 carbon atoms, for example, a phosphinyl group, a dioctyloxyphosphinyl group, a diethoxyphosphinyl group and the like.

Preferred examples of the phosphinyloxy group include a substituted or unsubstituted phosphinyloxy group having 0 to 30 carbon atoms, for example, a diphenoxyphosphinyloxy group, a dioctyloxyphosphinyloxy group and the like.

Preferred examples of the phosphinylamino group include a substituted or unsubstituted phosphinylamino group having 0 to 30 carbon atoms, for example, a dimethoxyphosphinylamino group, a dimethylaminophosphinylamino group and the like.

Preferred examples of the silyl group include a substituted or unsubstituted silyl group having 0 to 30 carbon atoms, for example, a trimethylsilyl group, a t-butyldimethylsilyl group, a phenyldimethylsilyl group and the like.

Examples of the ionic hydrophilic group include a sulfo group, a carboxyl group, a thiocarboxyl group, a sulfino group, a phosphono group, a dihydroxyphosphino group, a quaternary ammonium group and the like. The ionic hydrophilic group is particularly preferably a sulfo group or a carboxyl group. Further, the carboxyl group, the phosphono group and the sulfo group may be in a state of a salt, examples of the counter cation forming the salt include an ammonium ion, an alkali metal ion (for example, a lithium ion, a sodium ion and a potassium ion) and an organic cation (for example, a tetramethylammonium ion, a tetramethylguanidium ion and tetramethylphosphonium), a lithium salt, a sodium salt, a potassium salt, and an ammonium salt are preferred, the sodium salt or a mixture salt including the sodium salt as a main component is more preferred, and the sodium salt is most preferred.

Meanwhile, in the present invention, when the compound is a salt, the salt is dissociated and present as ions in a water-soluble ink.

[Compound Represented by Formula (1)]

A compound represented by Formula (1) will be described.

[Chem. 18]

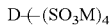 Formula (1)

In Formula (1), D represents a residue in which four hydrogen atoms are removed from a compound represented by the following Formula (2). M represents a hydrogen atom or a counter cation. A plurality of M's may be the same or different.

[Chem. 19]

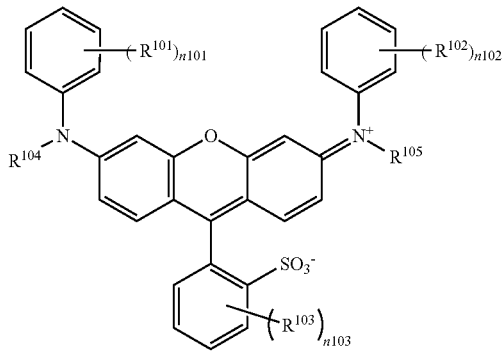 Formula (2)

In Formula (2), $R^{101}$, $R^{102}$ and $R^{103}$ each independently represent a monovalent substituent, $R^{104}$ and $R^{105}$ each independently represent a hydrogen atom or a monovalent substituent, n101 and n102 each independently represent a number of 0 to 5, and n103 represents a number of 0 to 4. When n101, n102 and n103 each represent a number of 2 or more, a plurality of $R^{101}$'s, $R^{102}$'s and $R^{103}$'s may be the same or different.

The compound represented by Formula (1) is a xanthene dye in which four hydrogen atoms are substituted with sulfo groups in the compound represented by Formula (2), and it is thought that the compound is excellent in hue, and further, becomes a dye having particularly excellent ozone resistance and light fastness due to the electron-withdrawing property possessed by the sulfo groups.

In Formula (2), $R^{101}$, $R^{102}$ and $R^{103}$ each independently represent a monovalent substituent.

Examples of the monovalent substituent represented by $R^{101}$, $R^{102}$ and $R^{103}$ include substituents selected from the Group A of substituents, and the monovalent substituent is preferably a halogen atom, an aryl group, an alkoxy group, an alkyl group and an acylamino group, more preferably an alkyl group and an acylamino group, and even more preferably an alkyl group, from the viewpoint of the availability of raw materials and the ease of synthesis.

When $R^{101}$, $R^{102}$ and $R^{103}$ represent an alkyl group, the alkyl group is preferably an alkyl group having 1 to 6 carbon atoms, and more preferably an alkyl group having 1 to 3 carbon atoms from the viewpoint of the availability of raw materials. In addition, an alkyl group having a straight or branched structure is preferred. Specific examples of the alkyl group include a methyl group, an ethyl group, an n-propyl group, an i-propyl group, a t-butyl group and the like, preferably a methyl group, an ethyl group or an i-propyl group, more preferably a methyl group or an ethyl group, and even more preferably a methyl group.

The alkyl group may have a substituent, and examples of the substituent include a halogen atom, a hydroxyl group and the like.

The alkyl group is preferably an unsubstituted alkyl group.

When $R^{101}$, $R^{102}$ and $R^{103}$ represent an acylamino group, the acyl group in the acylamino group is preferably an aliphatic acyl group, and more preferably an aliphatic acyl group having 2 to 6 carbon atoms from the viewpoint of the availability of raw materials and the chromogenic properties. Specific examples thereof include an acetylamino group, a propionylamino group, a butyrylamino group and the like, and the acyl group is particularly preferably an acetylamino group.

The acylamino group is preferably a monoacylamino group.

In Formula (2), $R^{104}$ and $R^{105}$ each independently represent a hydrogen atom or a monovalent substituent.

When $R^{104}$ and $R^{105}$ represent a monovalent substituent, examples of the monovalent substituent include substituents selected from the Group A of substituents, and the monovalent substituent is preferably a substituted or unsubstituted alkyl group, and more preferably an unsubstituted alkyl group.

From the viewpoint of absorption characteristics and ozone resistance, $R^{104}$ and $R^{105}$ are preferably a hydrogen atom.

In Formula (2), n101 and n102 each independently represent a number of 0 to 5. From the viewpoint of the availability of raw materials and the ease of synthesis, n101 and n102 are preferably a number of 1 to 5, more preferably a number of 2 to 5, even more preferably a number of 2 to 4, and particularly preferably 2 or 3.

When n101 and n102 each represent a number of 2 or more, a plurality of $R^{101}$'s and $R^{102}$'s may be the same or different.

In Formula (2), n103 represents a number of 0 to 4. From the availability of raw materials, n103 is preferably a number of 0 to 3, more preferably a number of 0 to 2, even more preferably 0 or 1, and particularly preferably 0.

When n103 represents a number of 2 or more, a plurality of $R^{103}$'s may be the same or different.

In Formula (1), M represents a hydrogen atom or a counter cation. A plurality of M's may be the same or different.

In Formula (1), when M is a hydrogen atom, the hydrogen atom is in a form of free acid, and when M is a counter cation, the counter cation is in a form of a salt.

Examples of the counter cation that forms a salt include a monovalent counter cation, and the counter cation is preferably an alkali metal ion, an ammonium ion, an organic cation and the like.

Examples of the organic cation include a tetramethylammonium ion, a tetramethylguanidium ion, tetramethylphosphonium and the like.

From the viewpoint of the availability of raw materials, the water solubility of the dye, and the suppression of gloss generation when preparing a secondary color with other dyes in a case of using as an inkjet ink, the counter cation is preferably an alkali metal ion, and more preferably a lithium ion, a sodium ion or a potassium ion. Particularly, a sodium ion is preferred because the sodium ion is inexpensive.

In the present invention, the compound represented by Formula (1) is preferably in a form of a salt, more preferably a lithium salt, a sodium salt or a potassium salt, and even more preferably a sodium salt from the viewpoint of the ease of synthesis (ease of handling as dye powder).

In Formula (1), a plurality of M's may be the same or different. That is, the compound represented by Formula (1) in a form of a salt includes a case where all sulfo groups are salts, and a case where some sulfo groups are in a form of free acid and some sulfo groups are salts. Further, the counter cation forming a salt may be present either alone or in plurality.

In the present invention, the compound represented by Formula (1) is preferably in a form of a salt, and more preferably a case where all sulfo groups are salts from the viewpoint of the ease of synthesis (ease of handling as dye powder).

It is preferred that the compound represented by Formula (1) is a compound represented by the following Formula (3).

It is thought that the compound represented by Formula (3) is particularly excellent from the viewpoint of the ozone resistance and light fastness because it is possible to suppress oxidative gas (oxygen or ozone) from attacking a nitrogen atom by the steric hindrance of a sulfo group introduced in the vicinity of the nitrogen atom.

[Chem. 20]

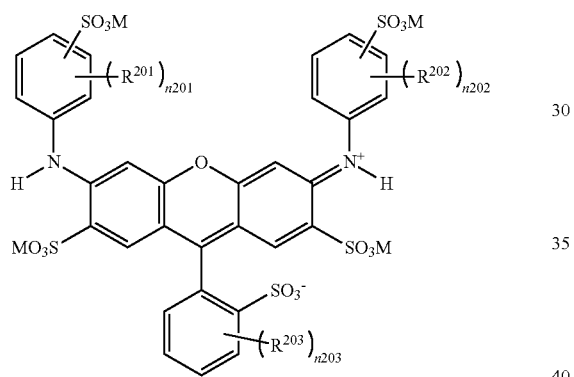

Formula (3)

In Formula (3), $R^{201}$, $R^{202}$ and $R^{203}$ each independently represent a monovalent substituent, n201 and n202 each independently represent a number of 0 to 4, and n203 represents a number of 0 to 4. When n201, n202 and n203 each represent a number of 2 or more, a plurality of $R^{201}$'s, $R^{202}$'s and $R^{203}$'s may be the same or different. M represents a hydrogen atom or a counter cation. A plurality of M's may be the same or different.

Specific examples and preferred ranges of $R^{201}$, $R^{202}$, $R^{203}$, n203 and M in Formula (3) are the same as the specific examples and preferred ranges of $R^{101}$, $R^{102}$, $R^{103}$, n103 and M in Formula (2).

In Formula (3), n201 and n202 each independently represent a number of 0 to 4, and are preferably a number of 1 to 4, and more preferably 2 or 3 from the viewpoint of the availability of raw materials and the ease of synthesis.

Hereinafter, specific examples of the compound represented by Formula (1) will be described, but the compound is not limited thereto. Meanwhile, in the following specific examples, Me denotes a methyl group, Et denotes an ethyl group, i-Pr denotes an isopropyl group, t-Bu denotes a tertiary butyl group, and Ac denotes an acetyl group.

[Chem. 21]

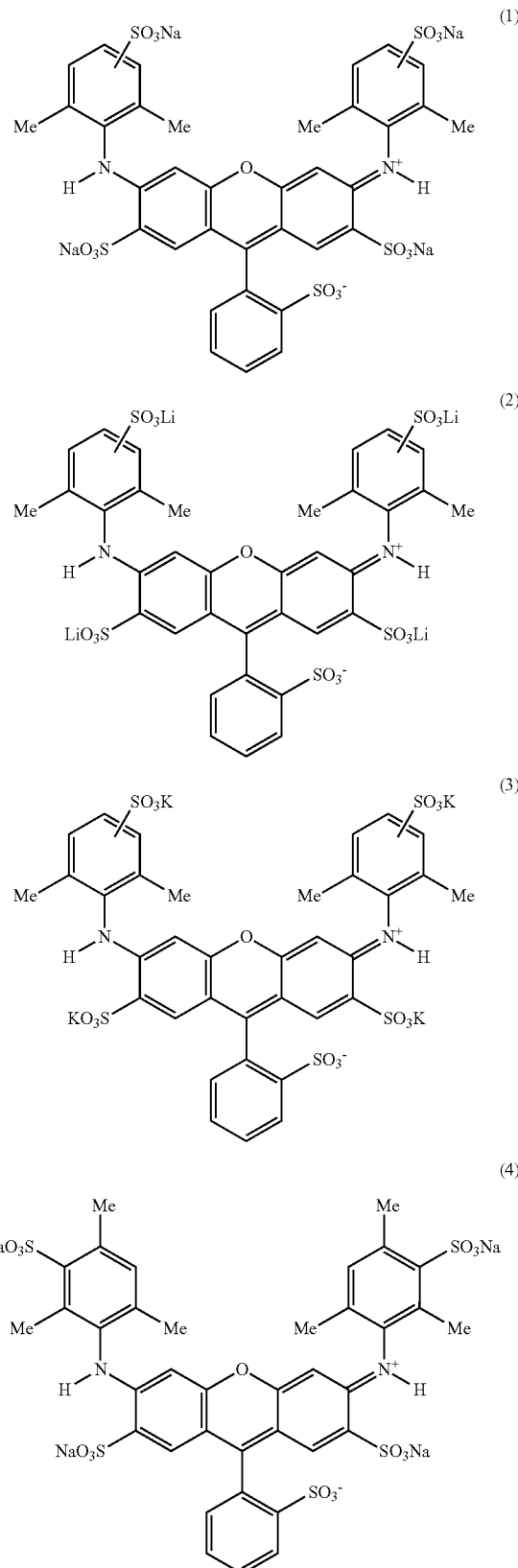

-continued
(5)
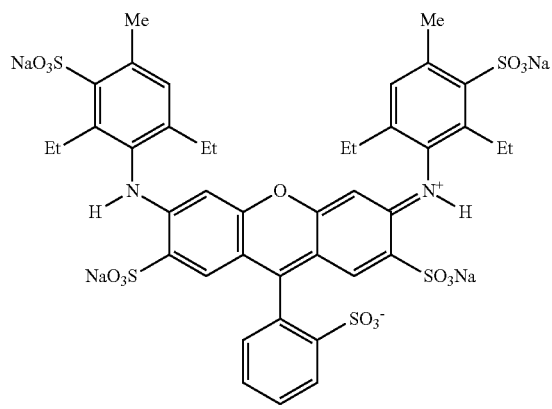
(6)
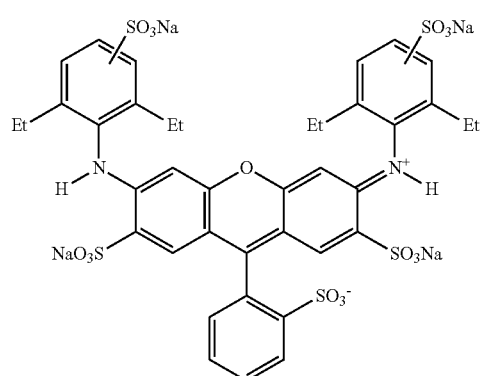
(7)
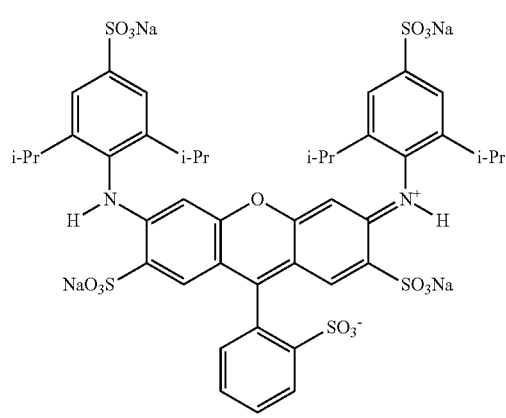
(8)
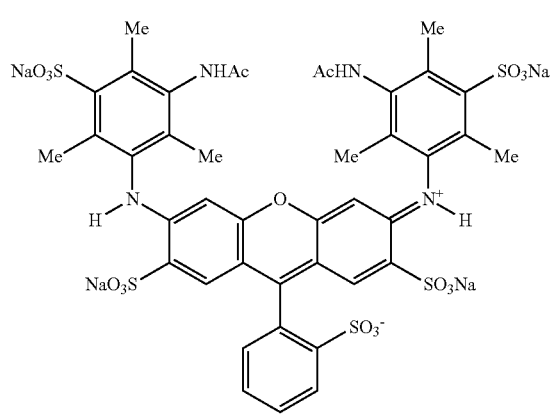
-continued
[Chem. 22]
(9)
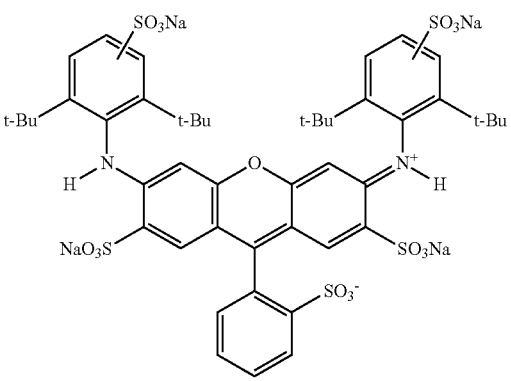
(10)
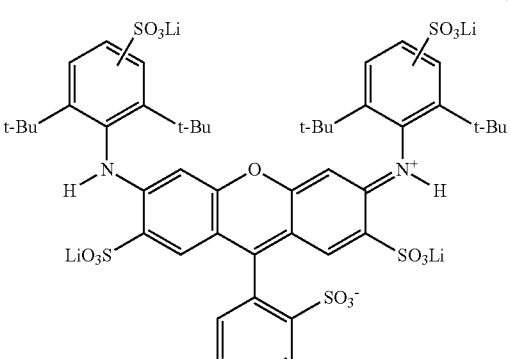
(11)
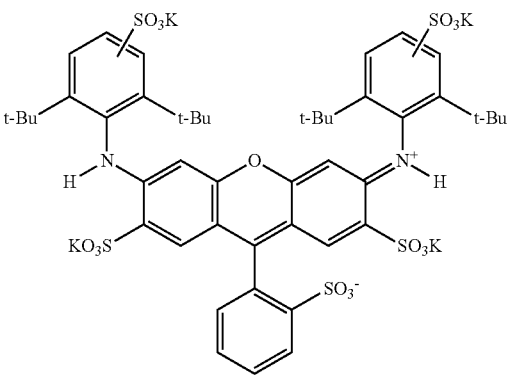
(12)
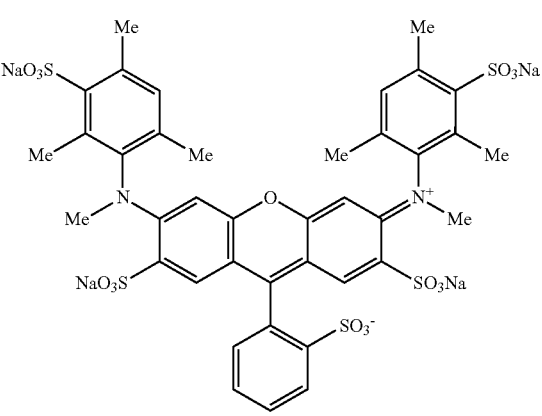

-continued
(13)
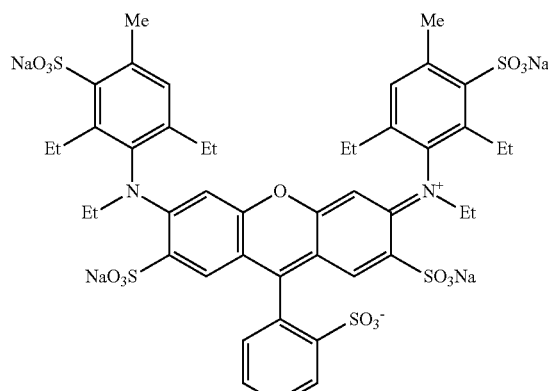
(14)
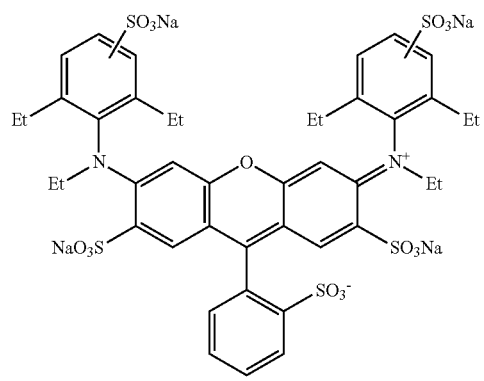
(15)
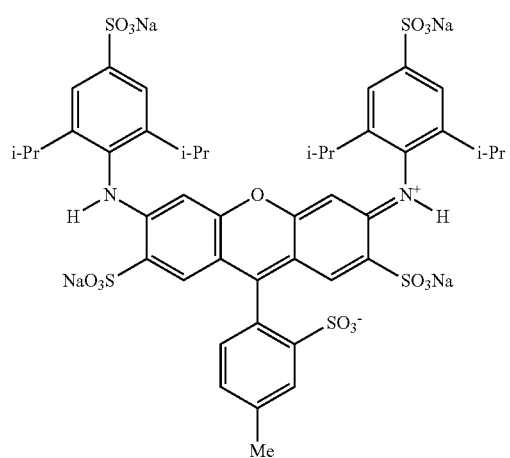
-continued
(16)
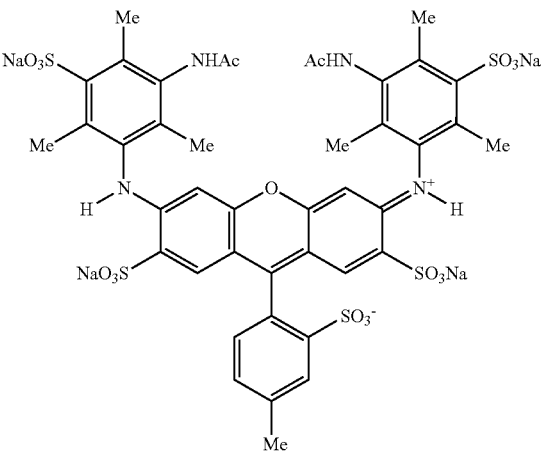
[Chem. 23]
(17)
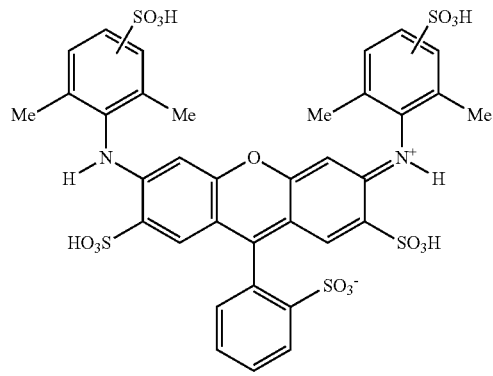
(18)
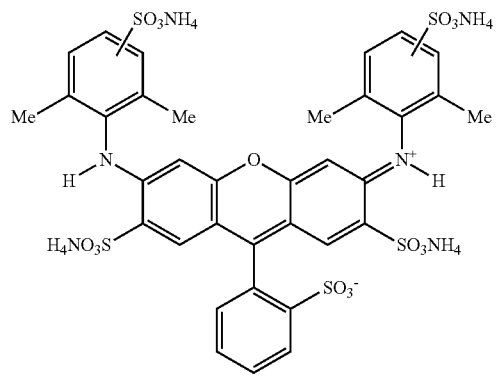

(19)
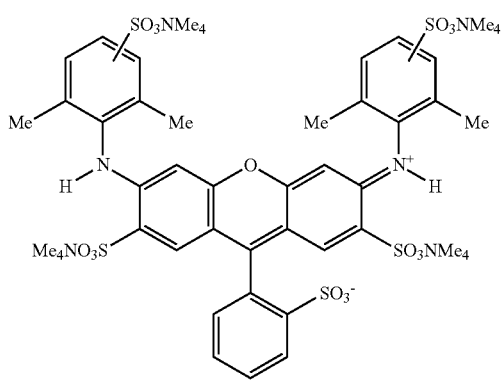

(20)
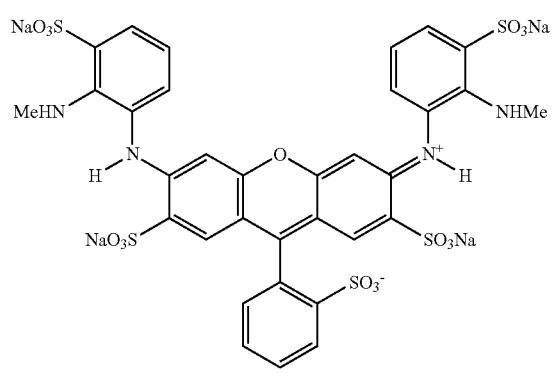

(21)
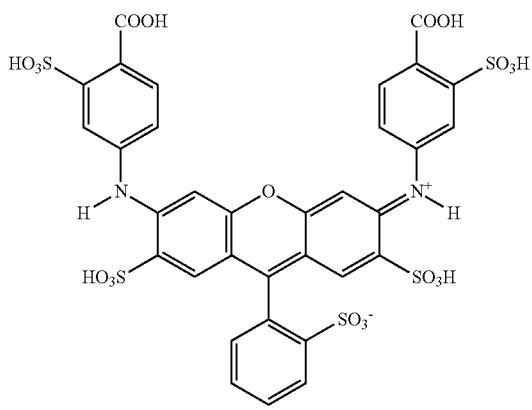

(22)
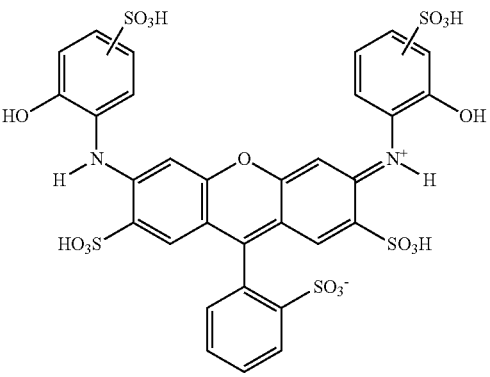

(23)
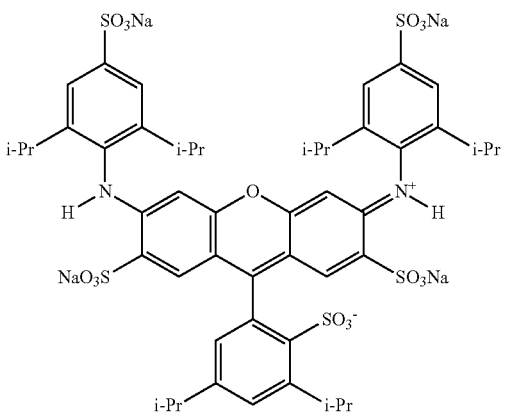

(24)
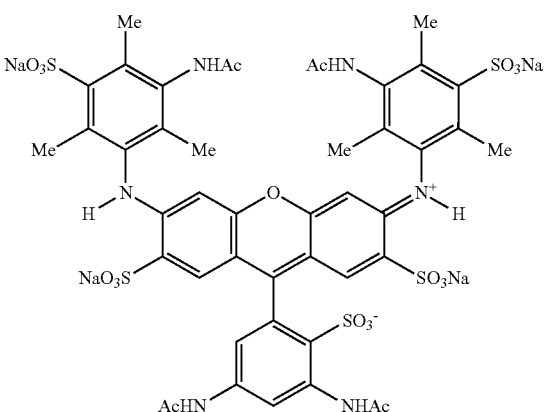

Subsequently, a method of synthesizing the compound represented by Formula (1) will be described.

The compound may be synthesized by synthesizing a xanthene dye in accordance with the method of synthesizing a xanthene dye publicly known in the related art, or using a commercially available xanthene dye, achieving chlorosulfonylation by using chlorosulfonic acid/phosphorous oxychloride in combination, and then performing alkaline hydrolysis (see the following scheme). Details will be exemplified in the Examples to be described below.

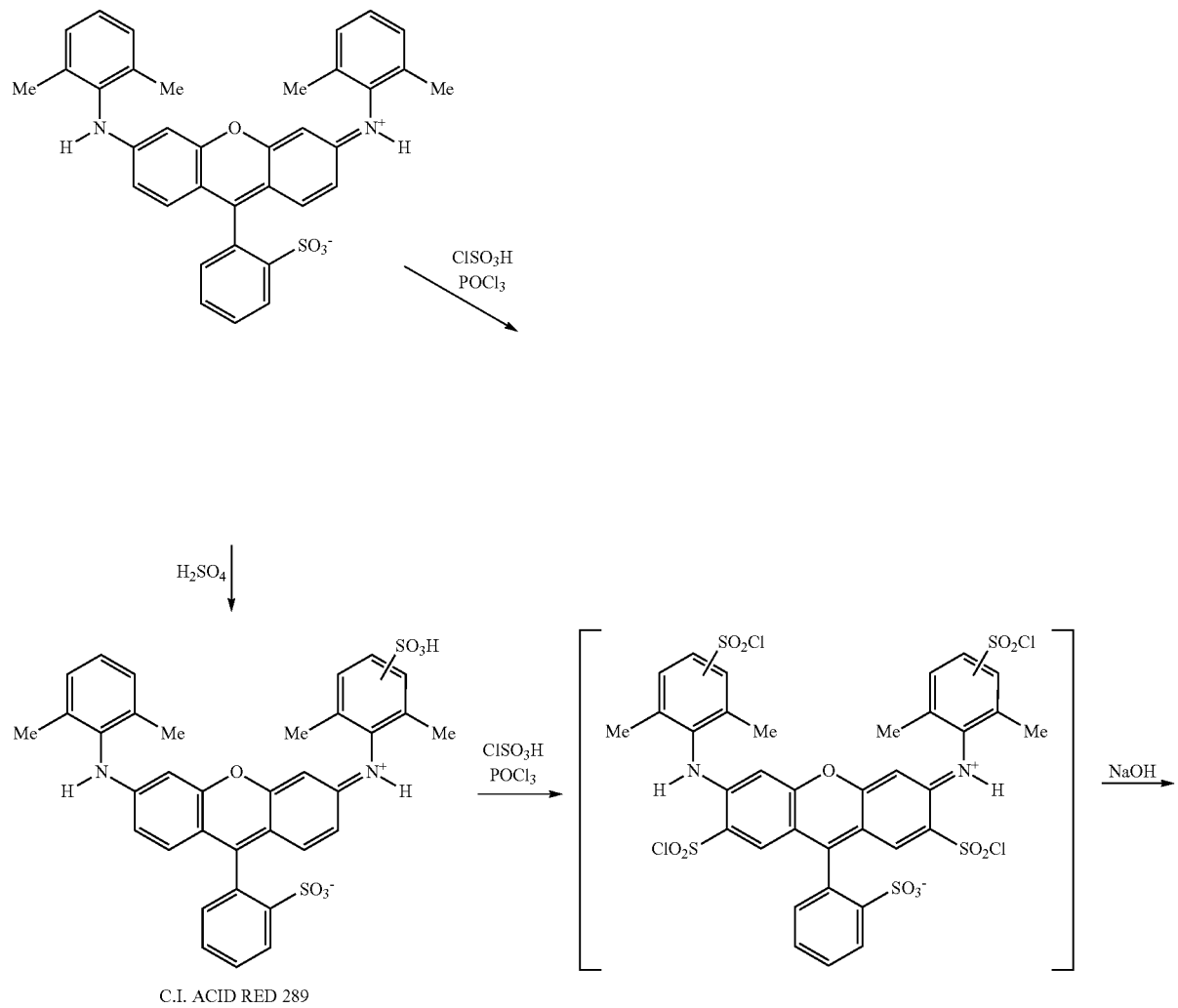
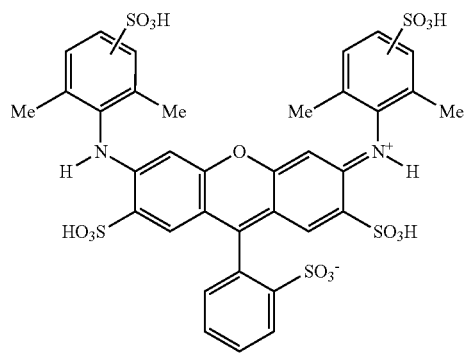

[Compound Represented by Formula (11)]

Subsequently, a compound represented by the following Formula (11) will be described.

[Chem. 25]

Formula (11)

In Formula (11), D represents a residue in which n hydrogen atoms are removed from a compound represented by the following Formula (2), and n represents a number of 3 to 6. M represents a hydrogen atom or a counter cation. A plurality of M's may be the same or different.

[Chem. 26]

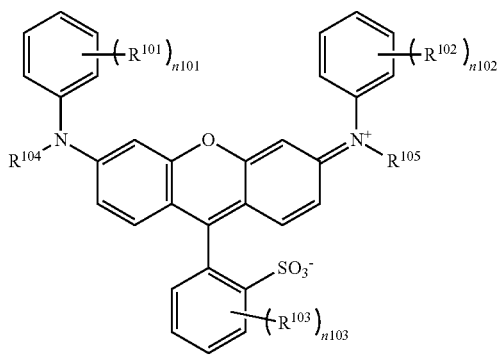

Formula (2)

In Formula (2), $R^{101}$, $R^{102}$ and $R^{103}$ each independently represent a monovalent substituent, $R^{104}$ and $R^{105}$ each independently represent a hydrogen atom or a monovalent substituent, n101 and n102 each independently represent a number of 0 to 5, and n103 represents a number of 0 to 4. When n101, n102 and n103 each represent a number of 2 or more, a plurality of $R^{101}$'s, $R^{102}$'s and $R^{103}$'s may be the same or different.

The compound represented by Formula (11) is a xanthene dye in which 3 to 6 hydrogen atoms are substituted with sulfo groups in the compound represented by Formula (2).

In Formula (11), n represents a number of 3 to 6, and is preferably 4 to 6, more preferably 4 or 5, and even more preferably 4 from the viewpoint of synthesis.

In Formula (2), $R^{101}$, $R^{102}$ and $R^{103}$ each independently represent a monovalent substituent.

Examples of the monovalent substituent represented by $R^{101}$, $R^{102}$ and $R^{103}$ include substituents selected from the Group A of substituents, and the monovalent substituent is preferably a halogen atom, an aryl group, an alkoxy group, an alkyl group and an acylamino group, more preferably an alkyl group and an acylamino group, and even more preferably an alkyl group from the viewpoint of the availability of raw materials and the ease of synthesis.

When $R^{101}$, $R^{102}$ and $R^{103}$ represent an alkyl group, the alkyl group is preferably an alkyl group having 1 to 6 carbon atoms, and more preferably an alkyl group having 1 to 3 carbon atoms from the viewpoint of the availability of raw materials. In addition, an alkyl group having a straight or branched structure is preferred. Specific examples of the alkyl group include a methyl group, an ethyl group, an n-propyl group, an i-propyl group, a t-butyl group and the like, preferably a methyl group, an ethyl group or an i-propyl group, more preferably a methyl group or an ethyl group, and even more preferably a methyl group.

The alkyl group may have a substituent, and examples of the substituent include a halogen atom, a hydroxyl group and the like.

The alkyl group is preferably an unsubstituted alkyl group.

When $R^{101}$, $R^{102}$ and $R^{103}$ represent an acylamino group, the acyl group in the acylamino group is preferably an aliphatic acyl group, and more preferably an aliphatic acyl group having 2 to 6 carbon atoms from the viewpoint of the availability of raw materials and the chromogenic properties. Specific examples thereof include an acetylamino group, a propionylamino group, a butyrylamino group and the like, and the acyl group is particularly preferably an acetylamino group.

The acylamino group is preferably a monoacylamino group.

In Formula (2), $R^{104}$ and $R^{105}$ each independently represent a hydrogen atom or a monovalent substituent.

When $R^{104}$ and $R^{105}$ represent a monovalent substituent, examples of the monovalent substituent include substituents selected from the Group A of substituents, and the monovalent substituent is preferably a substituted or unsubstituted alkyl group, and more preferably an unsubstituted alkyl group.

From the viewpoint of absorption characteristics and ozone resistance, $R^{104}$ and $R^{105}$ are preferably a hydrogen atom.

In Formula (2), n101 and n102 each independently represent a number of 0 to 5. From the viewpoint of the availability of raw materials and the ease of synthesis, n101 and n102 are preferably a number of 1 to 5, more preferably a number of 2 to 5, even more preferably a number of 2 to 4, and particularly preferably 2 or 3.

When n101 and n102 each represent a number of 2 or more, a plurality of $R^{101}$'s and $R^{102}$'s may be the same or different.

In Formula (2), n103 represents a number of 0 to 4. From the availability of raw materials, n103 is preferably a number of 0 to 3, more preferably a number of 0 to 2, even more preferably 0 or 1, and particularly preferably 0.

When n103 represents a number of 2 or more, a plurality of $R^{103}$'s may be the same or different.

In Formula (11), M represents a hydrogen atom or a counter cation. A plurality of M's may be the same or different.

In Formula (11), when M is a hydrogen atom, the hydrogen atom is in a form of free acid, and when M is a counter cation, the counter cation is in a form of a salt.

Examples of the counter cation that forms a salt include a monovalent counter cation, and the counter cation is preferably an alkali metal ion, an ammonium ion, an organic cation and the like.

Examples of the organic cation include a tetramethylammonium ion, a tetramethylguanidium ion, tetramethylphosphonium and the like.

From the viewpoint of the availability of raw materials, the water solubility of the dye, and the suppression of gloss generation when preparing a secondary color with other dyes in a case of using as an inkjet ink, the counter cation is preferably an alkali metal ion, and more preferably a lithium ion, a sodium ion or a potassium ion. Particularly, a sodium ion is preferred because the sodium ion is inexpensive.

In the present invention, the compound represented by Formula (11) is preferably in a form of a salt, more preferably a lithium salt, a sodium salt or a potassium salt, and even more preferably a sodium salt from the viewpoint of the ease of synthesis (ease of handling as dye powder).

In Formula (11), A plurality of M's may be the same or different. That is, the compound represented by Formula (11)

in a form of a salt includes a case where all sulfo groups are salts, and a case where some sulfo groups are in a form of free acid and some sulfo groups are salts. Furthermore, the counter cation forming a salt may be present either alone or in plurality.

In the present invention, the compound represented by Formula (11) is preferably in a form of a salt, and more preferably a case where all sulfo groups are salts from the viewpoint of the ease of synthesis (ease of handling as dye powder).

It is preferred that the compound represented by Formula (11) is a compound represented by the following Formula (3).

It is thought that a compound represented by the following Formula (3) is particularly excellent from the viewpoint of the ozone resistance and light fastness because it is possible to suppress oxidative gas (oxygen or ozone) from attacking a nitrogen atom by the steric hindrance of a sulfo group introduced in the vicinity of the nitrogen atom.

[Chem. 27]

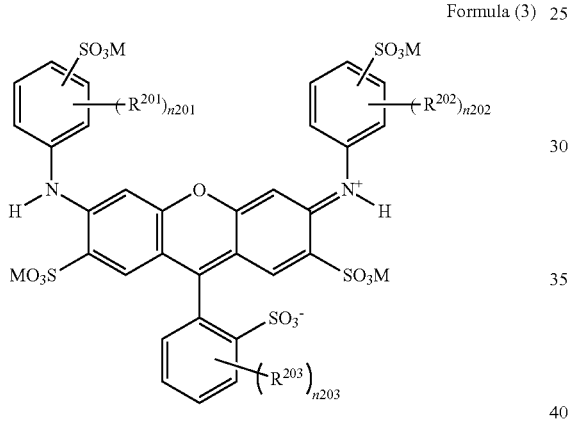

Formula (3)

In Formula (3), $R^{201}$, $R^{202}$ and $R^{203}$ each independently represent a monovalent substituent, n201 and n202 each independently represent a number of 0 to 4, and n203 represents a number of 0 to 4. When n201, n202 and n203 each represent a number of 2 or more, a plurality of $R^{201}$'s, $R^{202}$'s and $R^{203}$'s may be the same or different. M represents a hydrogen atom or a counter cation. A plurality of M's may be the same or different.

Specific examples and preferred ranges of $R^{201}$, $R^{202}$, $R^{203}$, n203 and M in Formula (3) are the same as the specific examples and preferred ranges of $R^{101}$, $R^{102}$, $R^{103}$ and n103 in Formula (2) and M in Formula (1).

In Formula (3), n201 and n202 each independently represent a number of 0 to 4, and are preferably a number of 1 to 4, preferably 2 to 4, and more preferably 2 or 3 from the viewpoint of the availability of raw materials and the ease of synthesis.

Hereinafter, specific examples of the compound represented by Formula (11) will be described, but the compound is not limited thereto. Meanwhile, in the following specific examples, Me denotes a methyl group, Et denotes an ethyl group, i-Pr denotes an isopropyl group, t-Bu denotes a tertiary butyl group, and Ac denotes an acetyl group.

[Chem. 28]

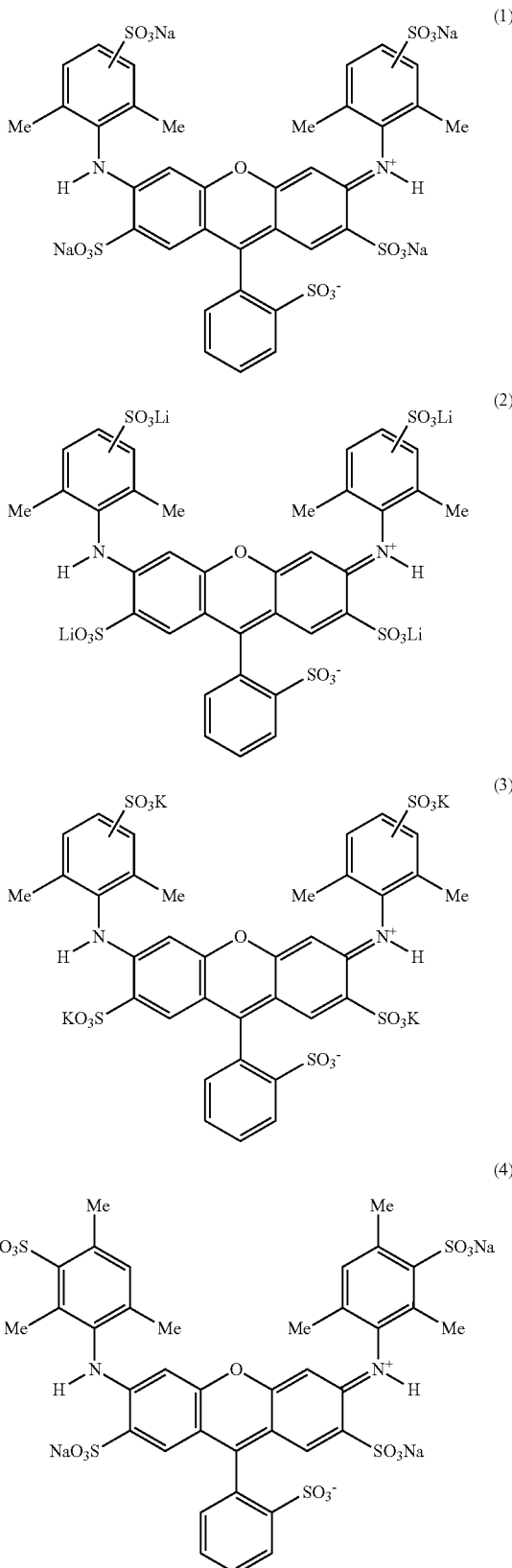

-continued
(5)
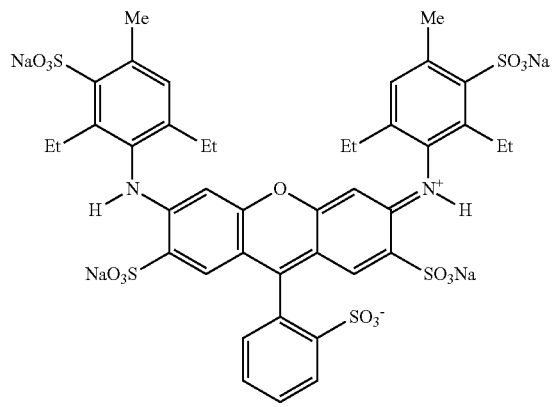
(6)
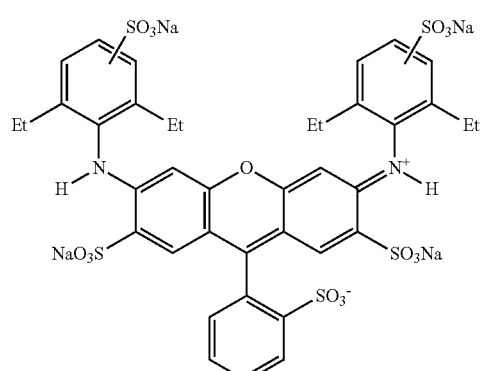
(7)
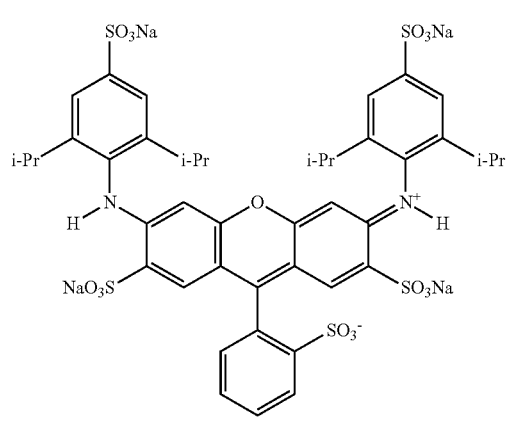
(8)
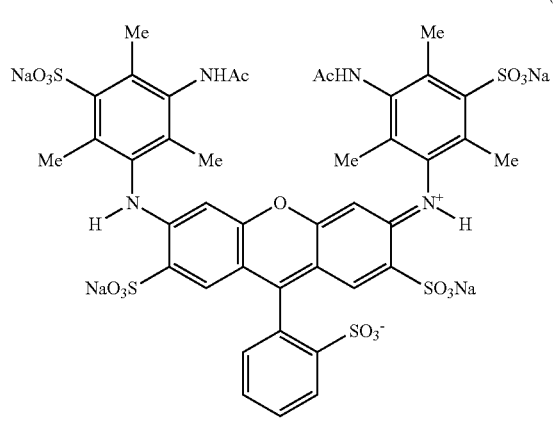
[Chem. 29]
(9)
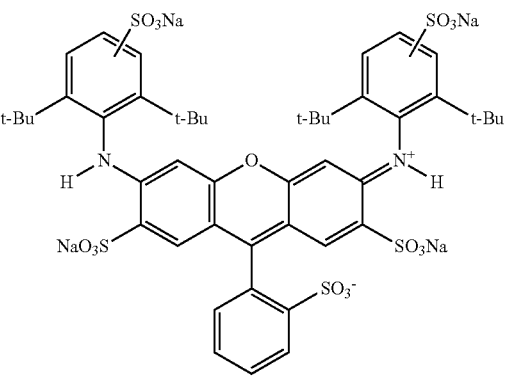
(10)
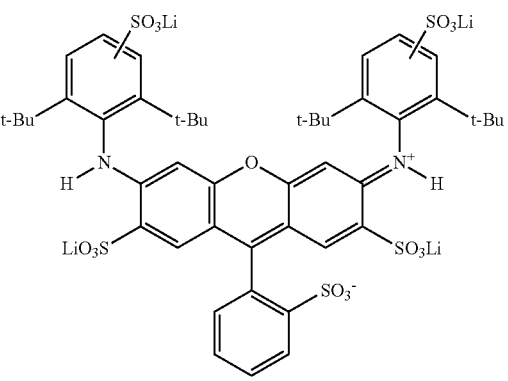
(11)
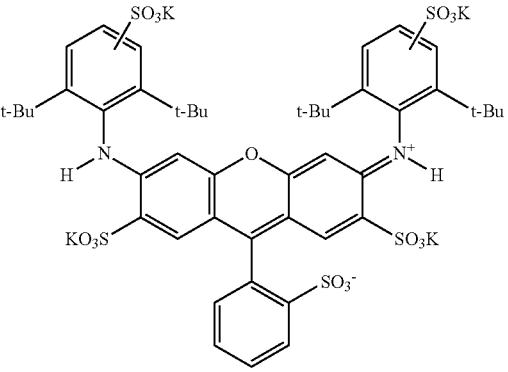
(12)
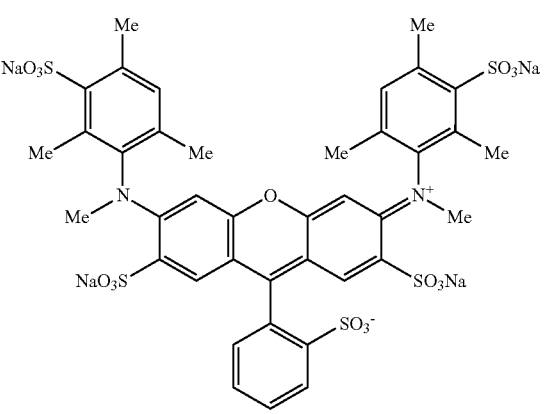

(13)
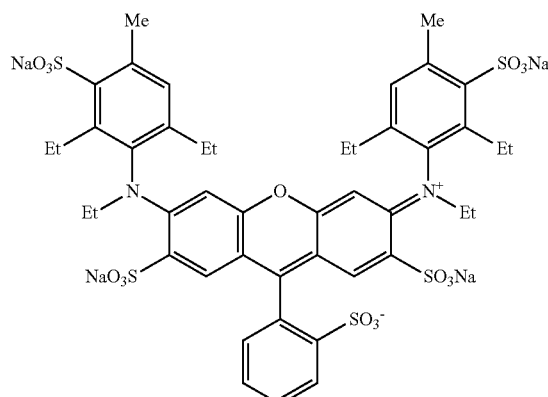
(16)
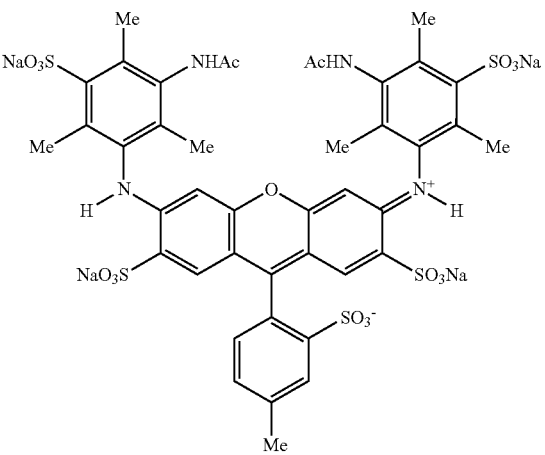
(14)
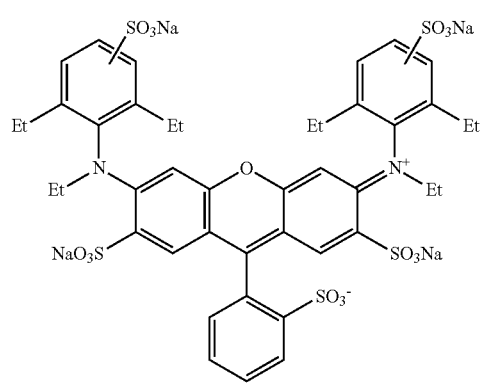
[Chem. 30]
(17)
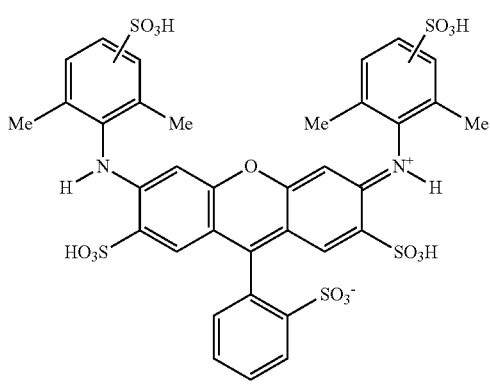
(15)
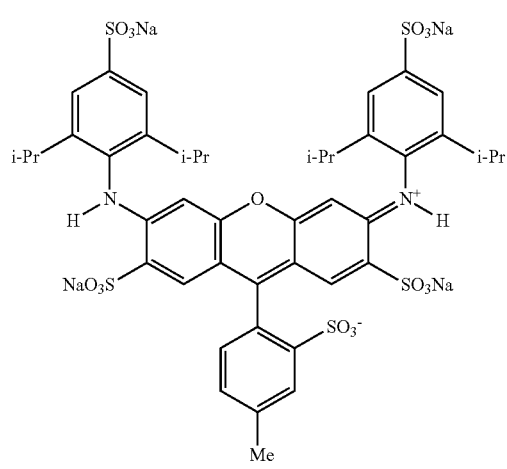
(18)
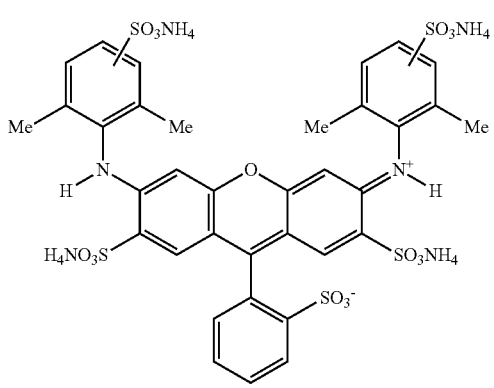

(19) 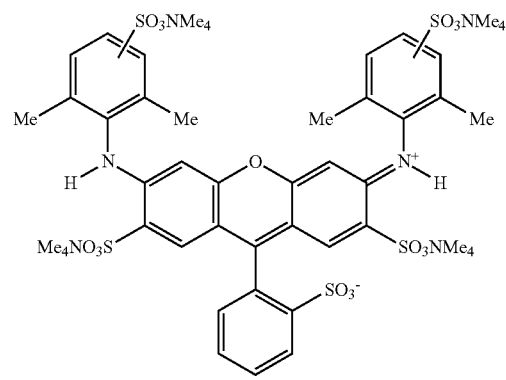
(20) 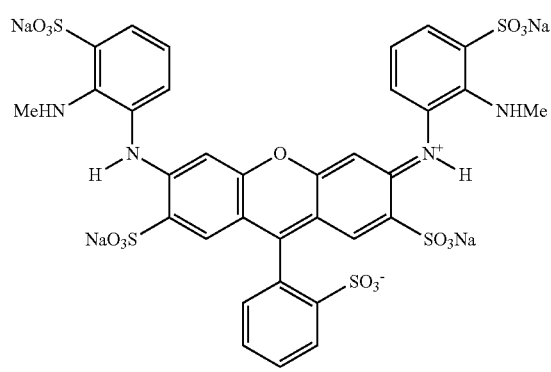
(21) 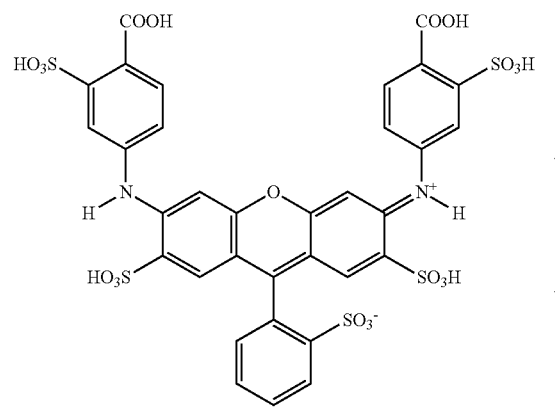
(22) 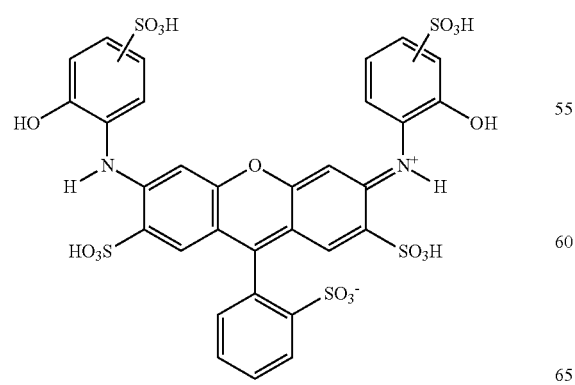
(23) 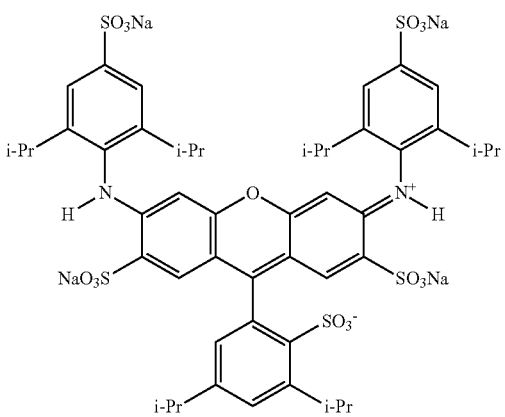
(24) 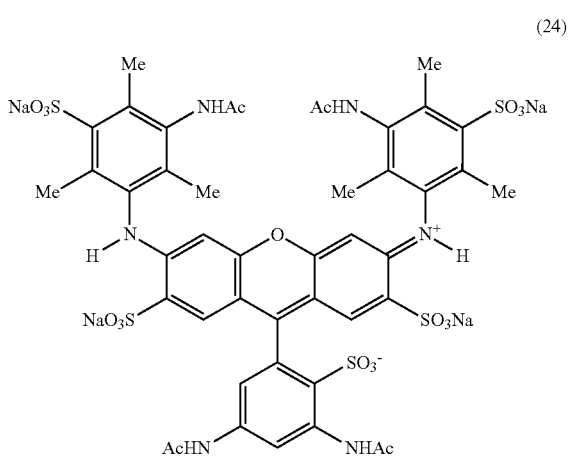
[Chem. 31]
(25) 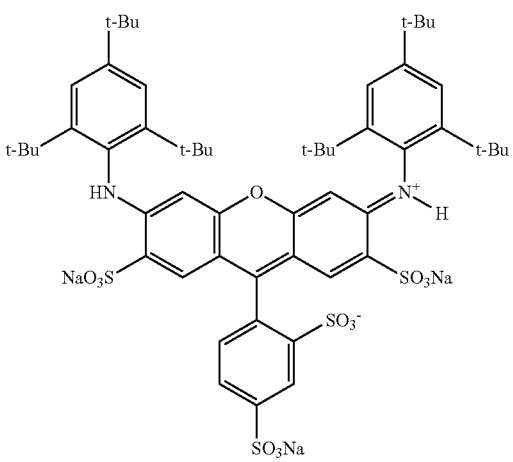

(26)

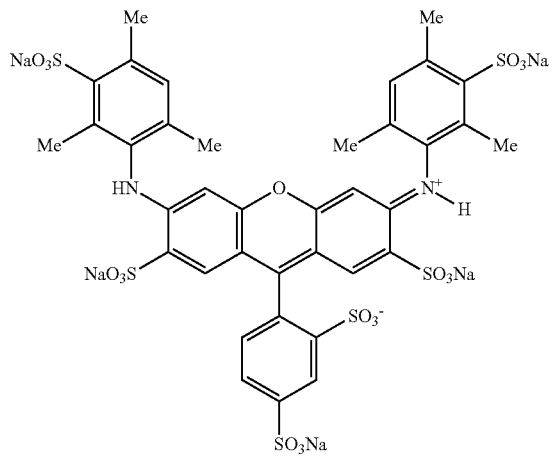

(27)

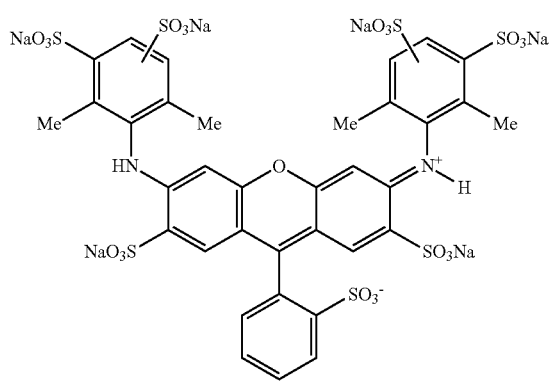

(28)

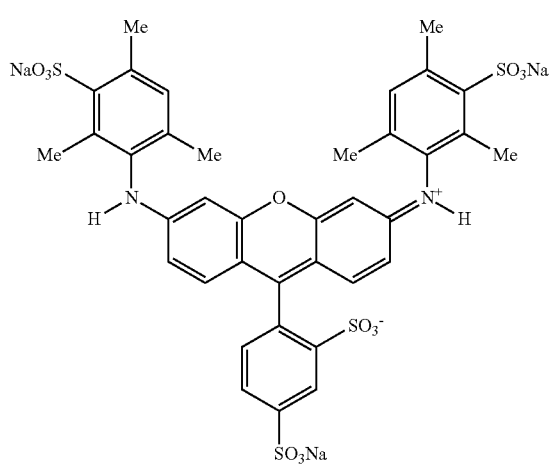

Subsequently, a method of synthesizing the compound represented by Formula (11) will be described.

The compound may be synthesized by synthesizing a xanthene dye in accordance with the method of synthesizing a xanthene dye publicly known in the related art, or using a commercially available xanthene dye, achieving chlorosulfonylation by using chlorosulfonic acid/phosphorous oxychloride in combination, and then performing alkaline hydrolysis (see the following scheme). Details will be exemplified in the Examples to be described below.

[Compound Represented by Formula (14)]

The compound having the specific xanthene skeleton represented by Formula (11) or a salt thereof, and the coloring composition including the specific heterylazo compound represented by Formula (14) are sufficiently compatible with both image fastness such as ozone resistance and light fastness and good hue.

Since the compound has excellent ozone resistance by using the compound represented by Formula (11) and the compound represented by Formula (14) in combination, ozone resistance is enhanced so that light fastness is enhanced by the shift of energy from the xanthene dye represented by Formula (11) to the compound represented by Formula (14), and further, it is thought that by excellent hue in the xanthene dye represented by Formula (11), the compound represented by Formula (14), which deteriorates in hue, is averaged and a coloring composition which is excellent in hue may be prepared.

[Chem. 33]

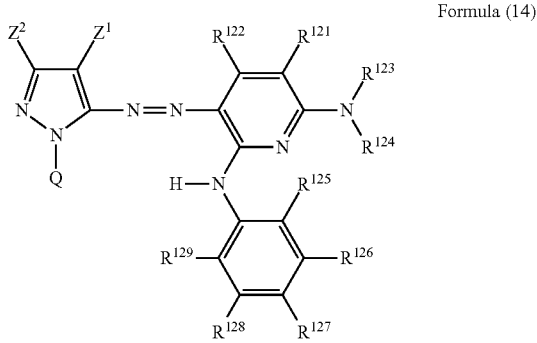

Formula (14)

In Formula (14), $Z^1$ represents an electron-withdrawing group having a Hammett's substituent constant σp value of 0.20 or more.

$Z^2$ represents a hydrogen atom, an aliphatic group, an aromatic group, an acyl group or a heterocyclic group.

$R^{123}$ and $R^{124}$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group. Provided that there is no case where both $R^{123}$ and $R^{124}$ are a hydrogen atom at the same time.

$R^{121}$ and $R^{122}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an alkylamino group, an arylamino group, a heterocyclic amino group, an acylamino group, a ureido group, a sulfamoylamino group, an alkoxycarbonylamino group, an aryloxycarbonylamino group, an alkyl or arylsulfonylamino group, an aryloxycarbonylamino group, a nitro group, an alkyl or arylthio group, an alkyl or arylsulfonyl group, an alkyl or arylsulfinyl group, a sulfamoyl group, a sulfo group or a heterocyclic thio group. Further, $R^{121}$ and $R^{123}$ or $R^{123}$ and $R^{124}$ may combine with each other to form a 5- or 6-membered ring.

$R^{125}$ and $R^{129}$ each independently represent an alkyl group, an alkoxy group or a halogen atom. Provided that when both $R^{125}$ and $R^{129}$ are an alkyl group at the same time, the sum of the number of carbon atoms constituting the alkyl group is 3 or more, and these groups may be further substituted.

$R^{126}$, $R^{127}$ and $R^{128}$ each independently have the same meaning as $R^{121}$ and $R^{122}$, and $R^{125}$ and $R^{126}$, or $R^{128}$ and $R^{129}$ may be condensed with each other to form a ring.

Q represents a hydrogen atom, an aliphatic group, an aromatic group or a heterocyclic group.

Each group of $Z^1$, $Z^2$, $R^{121}$, $R^{122}$, $R^{123}$, $R^{124}$ and Q may further have a substituent.

Provided that Formula (14) has at least one ionic hydrophilic group.

In Formula (14), $Z^1$ represents an electron-withdrawing group having a Hammett's substituent constant σp value of 0.20 or more.

(Hammett's Substituent Constant σp Value)

The Hammett's substituent constant σp value used in the present specification will be described. The Hammett's rule is an empirical rule proposed by L. P. Hammett in 1935 in order to quantitatively discuss an influence of substituent groups exerted on reaction or equilibrium of a benzene derivative, and the validity of this rule is widely recognized today. The substituent constant required by the Hammett's rule includes an σp value and an σm value, and these values are disclosed in many general literatures, the details of which are described in, for example, J. A. Dean, Ed., "Lange's Handbook of Chemistry", 12th Edition, 1979 (McGraw-Hill) or "Realms of Chemistry" special issue, No. 122, pp. 96 to 103, 1979 (Nankodo). Meanwhile, each substituent in the present invention is limited or described by the substituent constant σp of Hammett, but it is not meant that the substituents are not limited only to a substituent group which may be found in the aforementioned literatures and the value of which is already known in the literatures, but even if the value is not yet known in the literatures, the substituent will be definitely included in the present invention as long as the value falls within the range when measured on the basis of the Hammett's rule.

The electron-withdrawing group of $Z^1$ is an electron-withdrawing group having a Hammett's substituent constant σp value of 0.20 or more, and more preferably 0.30 or more. The upper limit of the σp value is preferably 1.0 or less.

Specific examples of the electron-withdrawing group having an σp value of 0.20 or more include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, a heterocyclic group, a halogen atom, an azo group, a selenocyanate group and an aryl group substituted with another electron-withdrawing group having an σp value of 0.20 or more.

From the viewpoint of hue and fastness, $Z^1$ is preferably a cyano group, a nitro group or a halogen atom, more preferably a halogen atom or a cyano group, and most preferably a cyano group.

In Formula (14), $Z^2$ represents a hydrogen atom, an aliphatic group, an aromatic group, an acyl group or a heterocyclic group.

Examples of the aliphatic group include an alkyl group, a cycloalkyl group and the like.

Examples of the aromatic group include an aryl group and the like.

Further, examples of a group corresponding to the aromatic group and the aliphatic group include an aralkyl group.

The alkyl group is preferably an alkyl group having 1 to 12 carbon atoms, and more preferably an alkyl group having 1 to 6 carbon atoms, and examples thereof include a methyl group, an ethyl group, a butyl group, an isopropyl group, a t-butyl group and the like.

The alkyl group may have a substituent, and examples of the substituent include the above-described Group A of substituents, and the substituent is preferably a hydroxyl group, an alkoxy group, a cyano group, a halogen atom and an ionic hydrophilic group.

Examples of the alkyl group having a substituent include a hydroxyethyl group, a methoxyethyl group, a cyanoethyl group, a trifluoromethyl group, a 3-sulfopropyl group, a 4-sulfobutyl group and the like.

The cycloalkyl group is preferably a cycloalkyl group having 5 to 12 carbon atoms, and examples thereof include a cyclohexyl group and the like.

The cycloalkyl group may have a substituent, examples of the substituent include the above-described Group A of substituents, and the substituent is preferably an ionic hydrophilic group.

The aralkyl group is preferably an aralkyl group having 7 to 12 carbon atoms, and examples thereof include a benzyl group, a 2-phenethyl group and the like.

The aralkyl group may have a substituent, examples of the substituent include the above-described Group A of substituents, and the substituent is preferably an ionic hydrophilic group.

The aryl group is preferably an aryl group having 6 to 12 carbon atoms, and examples thereof include a phenyl group, a naphthyl group and the like.

The aryl group may have a substituent, examples of the substituent include the above-described Group A of substituents, an amide group, a sulfonamide group, an ester group and the like, and the substituent is preferably an alkyl group, an alkoxy group, a halogen atom, an alkylamino group, an amide group, a carbamoyl group, a sulfamoyl group, a sulfonamide group, a hydroxyl group, an ester group or an ionic hydrophilic group.

Examples of the aryl group having a substituent include a p-tolyl group, a p-methoxyphenyl group, o-chlorophenyl, a m-(3-sulfopropylamino)phenyl group and the like.

The heterocyclic group is preferably a 5- or 6-membered heterocyclic group, and examples thereof include a 2-pyridyl group, a 2-thienyl group, a 2-thiazolyl group, a 2-benzothiazolyl group, a 2-benzoxazolyl group, a 2-furyl group, and the like.

The heterocyclic group may have a substituent, examples of the substituent include the above-described Group A of substituents, an amide group, a sulfonamide group, an ester group and the like, and the substituent is preferably an amide group, a carbamoyl group, a sulfamoyl group, a sulfonamide group, a hydroxyl group, an ester group and an ionic hydrophilic group.

The acyl group is preferably an acyl group having 1 to 12 carbon atoms, and examples thereof include an acetyl group, a benzoyl group and the like.

The acyl group may have a substituent, examples of the substituent include the above-described Group A of substituents, and the substituent is preferably an ionic hydrophilic group.

As $Z^2$, an alkyl group or an aryl group is preferred, an alkyl group having 3 or 4 carbon atoms (preferably an isopropyl group or a t-butyl group), a phenyl group, or a phenyl group further having a substituent at any one of the 2-, 4- and 6-positions looking from the pyrazole mother nucleus side is more preferred, and a t-butyl group is even more preferred.

In Formula (14), $R^{123}$ and $R^{124}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group.

Examples of the aliphatic group include an alkyl group, a cycloalkyl group, an alkenyl group, an alkynyl group and the like.

Examples of the aromatic group include an aryl group and the like.

In addition, examples of a group corresponding to the aromatic group and the aliphatic group include an aralkyl group.

Provided that there is no case where both $R^{123}$ and $R^{124}$ are a hydrogen atom at the same time.

Examples of the alkyl group, the cycloalkyl group, the aralkyl group, the aryl group, the heterocyclic group and the acyl group include each group described in the above-described $Z^2$.

Each group may further have a substituent, and examples of the substituent are also the same as the examples described in the above-described $Z^2$.

The alkenyl group is preferably an alkenyl group having 5 to 12 carbon atoms, and examples thereof include a vinyl group, an allyl group and the like.

The alkenyl group may have a substituent, examples of the substituent include the above-described Group A of substituents, and the substituent is preferably an ionic hydrophilic group.

Examples of the alkoxycarbonyl group, the aryloxycarbonyl group, the carbamoyl group, the alkylsulfonyl group, the arylsulfonyl group, the sulfamoyl group and the alkynyl group include each group described in the above-described Group A of substituents.

Each group may further have a substituent, and examples of the substituent include the above-described Group A of substituents.

From the viewpoint of hue, $R^{123}$ and $R^{124}$ are each independently preferably a hydrogen atom, an alkyl group, a cycloalkyl group, an aralkyl group, an alkenyl group, an aromatic group, a heterocyclic group, a sulfonyl group, an acyl group or a carbamoyl group, more preferably a hydrogen atom, an alkyl group, an aralkyl group, an aromatic group, a heterocyclic group, a sulfonyl group or an acyl group, and even more preferably a hydrogen atom, an aromatic group or a heterocyclic group.

It is particularly preferred that $R^{123}$ is a hydrogen atom or a heterocyclic group, and $R^{124}$ is an aromatic group.

As the heterocyclic group, preferably, a benzoxazolyl group or a benzothiazolyl group is particularly preferred, and more specifically, an unsubstituted benzothiazolyl group or a benzothiazolyl group in which a sulfo group (also includes a state of a salt) is substituted is preferred.

The aromatic group is preferably an aryl group in which at least one group selected from an alkyl group and a sulfo group (also includes a state of a salt) is substituted, and particularly preferably a phenyl group in which at least one group selected from an alkyl group and a sulfo group is substituted.

Specific examples and preferred ranges of a counter cation in the case where the sulfo group is in the state of a salt are the same as specific examples and preferred ranges of the case where the compound represented by Formula (11) becomes a salt.

In Formula (14), $R^{121}$ and $R^{122}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an alkylamino group, an arylamino group, a heterocyclic amino group, an acylamino group, a ureido group, a sulfamoylamino group, an alkoxycarbonylamino group, an aryloxycarbonylamino group, an alkyl or arylsulfonylamino group, an aryloxycarbonylamino group, a nitro group, an alkyl or arylthio group, an alkyl or arylsulfonyl group, an alkyl or arylsulfinyl group, a sulfamoyl group, a sulfo group or a heterocyclic thio group. Furthermore, $R^{121}$ and $R^{123}$ or $R^{123}$ and $R^{124}$ may combine with each other to form a 5- or 6-membered ring.

Examples of the aliphatic group include an alkyl group, a cycloalkyl group, an alkenyl group, an alkynyl group and the like.

Examples of the aromatic group include an aryl group and the like.

Further, examples of a group corresponding to the aromatic group and the aliphatic group include an aralkyl group.

Specific examples of each group represented by $R^{121}$ and $R^{122}$ include each group described in the above-described Group A of substituents.

Each group may further have a substituent, and examples of the substituent include the above-described Group A of substituents.

As $R^{121}$ and $R^{122}$, from the viewpoint of the ease of synthesis, light fastness and ozone resistance, a hydrogen atom, an alkyl group, a carbamoyl group or a cyano group is preferred, and a hydrogen atom, an alkyl group having 1 to 4 carbon atoms, a carbamoyl group or a cyano group is more preferred. In particular, it is preferred that $R^{121}$ is a hydrogen atom, and $R^{122}$ is a hydrogen atom or an alkyl group having 1 to 4 carbon atoms (most preferably a methyl group).

In Formula (14), $R^{125}$ and $R^{129}$ each independently represent an alkyl group, an alkoxy group or a halogen atom. When both $R^{125}$ and $R^{129}$ are an alkyl group at the same time, the sum of the number of carbon atoms constituting the alkyl group is 3 or more, and these groups may be further substituted.

Specific examples of the alkyl group, the alkoxy group and the halogen atom include each group described in the above-described Group A of substituents.

The alkyl group and the alkoxy group may further have a substituent, and examples of the substituent include the above-described Group A of substituents.

From the viewpoint of light fastness and ozone resistance, $R^{125}$ and $R^{129}$ are preferably an alkyl group, and are each preferably an alkyl group having 1 to 3 carbon atoms (preferably a methyl group, an ethyl group and an isopropyl group). Provided that the sum of the number of carbon atoms constituting the alkyl groups of $R^{125}$ and $R^{129}$ is 3 or more, an alkyl group with a sum of 3 to 5 carbon atoms, which may be substituted, is preferred, and an unsubstituted alkyl group with a sum of 4 or 5 carbon atoms is more preferred.

In Formula (14), $R^{126}$, $R^{127}$ and $R^{128}$ each independently have the same meaning as $R^{121}$ and $R^{122}$, and $R^{125}$ and $R^{126}$, or $R^{128}$ and $R^{129}$ may be condensed with each other to form a ring.

Specific examples of $R^{126}$, $R^{127}$ and $R^{128}$ are the same as specific examples of $R^{121}$ and $R^{122}$ and preferred ranges thereof are also the same, but as $R^{126}$, $R^{127}$ and $R^{128}$, a hydrogen atom, an alkyl group or a sulfo group (also includes a state of a salt) is preferred, and a hydrogen atom, an alkyl group having 1 to 4 carbon atoms (most preferably a methyl group) or a sulfo group is more preferred.

Specific examples and preferred ranges of a counter cation in the case where the sulfo group is in the state of a salt are the same as specific examples and preferred ranges of the case where the compound represented by Formula (11) becomes a salt.

In Formula (14), Q represents a hydrogen atom, an aliphatic group, an aromatic group or a heterocyclic group.

Examples of the aliphatic group include an alkyl group, a cycloalkyl group, an alkenyl group and the like.

Examples of the aromatic group include an aryl group and the like.

In addition, examples of a group corresponding to the aromatic group and the aliphatic group include an aralkyl group.

Specific examples of the alkyl group, the cycloalkyl group, the aralkyl group, the alkenyl group, the aryl group and the heterocyclic group include each group described in the above-described $R^{123}$ and $R^{124}$.

Each group may further have a substituent, and examples of the substituent are also the same as the examples described in the above-described $R^{123}$ and $R^{124}$ It is preferred that Q is an aryl group or a heterocyclic group substituted with an electron-withdrawing group or a sulfo group (also includes a state of a salt). Specific examples and preferred ranges of a counter cation in the case where the sulfo group is in the state of a salt are the same as specific examples and preferred ranges of the case where the compound represented by Formula (11) becomes a salt.

The electron-withdrawing group is an electron-withdrawing group having a Hammett's substituent constant σp value of 0.20 or more, and more preferably 0.30 or more. The upper limit of the σp value is preferably 1.0 or less.

Specific examples of the electron-withdrawing group having an σp value of 0.20 or more include the electron-withdrawing group described in $Z^1$, and the electron-withdrawing group is preferably a cyano group, a nitro group and a halogen atom.

The compound represented by Formula (14) has at least one ionic hydrophilic group.

From the viewpoint of water solubility, the ionic hydrophilic group is preferably at least one group selected from a sulfo group, a carboxyl group, a phosphono group and a quaternary ammonium group.

As the ionic hydrophilic group, at least one group selected from a sulfo group, a carboxyl group and a phosphono group is preferred, and among them, a carboxyl group and a sulfo group are preferred. In particular, it is most preferred that at least one is a sulfo group. The carboxyl group, the phosphono group and the sulfo group may be in a state of a salt, examples of the counter cation forming the salt include an ammonium ion, an alkali metal ion (for example, a lithium ion, a sodium ion and a potassium ion) and an organic cation (for example, a tetramethylammonium ion, a tetramethylguanidium ion and tetramethylphosphonium). Among the counter ions, an alkali metal salt is preferred. Among the alkali metal salts, a potassium ion, a sodium ion and a lithium ion are preferred, a lithium ion and a sodium ion are more preferred, and a sodium ion is most preferred.

The compound represented by Formula (14) is preferably a compound having 3 to 6 ionic hydrophilic groups in the molecule thereof, more preferably a compound having 3 to 6 sulfo groups, and even more preferably a compound having 3 to 5 sulfo groups, from the viewpoint of water solubility.

The compound represented by Formula (14) is preferably a compound represented by the following Formula (14').

[Chem. 34]

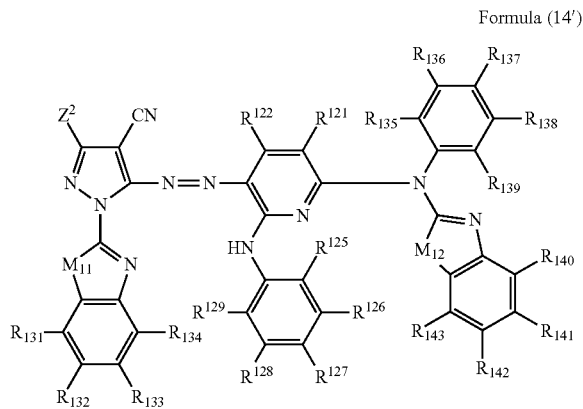

Formula (14')

In Formula (14'), $Z^2$ represents a hydrogen atom, an aliphatic group, an aromatic group, an acyl group or a heterocyclic group.

$R^{121}$ and $R^{122}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an alkylamino group, an arylamino group, a heterocyclic amino group, an acylamino group, a ureido group, a sulfamoylamino group, an alkoxycarbonylamino group, an aryloxycarbonylamino group, an alkyl or arylsulfonylamino group, an aryloxycarbonylamino group, a nitro group, an alkyl or arylthio group, an alkyl or arylsulfonyl group, an alkyl or arylsulfinyl group, a sulfamoyl group, a sulfo group or a heterocyclic thio group.

$R^{125}$ and $R^{129}$ each independently represent an alkyl group, an alkoxy group or a halogen atom. Provided that when both $R^{125}$ and $R^{129}$ are an alkyl group at the same time, the sum of the number of carbon atoms constituting the alkyl group is 3 or more, and these groups may be further substituted.

$R^{126}$, $R^{127}$ and $R^{128}$ each independently have the same meaning as $R^{121}$ and $R^{122}$, and $R^{125}$ and $R^{126}$, or $R^{128}$ and $R^{129}$ may be condensed with each other to form a ring.

$R_{131}$, $R_{132}$, $R_{133}$, $R_{134}$, $R_{135}$, $R_{136}$, $R_{137}$, $R_{138}$, $R_{139}$, $R_{140}$, $R_{141}$, $R_{142}$ and $R_{143}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, a sulfamoyl group or an ionic hydrophilic group.

$M_{11}$ and $M_{12}$ each independently represent an oxygen atom or a sulfur atom.

Each group of $Z^2$, $R^{121}$ and $R^{122}$ may further have a substituent.

Provided that Formula (14') has at least one ionic hydrophilic group.

In Formula (14'), $Z^2$, $R^{121}$, $R^{122}$, $R^{125}$, $R^{126}$, $R^{127}$, $R^{128}$ and $R^{129}$ have the same meaning as $Z^2$, $R^{121}$, $R^{122}$, $R^{125}$, $R^{126}$, $R^{127}$, $R^{128}$ and $R^{129}$ in Formula (14), and specific examples and preferred ranges thereof are also the same.

In Formula (14'), $R_{131}$, $R_{132}$, $R_{133}$, $R_{134}$, $R_{135}$, $R_{136}$, $R_{137}$, $R_{138}$, $R_{139}$, $R_{140}$, $R_{141}$, $R_{142}$ and $R_{143}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, a sulfamoyl group or an ionic hydrophilic group. Specific examples of each of the groups are the same as those described in $R^{123}$ and $R^{124}$ in Formula (14). The ionic hydrophilic group is the same as described above.

It is preferred that $R_{131}$, $R_{132}$, $R_{133}$, $R_{134}$, $R_{135}$, $R_{136}$, $R_{137}$, $R_{138}$, $R_{139}$, $R_{140}$, $R_{141}$, $R_{142}$ and $R_{143}$ are a hydrogen atom, an alkyl group or a sulfo group.

In Formula (14'), $M_{11}$ and $M_{12}$ each independently represent an oxygen atom or a sulfur atom, and are preferably a sulfur atom.

A method of synthesizing the compound represented by Formula (14) will be described. Herein, among the compounds represented by Formula (14), a method of preparing a compound represented by the following Formula (14-R1) or (14-R2) will be described.

[Chem. 35]

Formula (14-R1)

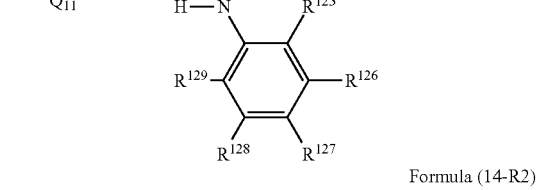

Formula (14-R2)

In Formula (14-R1), $Z^1$, $Z^2$, $R^{121}$, $R^{122}$, $R^{123}$, $R^{124}$, $R^{125}$, $R^{126}$, $R^{127}$, $R^{128}$ and $R^{129}$ each have the same meaning as $Z^1$, $Z^2$, $R^{121}$, $R^{122}$, $R^{123}$, $R^{124}$, $R^{125}$, $R^{126}$, $R^{127}$, $R^{128}$ and $R^{129}$ in Formula (14). $Q_{11}$ represents an aliphatic group, an aromatic group or a heterocyclic group.

In Formula (14-R2), $Z^1$, $Z^2$, $R^{121}$, $R^{122}$, $R^{124}$, $R^{125}$, $R^{126}$, $R^{127}$, $R^{128}$ and $R^{129}$ each have the same meaning as $Z^1$, $Z^2$, $R^{121}$, $R^{122}$, $R^{124}$, $R^{125}$, $R^{126}$, $R^{127}$, $R^{128}$ and $R^{129}$ in Formula (14). $Q_{11}$ and $Q_{12}$ each independently represent an aliphatic group, an aromatic group or a heterocyclic group.

The compound of Formula (14-R1) is obtained by any one method of the following method <1> and/or <2>.

The method <1> is a method including: (a) a step of forming a diazonium salt by reacting an aminopyrazole represented by the following Formula (14-1) with a diazotizing agent, (b) a step of forming a compound represented by the following Formula (14-H1) by reacting the diazonium salt formed in step (a) with a coupling agent represented by the following Formula (14-2), and (c) a step of forming the compound represented by Formula (14-R1) by reacting the compound formed in step (b) with an alkylating agent, an arylating agent or a heterylating agent in the presence of a base.

[Chem. 36]

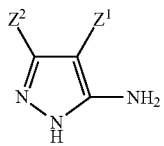

Formula (14-1)

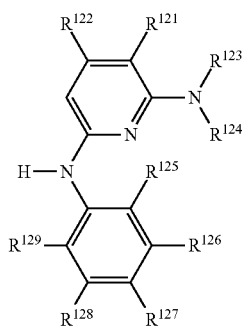

Formula (14-2)

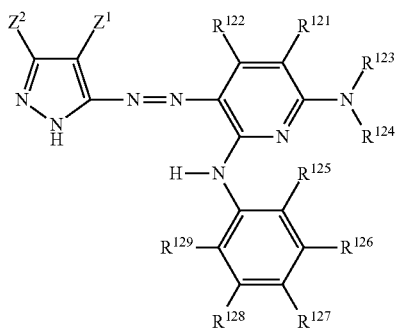

Formula (14-H1)

In Formulae (14-1), (14-2) and (14-H1), $Z^1$, $Z^2$, $R^{121}$, $R^{122}$, $R^{123}$, $R^{124}$, $R^{125}$, $R^{126}$, $R^{127}$, $R^{128}$ and $R^{129}$ each have the same meaning as $Z^1$, $Z^2$, $R^{121}$, $R^{122}$, $R^{123}$, $R^{124}$, $R^{125}$, $R^{126}$, $R^{127}$, $R^{128}$ and $R^{129}$ in Formula (14).

The method <2> is a method including a step of introducing a water-soluble group into the compound represented by Formula (14-R1) by an electrophilic reaction. Further, it is preferred that the electrophilic reaction is a method described in detail below.

In the method <1>, it is preferred that as the diazotizing agent used in step (a), a dilute hydrochloric acid aqueous solution of sodium nitrite is used. In addition, isopentyl nitrite, nitrosyl sulfuric acid and the like may also be used as the diazotizing agent.

In the method <1>, it is most preferred that as the coupling agent used in step (b), a nitrogen-containing 6-membered heterocyclic coupler represented by Formula (14) is used. Preferred examples of $Z^1$, $Z^2$, $R^{121}$, $R^{122}$, $R^{123}$, $R^{124}$, $R^{125}$, $R^{126}$, $R^{127}$, $R^{128}$ and $R^{129}$ in Formula (14) are the same as the case in Formula (14).

In the method <1>, the alkylating agent, the arylating agent or the heterylating agent used in step (c) is represented by the following Formula (15), (16) or (17).

[Chem. 37]

R—X       Formula (15)

Ar—X       Formula (16)

Het-x       Formula (17)

In Formula (15), R represents an alkyl group which may be substituted, and X represents a halogen atom or $OSO_2R'$. R' represents an alkyl group or an aryl group such as a phenyl group.

In Formula (16), Ar represents a phenyl group in which an electron-withdrawing group is substituted, and is preferably substituted with a substituent having the sum of Hammett's σp values of 0.2 or more. X represents a halogen atom or $OSO_2R'$. R' represents an alkyl group or an aryl group such as a phenyl group.

In Formula (17), Het denotes a heterocyclic ring, and is preferably a 2-pyridyl group, a 2-thienyl group, a 2-thiazolyl group, a 2-benzothiazolyl group, a triazyl group and a 2-furyl group. X represents a halogen atom or $OSO_2R'$. R' represents an alkyl group or an aryl group such as a phenyl group.

As the base used in step (c), it is possible to use an organic base, such as diisopropylethylamine, and an inorganic base, such as potassium carbonate, sodium carbonate, sodium hydrogencarbonate, potassium hydrogencarbonate, sodium hydroxide, and potassium hydroxide.

The electrophilic reaction in the method <2> includes sulfonation, Mannich reaction, and Friedel-Crafts reaction, and among them, sulfonation is preferred.

As a method of sulfonation of Formula (14-R1), sulfonation may be performed using a sulfonating agent such as concentrated sulfuric acid, 10 to 60% fuming sulfuric acid, chlorosulfonic acid, sulfur trioxide and amidosulfuric acid. Furthermore, a solvent may be used, and as the solvent, acetic acid, acetic anhydride, sulfolane, ethyl acetate, ether, carbon tetrachloride, acetonitrile and the like may be used.

In Formula (14-R1), it is preferred that $Q_{11}$, $R^{123}$, $R^{124}$, $R^{126}(R^{128})$ and $R_{127}$ are sulfonated, and when substituents of $Q_{11}$, $R^{123}$, $R^{124}$, $R^{126}(R^{128})$ and $R^{127}$ have a plurality of reaction sites capable of being sulfonated, sulfonated colorants having different substitution positions may be incorporated.

In this case, sulfonated colorants having different substitution positions may be incorporated in a range of 0.1% to 50% in terms of HPLC area % based on a mainly sulfonated colorant. The reaction temperature (Celsius degree) is preferably −5° C. to 80° C., and more preferably 10° C. to 70° C. The reaction time is preferably 30 minutes to 10 hours, and more preferably 1 hour to 6 hours.

In the preparation method of Formula (14-R1) or Formula (14-R2), as an oxygen-free condition, it is preferred to prepare the compound by filling the reaction system with an inert gas such as nitrogen and argon, and furthermore, it is preferred to bubble the reaction solution with these inert gases.

The aminopyrazole represented by Formula (14-1) as a starting material used in the step (a) of the method <1> may be synthesized by the methods described in U.S. Pat. No. 3,336, 285, Heterocycles 20,519 (1983), Japanese Patent Publication No. H6-19036 and the like.

The pyridine coupler (coupling agent represented by Formula (14-2)) used in step (b) of the method <1> may be synthesized by the methods described in Japanese Patent Application Laid-Open Nos. S51-83631 and S49-74718 and Japanese Patent Publication No. S52-46230, and the like.

The azo colorant represented by Formula (14) may be synthesized by the above-described preparation method of the present invention. Specific examples of the azo colorant of the present invention will be described below, but the present invention is not limited to the following examples. Meanwhile, in the following specific examples, the sulfo group may be in a state of a salt.

[Chem. 38]

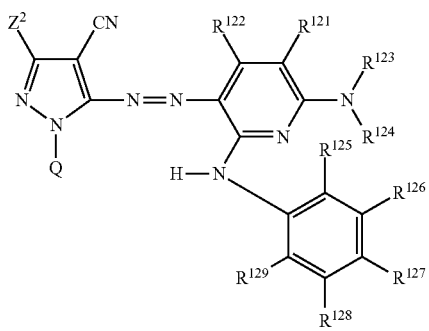

| Compound | $Z^2$ | Q | $R^{121}$ | $R^{122}$ | $R^{123}$ | $R^{124}$ | $R^{125}$ | $R^{126}$ | $R^{127}$ | $R^{128}$ | $R^{129}$ |
|---|---|---|---|---|---|---|---|---|---|---|---|
| d-1 | phenyl | 2-methylbenzothiazol-6-sulfonic acid | CN | $CH_3$ | H | 4-sulfophenyl | $CH_3$ | H | $SO_3H$ | H | $C_2H_5$ |
| d-2 | t-Bu | 2-methylbenzothiazol-6-sulfonic acid | $CONH_2$ | H | H | 3,5-diisopropyl-4-methylphenyl sulfonic acid | iPr | H | $SO_3H$ | H | iPr |
| d-3 | t-Bu | 2-methylbenzothiazol-6-sulfonic acid | H | $CH_3$ | 2-methylbenzothiazol-6-sulfonic acid | 3,5-diisopropyl-4-methylphenyl sulfonic acid | iPr | H | $SO_3H$ | H | iPr |
| d-4 | t-Bu | 2-methylbenzothiazol-6-sulfonic acid | H | $CH_3$ | 2-methylbenzothiazol-6-sulfonic acid | 3,5-diethyl-4-methylphenyl sulfonic acid | $C_2H_5$ | H | $SO_3H$ | H | $C_2H_5$ |
| d-5 | t-Bu | 2-methylbenzothiazol-6-sulfonic acid | H | $CH_3$ | 2-methylbenzothiazol-6-sulfonic acid | 3-ethyl-5-methyl-2-sulfo-phenyl (with methyl) | $C_2H_5$ | H | $CH_3$ | $SO_3H$ | $C_2H_5$ |

[Chem. 39]

| Compound | $Z^2$ | Q | $R^{121}$ | $R^{122}$ | $R^{123}$ | $R^{124}$ | $R^{125}$ | $R^{126}$ | $R^{127}$ | $R^{128}$ | $R^{129}$ |
|---|---|---|---|---|---|---|---|---|---|---|---|
| d-6 | t-Bu | 2-methylbenzothiazole-6-sulfonic acid | H | $CH_3$ | 2-methylbenzothiazole-6-sulfonic acid | 3-methyl-4-methyl-5-(1-methylethyl)benzene sulfonic acid | $CH_3$ | H | $SO_3H$ | H | iPr |
| d-7 | t-Bu | 2-methylbenzothiazole-6-sulfonic acid | H | $CH_3$ | 2-methylbenzothiazole-6-sulfonic acid | 3-methyl-4-methyl-5-methoxybenzene sulfonic acid | $CH_3$ | H | $SO_3H$ | H | $OCH_3$ |
| d-8 | t-Bu | 2-methylbenzothiazole-6-sulfonic acid | H | $CH_3$ | 2-methylbenzothiazole-6-sulfonic acid | 2-chloro-3,5-dimethyl-6-methylbenzene sulfonic acid | $CH_3$ | H | $CH_3$ | $SO_3H$ | Cl |

[Chem. 39]
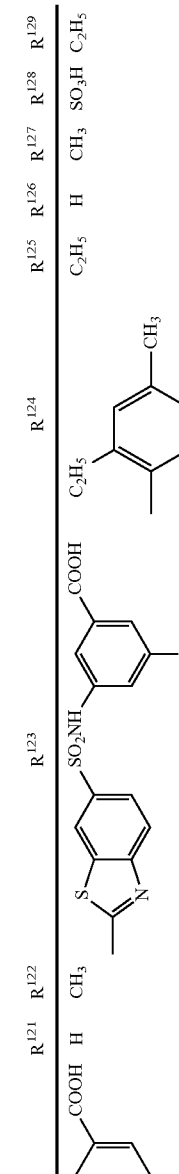
| Compound | $Z^2$ | Q | $R^{121}$ | $R^{122}$ | $R^{123}$ | $R^{124}$ | $R^{125}$ | $R^{126}$ | $R^{127}$ | $R^{128}$ | $R^{129}$ |
|---|---|---|---|---|---|---|---|---|---|---|---|
| d-9 | t-Bu | 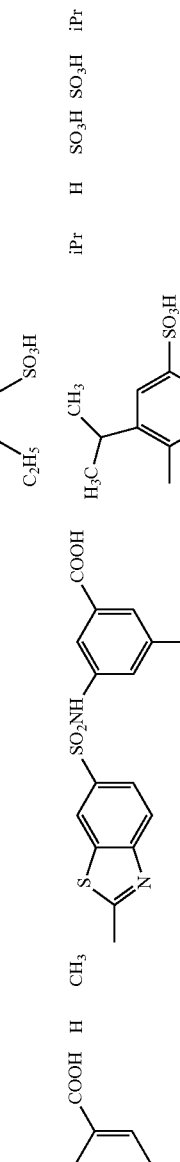 | H | $CH_3$ | 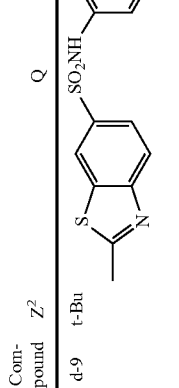 | | $C_2H_5$ | H | $CH_3$ | $SO_3H$ | $C_2H_5$ |
| d-10 | t-Bu | 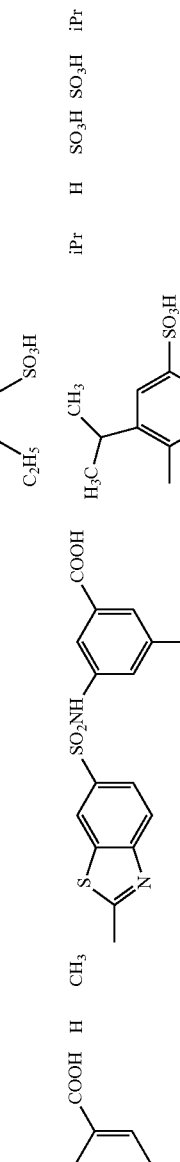 | H | $CH_3$ | 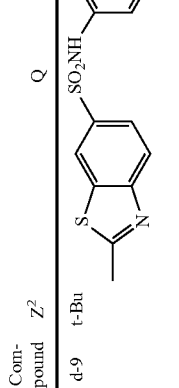 | | iPr | H | $SO_3H$ | $SO_3H$ | iPr |

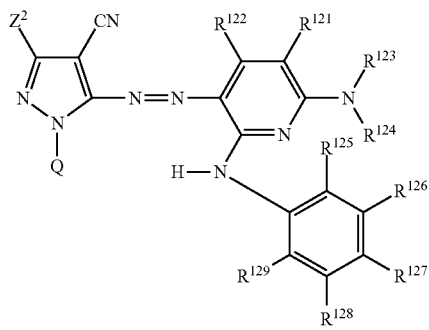

[Chem. 40]

| Compound | $Z^2$ | Q | $R^{121}$ | $R^{122}$ | $R^{123}$ | $R^{124}$ | $R^{125}$ | $R^{126}$ | $R^{127}$ | $R^{128}$ | $R^{129}$ |
|---|---|---|---|---|---|---|---|---|---|---|---|
| d-16 | t-Bu | 2-methylbenzothiazole-5-SO₃H | H | CH₃ | 2-methylbenzothiazole-5-SO₃H | 2,5-diethyl-3,6-dimethyl-phenyl-SO₃H | C₂H₅ | H | CH₃ | SO₃H | C₂H₅ |
| d-17 | t-Bu | 2-methylbenzothiazole-6-SO₃H | H | CH₃ | 2-methylbenzothiazole-6-SO₃H | 2,5-diethyl-3,6-dimethyl-phenyl | C₂H₅ | H | CH₃ | SO₃H | C₂H₅ |
| d-18 | t-Bu | 2-methylbenzothiazole-6-SO₃H | H | CH₃ | 2-methylbenzothiazole-4,6-diSO₃H | 2,5-diethyl-3,6-dimethyl-phenyl-SO₃H | C₂H₅ | H | CH₃ | SO₃H | C₂H₅ |
| d-19 | t-Bu | 2-methylbenzoxazole-6-SO₃H | H | CH₃ | 2-methylbenzoxazole-6-SO₃H | 2,5-diethyl-3,6-dimethyl-phenyl-SO₃H | C₂H₅ | H | CH₃ | SO₃H | C₂H₅ |
| d-20 | t-Bu | 2-methylbenzothiazole | H | CH₃ | 2-methylbenzothiazole | 2,5-diethyl-3,6-dimethyl-phenyl-SO₃H | C₂H₅ | H | CH₃ | SO₃H | C₂H₅ |

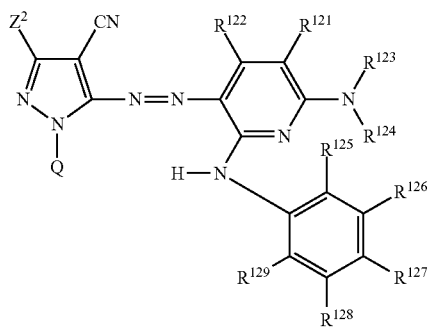

| Compound | $Z^2$ | Q | $R^{121}$ | $R^{122}$ | $R^{123}$ | $R^{124}$ | $R^{125}$ | $R^{126}$ | $R^{127}$ | $R^{128}$ | $R^{129}$ |
|---|---|---|---|---|---|---|---|---|---|---|---|
| d-21 | t-Bu | 2-methylbenzothiazole-6-SO₃H | CN | CH₃ | 2-methylbenzothiazole | 2,6-dimethyl-3,5-diethyl-phenyl-SO₃H | C₂H₅ | H | CH₃ | SO₃H | C₂H₅ |
| d-22 | t-Bu | 2-methylbenzothiazole-6-SO₃H | CN | CH₃ | 2-methylbenzothiazole-6-SO₃H | 2,6-diethyl-4-methyl-phenyl | C₂H₅ | H | CH₃ | SO₃H | C₂H₅ |
| d-23 | t-Bu | 2-methylbenzothiazole-6-SO₃H | CN | CH₃ | 2-methylbenzothiazole-4,6-di-SO₃H | 2,6-diethyl-4-methyl-3-SO₃H-phenyl | C₂H₅ | H | CH₃ | SO₃H | C₂H₅ |
| d-24 | t-Bu | 2-methylbenzothiazole-6-SO₃H | CN | CH₃ | 2-methylbenzothiazole-6-SO₃H | 2,6-diethyl-4-methyl-3-SO₃H-phenyl | C₂H₅ | SO₃H | CH₃ | SO₃H | C₂H₅ |
| d-25 | t-Bu | 2-methylbenzothiazole-6-SO₃H | CN | CH₃ | 2-methylbenzothiazole-6-SO₃H | 2,6-diethyl-4-methyl-phenyl | C₂H₅ | H | CH₃ | H | C₂H₅ |

Subsequently, compounds represented by the following Formula (24) and Formula (25) will be described. A coloring composition including the compound having the specific xanthene skeleton represented by Formula (11) or a salt thereof, and at least one selected from the group consisting of a compound represented by the following Formula (24) and a compound represented by the following Formula (25) is excellent in ozone resistance, light fastness and moisture resistance, and also excellent from the viewpoint of print concentration.

It is thought that by using the compound represented by Formula (11) and at least one selected from the group consisting of the compound represented by Formula (24) and the compound represented by Formula (25) in combination, interaction (deactivation by intermolecular energy shift of excited energy, control of permeability in a print medium and the like) occurs and as a result, a synergistic effect is exhibited, so that it is possible to prepare a coloring composition which is significantly excellent in ozone resistance, light fastness, moisture resistance and print concentration.

[Compound Represented by Formula (24)]

[Chem. 42]

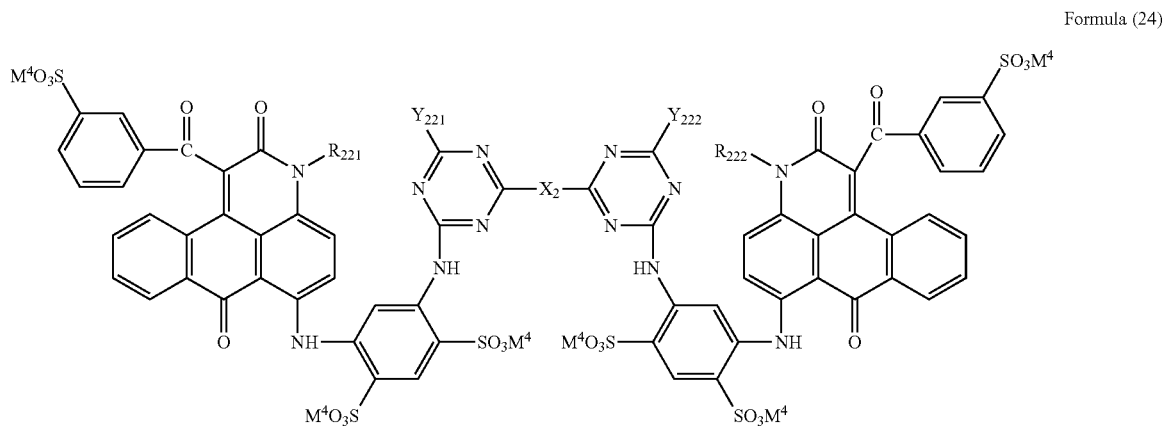

Formula (24)

In Formula (24), $R_{221}$ and $R_{222}$ each independently represent a hydrogen atom or a substituted or unsubstituted alkyl group.

$Y_{221}$ and $Y_{222}$ each independently represent a chlorine atom, a hydroxyl group, a substituted or unsubstituted amino group, an alkoxy group and a substituted or unsubstituted phenoxy group.

$X_2$ represents a divalent linking group.

$M^4$ represents a hydrogen atom or a counter cation. A plurality of $M^4$'s may be the same or different.

In Formula (24), $R_{221}$ and $R_{222}$ each independently represent a hydrogen atom or a substituted or unsubstituted alkyl group.

When $R_{221}$ and $R_{222}$ represent an alkyl group, the alkyl group may be straight, branched or cyclic (a cycloalkyl group), and is preferably an alkyl group having 1 to 10 carbon atoms, more preferably an alkyl group having 1 to 8 carbon atoms, even more preferably an alkyl group having 1 to 6 carbon atom, and particularly preferably an alkyl group having 1 to 4 carbon atoms.

When the alkyl group is a cyclic alkyl group, a cyclohexyl group is preferred.

As the alkyl group, a straight or branched alkyl group is more preferred.

Specific examples of the alkyl group include a methyl group, an ethyl group, an n-propyl group, an isopropyl group, an n-butyl group, a t-butyl group, an n-hexyl group, an n-octyl group, a cyclohexyl group and the like.

When $R_{221}$ and $R_{222}$ represent an alkyl group, the alkyl group may have a substituent. As the substituent, an amino group is preferred, in which a hydroxyl group, a cyano group or an alkyl group is substituted.

When a hydroxyl group or a cyano group is substituted, an ethyl group is most preferred as the alkyl group.

Examples of the amino group in which an alkyl group is substituted include a monoalkylamino group or a dialkylamino group, and as the alkyl group, a straight or branched alkyl group is preferred. The monoalkylamino group or the dialkylamino group is preferably a mono or dialkylamino group in which an alkyl group having 1 to 8 carbon atoms is substituted, more preferably a mono or dialkylamino group in which an alkyl group having 1 to 6 carbon atoms is substituted, even more preferably a mono or dialkylamino group in which an alkyl group having 1 to 4 carbon atoms is substituted, and particularly preferably a mono or dialkylamino group in which a methyl group or an ethyl group is substituted.

As $R_{221}$ and $R_{222}$, a hydrogen atom or an unsubstituted alkyl group is preferred, a hydrogen atom or a methyl group is more preferred, and a methyl group is even more preferred, from the viewpoint of the availability of raw materials.

In Formula (24), $Y_{221}$ and $Y_{222}$ each independently represent a chlorine atom, a hydroxyl group, a substituted or unsubstituted amino group, an alkoxy group and a substituted or unsubstituted phenoxy group.

When $Y_{221}$ and $Y_{222}$ represent an amino group, the amino group may have a substituent.

As the substituent, an alkyl group or an aryl group is preferred.

When $Y_{221}$ and $Y_{222}$ represent an amino group (an alkylamino group) having an alkyl group as a substituent, the amino group may be a monoalkylamino group or a dialkylamino group.

The alkyl group may be straight, branched or cyclic (a cycloalkyl group).

When the alkyl group is a straight or branched alkyl group, an alkyl group having 1 to 8 carbon atoms is preferred, and examples thereof include a methyl group, an ethyl group, a butyl group, a 2-ethylhexyl group and the like.

When the alkyl group is a straight or branched alkyl group, the alkyl group may further have a substituent, and as the further substituent, an alkylamino group, an aryl group, a sulfo group, a carboxyl group or a hydroxyl group is preferred. When the alkyl group further has a substituent, the alkyl group is preferably an alkyl group having a substituent selected from the group consisting of a sulfo group, a carboxyl group and a hydroxyl group, an alkyl group (an aralkyl group) having an aryl group or an alkyl group having an alkylamino group.

The alkyl group having a substituent selected from the group consisting of a sulfo group, a carboxyl group and a hydroxyl group is preferably an alkyl group having 1 to 4 carbon atoms, and examples thereof include a methyl group, an ethyl group, an n-propyl group, an n-butyl group and the like.

Specific examples of the mono or dialkylamino group having a sulfo group or a carboxyl group include, for example, a 2-sulfoethylamino group, a carboxymethylamino group, a 2-carboxyethylamino group, a 1-carboxyethylamino group, a 1,2-dicarboxyethylamino group, a di(carboxymethyl)amino group or the like.

Specific examples of the mono or dialkylamino group having a hydroxyl group include, for example, a hydroxyethylamino group, a dihydroxyethylamino group and the like.

The amino group having an aralkyl group is preferably an amino group having an alkyl group having 1 to 6 carbon atoms, in which a phenyl group is substituted, and examples thereof include a benzylamino group, a phenetylamino group, a phenylpropylamino group and the like.

The alkylamino group as the further substituent may be a monoalkylamino group or a dialkylamino group, and specific examples and preferred ranges of the alkylamino group are the same as those of the alkylamino group as $Y_{221}$ and $Y_{222}$.

When $Y_{221}$ and $Y_{222}$ represent an amino group having a cycloalkyl group, the cycloalkyl group is preferably a cycloalkyl group having 5 to 7, and examples thereof include a cyclohexyl group, a cyclopentyl group and the like.

When $Y_{221}$ and $Y_{222}$ represent an amino group (an arylamino group) having an aryl group as a substituent, an amino group is preferred, in which a phenyl group or a naphthyl group is substituted.

As the amino group in which a phenyl group is substituted, an anilino group is preferred. The anilino group may be an anilino group in which at least one substituent selected from the group consisting of a sulfo group and a carboxyl group on a benzene ring is further substituted, in addition to an unsubstituted anilino group, and examples thereof include a 2,5-disulfoanilino group, a 3-sulfoanilino group, a 2-sulfoanilino group, a 4-sulfoanilino group, a 2-carboxy-4-sulfoanilino group, a 2-carboxy-5-sulfoanilino group and the like.

The amino group (a naphthylamino group) in which a naphthyl group is substituted may be a naphthylamino group in which a naphthyl group is further substituted with a sulfo group, in addition to an unsubstituted naphthylamino group, and examples thereof include a 3,6,8-trisulfo-1-naphthylamino group, a 4,6,8-trisulfo-2-naphthylamino group, a 3,6,8-trisulfo-2-naphthylamino group, a 4,8-disulfo-2-naphthylamino group and the like.

When $Y_{221}$ and $Y_{222}$ represent an alkoxy group, as the alkoxy group, for example, an alkoxy group having 1 to 4 carbon atoms, such as a methoxy group, an ethoxy group, an n-propoxy group, an isopropoxy group and a butoxy group, is preferred.

When $Y_{221}$ and $Y_{222}$ represent a phenoxy group, the phenoxy group may also be an unsubstituted phenoxy group, or a phenoxy group having a substituent. The substituent is preferably at least one substituent selected from the group consisting of a sulfo group, a carboxy group, an acetylamino group, an amino group and a hydroxyl group. As the phenoxy group substituted with a substituent selected from the group consisting of a sulfo group, a carboxy group, an acetylamino group, an amino group and a hydroxyl group, examples thereof include a 4-sulfophenoxy group, a 4-carboxyphenoxy group, a 4-acetylamino-phenoxy group, a 4-aminophenoxy group, a 4-hydroxyphenoxy group and the like.

As $Y_{221}$ and $Y_{222}$, a chlorine atom, a hydroxyl group or an unsubstituted amino group is preferred from the viewpoint of moisture resistance.

In Formula (24), $X_2$ represents a divalent linking group. Examples of the divalent linking group include a divalent group having a nitrogen atom or an oxygen atom at both ends of a hydrocarbon residue having 1 to 20 carbon atoms, which may include a nitrogen atom, an oxygen atom or a sulfur atom, and using a nitrogen atom or an oxygen atom at the both ends as a bonding hand, and specific examples thereof include a group represented by

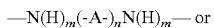

(in the formula, A is a divalent hydrocarbon residue having 1 to 20 carbon atoms and may include a nitrogen atom, an oxygen atom or a sulfur atom, n represents 1 or 2 and m represents 1 or 0, and when n is 1, m represents 1, and when n is 2, m represents 0).

Examples of the divalent hydrocarbon residue having 1 to 20 carbon atoms of A include a divalent aliphatic group having 1 to 15 carbon atoms, which may include one or two heteroatoms (for example, a nitrogen atom, an oxygen atom, a sulfur atom and the like) and a divalent aromatic group having 3 to 10 carbon atoms, preferably 5 to 10 carbon atoms, which may include one to three heteroatoms (for example, a nitrogen atom, an oxygen atom, a sulfur atom and the like), and a divalent group produced by combining the aliphatic group and the aromatic group. These groups may have a substituent (a sulfo group, a carboxyl group, an amino group, an alkyl group having 1 to 10 carbon atoms in the case of an aromatic group, and the like).

Examples of the aforementioned aliphatic group include a (poly)methylene having 1 to 6 carbon atoms, which may be substituted with an alkyl group having 1 to 10 carbon atoms, such as methylene, dimethylene (ethylene), trimethylene (propylene), 2-methyltrimethylene (2-methylpropylene) tetramethylene (butylene) and hexamethylene; a cycloalkylene having 5 to 7 carbon atoms, such as cyclopentane-1,2-diyl, cyclopentane-1,3-diyl, cyclohexane-1,2-diyl, cyclohexane-1,3-diyl, cyclohexane-1,4-diyl and cycloheptane-diyl; an aliphatic group including an alkylene having 1 to 10 carbon atoms, such as methylenecyclohexane-1,4-diylmethylene (—$CH_2$—$C_6H_{10}$—$CH_2$—), methylenedicyclohexane-diyl (—$C_6H_{10}$—$CH_2$—$C_6H_{10}$—), methylenebis(methylcyclohexane-diyl) {—$C_6H_{10}(CH_3)$—$CH_2$—$C_6H_{10}(CH_3)$—}, and cyclohexane-diyl-dimethylene (—$CH_2$—$C_6H_{10}$—$CH_2$—), and an aliphatic ring having 5 to 7 carbon atoms (may have an alkyl substitution with 1 to 10 carbon atoms); an aliphatic group having 1 to 7 carbon atoms, which includes a heteroatom such as methyleneoxymethylene (—$CH_2$—O—$CH_2$—), bis(dimethylene)amino (—$C_2H_4$—NH—$C_2H_4$—), methylenethiomethylene (—$CH_2$—S—$CH_2$—) and oxydicyclohexane-diyl (—$C_6H_{10}$—O—$C_6H_{10}$—); and the like.

Examples of the divalent aromatic group include an aromatic group having 6 to 10 carbon atoms, such as phenylene (—$C_6H_4$—) and naphthylene (—$C_{10}H_6$—).

Examples of the divalent group produced by combining the aliphatic group and the aromatic group include xylylene (—$CH_2$—$C_6H_4$—$CH_2$—) and the like.

Examples of the more preferred one as A include dimethylene, hexamethylene, 1,3-xylylene, methylenedicyclohexane-4,1-diyl, methylenebis(2-methylcyclohexane-4,1-diyl) and cyclohexane-1,3-diyl-dimethylene.

Examples of the divalent linking group $X_2$ include a diaminoalkylene group such as a 1,2-diaminoethylene group (—NH—$CH_2CH_2$—NH—), a 1,4-diaminobutylene group (—NH—$C_4H_8$—NH—) and a 1,6-diaminohexylene group (—NH—$C_6H_{12}$—NH—); a substituted diaminophenylene group such as a 1,4-piperazinediyl group (—$NC_4H_8N$—), a 1,4-diaminophenylene group (—NH—$C_6H_4$-p-NH—) and a 1,3-diaminophenylene group (—NH—$C_6H_4$-m-NH—); a substituted diaminophenylene group such as a 4-sulfo-1,3-diaminophenylene group {—NH—$C_6H_4$(p-$SO_3H$)-m-NH—} and a 5-carboxy-1,3-diaminophenylene group; a dioxy-substituted alkylene group such as a 1,3-diaminoxylylene group (—NH—$CH_2$—$C_6H_4$-m-$CH_2$—NH—), a 1,4-diaminoxylylene group (—NH—$CH_2$—$C_6H_4$-p-$CH_2$—NH—), a 4,4'-diamino-2-sulfo-diphenylamino group {—NH—$C_6H_4$(m-$SO_3H$)—NH—$C_6H_4$-p-NH—}, a 4,4'-diaminodicyclohexylmethane group (—NH—$C_6H_{10}$-4-$CH_2$—$C_6H_{10}$-4'-NH—), a 4,4'-diamino-3,3'-dimethyldicyclohexylmethane group {—NH—$C_6H_{10}$(3-$CH_3$)-4-$CH_2$—$C_6H_{10}$(3'-$CH_3$)-4'NH—), a 1,3-bis(aminomethyl)cyclohexane group (—NH—$CH_2$—$C_6H_{10}$-3-$CH_2$—NH—), a dioxy-substituted alkylene group such as a dioxyethylene group (—O—$CH_2CH_2$—O—), a 1,4-dioxybutylene group (—O—$C_4H_8$—O—) and a 2,2'-dioxyethylether group (—O—$CH_2CH_2$—O—$CH_2CH_2$—O—); a 1,4-dioxyphenylene group (—O—$C_6H_4$-p-O—), a 1,3-dioxyphenylene group (—O—$C_6H_4$-m-O—), a 4,4'-dioxydiphenylether group (—O—$C_6H_4$-p-O—$C_6H_4$-p-O—), a 4,4'-dioxyphenylenethioether group (—O—$C_6H_4$-p-S—$C_6H_4$-p-O—), 2,5- and 2,6-norbornanediamino groups, a 1,4-dioxymethylcyclohexylene group (—O—$CH_2$—$C_6H_{10}$-4-$CH_2$—O—) and the like.

Meanwhile, examples of the group in the case where n is 2 and m is 0 in the formula —$N(H)_m$(-A-)$_n$$N(H)_m$— include the 1,4-piperazinediyl (—$NC_4H_8N$—) and the like.

$X_2$ is preferably a diaminoethylene group, a 1,4-piperazinediyl group, a 1,3-diaminoxylylene group, a 4,4'-diaminodicyclohexylmethane group, a 4,4'-diamino-3,3'-dimethyldicyclohexylmethane group, or a 1,3-bis(aminomethyl) cyclohexane group.

In Formula (24), $M^4$ represents a hydrogen atom or a counter cation. A plurality of $M^4$'s may be the same or different.

In Formula (24), when $M^4$ is a hydrogen atom, the hydrogen atom is in a form of a free acid, and when $M^4$ is a counter cation, the counter cation is in a form of a salt.

Examples of the counter cation that forms a salt include a monovalent counter cation, and the counter cation is preferably an alkali metal ion, an ammonium ion, an organic cation and the like.

Examples of the organic cation include a cation in which a hydrogen ion is added to alkylamine or alkanolamine, examples of the alkylamine include trimethylamine, triethylamine and the like, and examples of the alkanolamine include monoethanolamine, diethanolamine, triethanolamine, monoisopropanolamine, diisopropanolamine, triisopropanolamine and the like.

From the viewpoint of solubility, an alkali metal ion is preferred, and a lithium ion, a sodium ion and a potassium ion are more preferred. In particular, the sodium ion is preferred from the viewpoint of inexpensive production.

In Formula (24), a plurality of $M^{4+}$'s may be the same or different. That is, the compound represented by Formula (24) in a form of a salt includes a case where all sulfo groups are salts, and a case where some sulfo groups are in a form of a free acid and some sulfo groups are salts. Furthermore, the counter cation forming a salt may be present either alone or in plurality.

Further, the same applies to those (for example, a carboxyl group) which may be in a form of a salt as a group other than a sulfo group.

Specific examples of the anthrapyridone compound represented by Formula (24) are shown in Table 1. Meanwhile, in Table 1, diaminoethylene means a 1,2-diaminoethylene group (—NH—$CH_2CH_2$—NH—). In addition, Ph denotes a phenyl group, for example, PhO denotes a phenoxy group and NHPh denotes an anilino group, and the same applies to the others. Furthermore, NHPh(p-$SO_3H$) denotes a 4-sulfoanilino group (p-$SO_3H$ indicates that a sulfonic acid group is present at the para position of a phenyl group, NHPh$(COOH)_2$ (3,5) denotes a 3,5-dicarboxyanilino group {Ph$(COOH)_2$(3,5) indicates that a carboxyl group is substituted at the 3-position and the 5-position of a phenyl group}, and the other groups are also described in the same manner. Further, naphthyl denotes a naphthyl group, NH-2 naphthyl$(SO_3H)_3$(3,6,8) denotes 3,6,8-trisulfo-2 naphthylamino, and NH(cyclohexyl) denotes cyclohexylamino. Meanwhile, in the following specific examples, the sulfo group may be in a state of a salt.

TABLE 1

| No. | $R_{221}, R_{222}$ | $X_2$ | $Y_{221}, Y_{222}$ |
|---|---|---|---|
| 2-0-1 | $CH_3$ | diaminoethylene | OH |
| 2-0-2 | $CH_3$ | diaminoethylene | Cl |
| 2-0-3 | $CH_3$ | diaminoethylene | $NH_2$ |
| 2-0-4 | $CH_3$ | 1,4-piperazinediyl | Cl |
| 2-0-5 | $CH_3$ | 1,4-piperazinediyl | $NH_2$ |
| 2-0-6 | $CH_3$ | 1,3-diaminoxylylene | Cl |
| 2-0-7 | $CH_3$ | 1,3-diaminoxylylene | $NH_2$ |
| 2-0-8 | $CH_3$ | 1,4-diaminoxylylene | $NH_2$ |
| 2-0-9 | $CH_3$ | bis(3-aminopropyl)ether | $NH_2$ |
| 2-0-10 | $CH_3$ | 3,3'-iminodi(propylamine) | $NH_2$ |
| 2-0-11 | $CH_3$ | 2,2'-iminodi(ethylamine) | $NH_2$ |
| 2-0-12 | $CH_3$ | 1,4-diaminobutylene | $NH_2$ |
| 2-0-13 | $CH_3$ | 1,6-diaminohexylene | $NH_2$ |
| 2-0-14 | $CH_3$ | 1,4-diaminophenylene | $NH_2$ |
| 2-0-15 | $CH_3$ | 1,3-diaminophenylene | $NH_2$ |
| 2-0-16 | $CH_3$ | 1,3-diamino-4-sulfophenylene | $NH_2$ |
| 2-0-17 | $CH_3$ | 1,3-diamino-5-carboxyphenylene | $NH_2$ |
| 2-0-18 | $CH_3$ | 4,4'-diamino-2-sulfodiphenylamine | $NH_2$ |
| 2-0-19 | $CH_3$ | 4,4'-diamino-3,3'-dimethyl-dicyclohexylmethane | $NH_2$ |
| 2-0-20 | $CH_3$ | 4,4'-diamino-dicyclohexylmethane | $NH_2$ |
| 2-0-21 | $CH_3$ | diaminoethylene | $NH(CH_2COOH)$ |
| 2-0-22 | $CH_3$ | diaminoethylene | $NH(CH_2CH_2COOH)$ |
| 2-0-23 | $CH_3$ | diaminoethylene | $NH(CH_2(COOH)CH_2COOH)$ |
| 2-0-24 | $CH_3$ | diaminoethylene | $NH(CH_2(COOH)CH_2CH_2COOH)$ |
| 2-0-25 | $CH_3$ | diaminoethylene | $CH_3O$ |
| 2-0-26 | $CH_3$ | diaminoethylene | $C_6H_5O$ |
| 2-0-27 | $CH_3$ | diaminoethylene | $NH(CH_2CH_2SO_3H)$ |
| 2-0-28 | $CH_3$ | diaminoethylene | $NHC_6H_5$ |
| 2-0-29 | $CH_3$ | diaminoethylene | NHPh(p-$SO_3H$) |
| 2-0-30 | $CH_3$ | diaminoethylene | NHPh$(COOH)_2$(3,5) |
| 2-0-31 | $CH_3$ | diaminoethylene | NHPh$(COOH)_2$(2,5) |
| 2-0-32 | $CH_3$ | diaminoethylene | NHPh(o-$SO_3H$) |
| 2-0-33 | $CH_3$ | diaminoethylene | NHPh(m-$SO_3H$) |
| 2-0-34 | $CH_3$ | diaminoethylene | NHPh$(COOH)_2$(2,5) |
| 2-0-35 | $CH_3$ | diaminoethylene | $NH(CH_2CH_2N(C_2H_5)_2)$ |
| 2-0-36 | $CH_3$ | diaminoethylene | $NH(CH_2CH_2N(CH_3)_2)$ |
| 2-0-37 | $CH_3$ | diaminoethylene | NH-2-naphthyl$(SO_3H)_3$(3,6,8) |
| 2-0-38 | $CH_3$ | diaminoethylene | NH-2-naphthyl$(SO_3H)_3$(4,6,8) |
| 2-0-39 | $CH_3$ | diaminoethylene | NH-2-naphthyl$(SO_3H)_2$(4,8) |
| 2-0-40 | $CH_3$ | diaminoethylene | $NH(n-C_4H_9)$ |
| 2-0-41 | $CH_3$ | diaminoethylene | NH(cyclohexyl) |
| 2-0-42 | $CH_3$ | diaminoethylene | $NH(CH_2CH_2OH)$ |
| 2-0-43 | $CH_3$ | diaminoethylene | $NH(CH_2CH_2OH)$ |
| 2-0-44 | $CH_3$ | diaminoethylene | $NHCH_2Ph$ |
| 2-0-45 | H | diaminoethylene | $NH_2$ |
| 2-0-46 | H | 1,3-diaminoxylene | $NH_2$ |
| 2-0-47 | H | 1,4-piperazinediyl | $NH_2$ |
| 2-0-48 | $C_2H_5$ | 1,3-diaminoxylylene | $NH_2$ |
| 2-0-49 | $C_4H_9$ | 1,3-diaminoxylylene | $NH_2$ |
| 2-0-50 | iso$C_3H_7$ | 1,3-diaminoxylylene | $NH_2$ |
| 2-0-51 | cyclohexyl | 1,3-diaminoxylylene | $NH_2$ |
| 2-0-52 | $C_3H_6N(C_2H_5)_2$ | 1,3-diaminophenylene | $NH_2$ |
| 2-0-53 | $CH_3$ | 1,4-dioxyphenylene | $NH_2$ |
| 2-0-54 | $CH_3$ | 4,4'-dioxydiphenylether | $NH_2$ |
| 2-0-55 | $CH_3$ | 4,4'-dioxydiphenylthioether | $NH_2$ |
| 2-0-56 | $CH_3$ | 4,4'-dioxydiphenylsulfone | $NH_2$ |

TABLE 1-continued

| No. | $R_{221}, R_{222}$ | $X_2$ | $Y_{221}, Y_{222}$ |
|---|---|---|---|
| 2-0-57 | $CH_3$ | 4,4'-dioxydiphenylmethane | $NH_2$ |
| 2-0-58 | $CH_3$ | 2,5- and 2,6-norbornanediamino | $NH_2$ |
| 2-0-59 | $CH_3$ | 1,4-dioxymethylcyclohexylene | $NH_2$ |
| 2-0-60 | $CH_3$ | 2,5-dimethyl-1,4-piperazinediyl | $NH_2$ |

A method of synthesizing the compound represented by Formula (24) will be described.

In the compound of Formula (24), for example, in order to obtain a compound having an amino group at both ends in $X_2$, a compound (in the formula, $R_{221}$, $R_{222}$, m, n and A represent the same meaning as described above) of Formula (24-9), in which Y is a chlorine atom and both ends of the crosslinking group $X_2$ are an amino group, is obtained as a secondary condensate, by reacting, at a pH of 4 to 10 and 5° C. to 90° C. for 10 minutes to 5 hours, 1 mole of the diamino compound of the following Formula (24-8) with a compound (in the formula, $R_{221}$ represents the same meaning as described above) of Formula (24-7) which is a primary condensate obtained by reacting 2 moles of the compound of the following Formula (24-6) (in the formula, $R_{221}$ represents the same meaning as described above) with 2 to 2.4 moles of 2,4,6-trichloro-S-triazine (cyanuric chloride) in water at a pH of 3 to 7 and 5° C. to 35 C for 2 to 8 hours.

[Chem. 43]

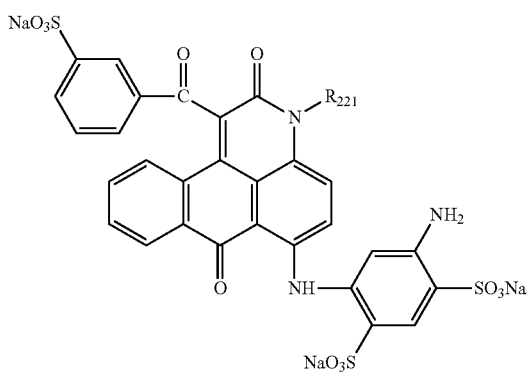

(24-6)

[Chem. 44]

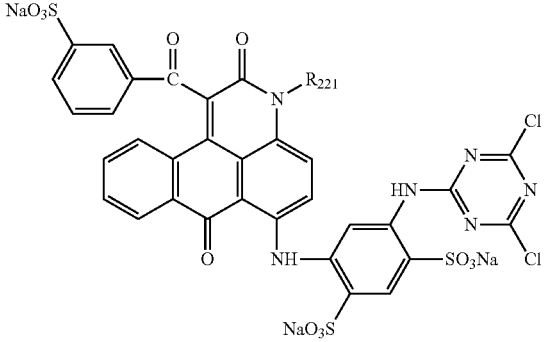

(24-7)

$HN(H)_m(-A-)_nN(H)_mH$ (24-8)

In the formula, A is a linking group, for example, a divalent hydrocarbon residue having 1 to 20 carbon atoms and may include a nitrogen atom, an oxygen atom or a sulfur atom, n represents 1 or 2 and m represents 1 or 0, and when n is 1, m represents 1, and when n is 2, m represents 0. Preferred examples of A include a (poly)methylene having 1 to 6 carbon atoms, and phenylene, xylylene, methylenedicyclohexane-diyl, methylenebis(methylenecyclohexane-diyl) and cyclohexane-diyl-dimethylene, which may have a substituent, and more preferred examples thereof include dimethylene, hexamethylene, 1,3-xylylene, methylenedicyclohexane-4,1-diyl, methylenebis(2-methylcyclohexane)-4,1-diyl and cyclohexane-1,3-diyl-dimethylene.

(24-9)

[Chem. 45]

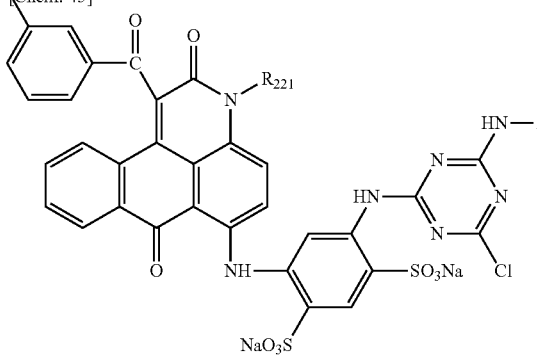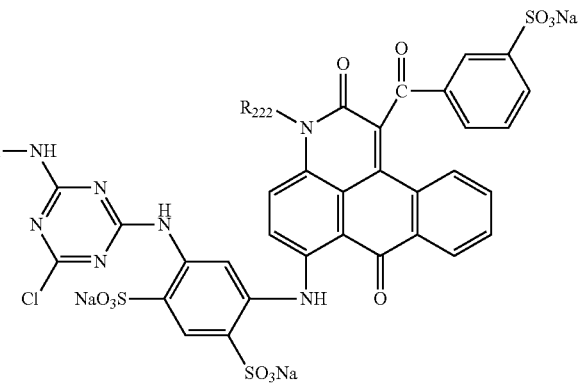

Provided that when a compound represented by HN(-A-)$_2$ NH (in Formula (24-8), n=2 and m=0) such as piperidine in Formula (24-8) is used, a compound which is —N(-A-)$_2$N— instead of —NH-A-NH— in Formula (24-9) may be obtained. Subsequently, it is possible to obtain a compound of Formula (24-10) in which Y is other than a chlorine atom, as a tertiary condensate, by performing hydrolysis at pH of 9 to 12 and 70° C. to 90° C. for 1 to 5 hours, or reacting ammonia with corresponding amines, phenols, naphthols or alcohols such as methanol at a pH of 8 to 10 and 90° C. to 100° C. for 3 to 8 hours.

[Chem. 46]

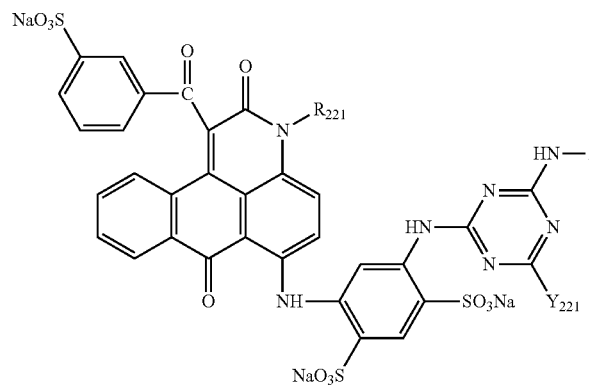 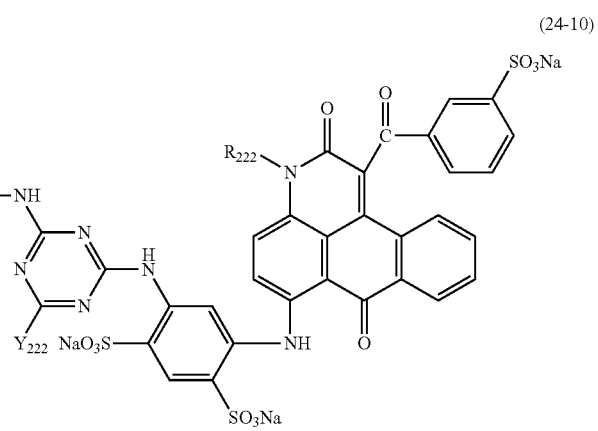

(24-10)

Furthermore, when the compound represented by HN(-A-)$_2$ NH in Formula (24-8) is used, a compound which is —N(-A-)$_2$N— instead of —NH-A-NH— in Formula (24-10) may be obtained.

Meanwhile, the order of the condensation is appropriately determined depending on the reactivities of various compounds, but is not limited to the above order. A plurality of specific examples of the anthrapyridone compound of the present invention represented by the Formula (24-10) are included in the previous Table 1, and the preferred compound in the present invention is shown in the following Table 2, also including the compounds shown in Table 1. Meanwhile, in the following specific examples, the sulfo group may be in a state of a salt

TABLE 2

| No. | $R_{221}$, $R_{222}$ | A | $Y_{221}, Y_{222}$ |
|---|---|---|---|
| 2-0-1 | CH$_3$ | methylenedicyclohexane-4,1-diyl | NH$_2$ |
| 2-0-2 | CH$_3$ | methylenedicyclohexane-4,1-diyl | ethylamino |
| 2-0-3 | CH$_3$ | methylenedicyclohexane-4,1-diyl | propylamino |
| 2-0-4 | CH$_3$ | methylenedicyclohexane-4,1-diyl | propylamino |
| 2-0-5 | CH$_3$ | methylenedicyclohexane-4,1-diyl | butylamino |
| 2-0-6 | CH$_3$ | methylenedicyclohexane-4,1-diyl | 2-ethylhexylamino |
| 2-0-7 | CH$_3$ | methylenedicyclohexane-4,1-diyl | benzyl |
| 2-0-8 | CH$_3$ | methylenebis(2-methylcylohexane-4,1-diyl) | NH$_2$ |
| 2-0-9 | CH$_3$ | cyclohexane-1,3-diyl-dimethylene | NH$_2$ |
| 2-0-10 | CH$_3$ | cyclohexane-1,3-diyl-dimethylene | ethylamino |
| 2-0-11 | CH$_3$ | cyclohexane-1,3-diyl-dimethylene | butylamino |
| 2-0-12 | CH$_3$ | cyclohexane-1,3-diyl-dimethylene | dibutylamino |
| 2-0-13 | CH$_3$ | cyclohexane-1,3-diyl-dimethylene | 2-ethylhexylamino |
| 2-0-14 | CH$_3$ | cyclohexane-1,3-diyl-dimethylene | benzyl |
| 2-0-15 | CH$_3$ | methylenedicyclohexane-4,1-diyl | cyclohexylamino |
| 2-0-16 | CH$_3$ | methylenedicyclohexane-4,1-diyl | cyclopentylamino |

TABLE 2-continued

| No. | $R_{221}$, $R_{222}$ | A | $Y_{221}, Y_{222}$ |
|---|---|---|---|
| 2-0-17 | CH$_3$ | methylenedicyclohexane-4,1-diyl | diethylamino-propylamino |
| 2-0-18 | CH$_3$ | methylenedicyclohexane-4,1-diyl | dibutylamino-propylamino |

It is possible to obtain a compound, in which the crosslinking group —NH-A-NH— in Formula (24-9) is changed into —O-A-O—, by performing a condensation reaction by a typical method using a glycol compound represented by the following Formula HO-A-OH (in the formula, A is the same as the above) instead of the diamino compound of Formula (24-8), and hereinafter, it is possible to obtain a compound, in which the crosslinking group —NHA-NH— in Formula (24-10) is changed into —O-A-O—, by performing treatment in the same manner as the above.

The compound thus obtained is present in a form of a free acid, or in a form of a salt thereof. In the present invention, as the free acid or the salt thereof, it is possible to use an alkali metal salt, an alkali earth metal salt, an alkylamine salt, an alkanolamine salt or an ammonium salt. Preferred examples thereof include an alkali metal salt such as a sodium salt, a potassium salt and a lithium salt; an alkanolamine salt such as a monoethanolamine salt, a diethanolamine salt, a triethanolamine salt, a monoisopropanolamine salt, a diisopropanolamine salt and a triisopropanolamine salt; and an ammonium salt. Further, as a method of producing a salt, for example, the salt is obtained in the form of a free acid (or a part of the free acid is a sodium salt as it is) by adding a table salt to the reaction solution of the tertiary condensate obtained above, salting out thereby and filtrating to obtain the sodium salt as a wet cake, which is again dissolved in water, adding hydrochloric acid thereto to adjust the pH to 1 to 2, and filtering the crystal obtained. In addition, for example, when potassium hydroxide, lithium hydroxide or aqueous ammonia is added to make an alkaline solution while the wet cake in the form of the free acid is stirred with water, it is possible to obtain the potassium salt, the lithium salt or the ammonium salt respectively. Meanwhile, the anthrapyridone compound of Formula (24-6) is obtained, for example, by the following process. That is, by reacting 1 mole of the anthraquinone compound represented by Formula (24-11)

[Chem. 47]

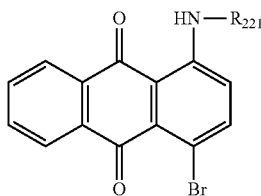
(24-11)

(in the formula, R$_{221}$ represents the same meaning as described above) with 1.1 to 3 moles of benzoyl acetic acid ethyl ester in a polar solvent such as xylene in the presence of a basic compound such as sodium carbonate at 130° C. to 180° C. for 5 to 15 hours, the compound of the following Formula (24-12) may be obtained

[Chem. 48]

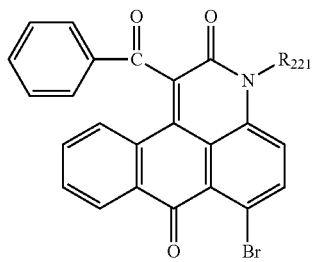
(24-12)

(In the formula, R$_{221}$ represents the same meaning as described above).

Subsequently, by subjecting 1 mole of the compound of Formula (24-12) to condensation by Ulmann reaction with 1 to 5 moles of meta amino acetanilide in an aprotic polar organic solvent such as N,N-dimethyl formamide in the presence of a base such as sodium carbonate and a copper catalyst such as copper acetate at 110° C. to 150° C. for 2 to 6 hours, the compound of the following formula (24-13)

[Chem. 49]

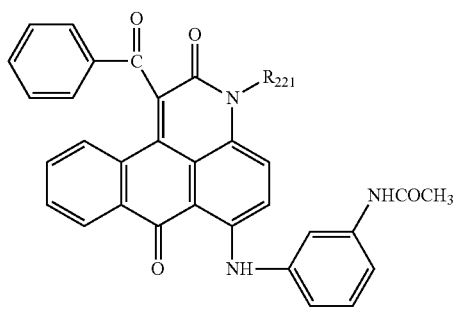
(24-13)

(In the formula, R$_{221}$ represents the same meaning as described above) may be obtained.

Subsequently, by subjecting the compound of Formula (24-13) to sulfonation and subjecting the acetylamino group to hydrolysis in 8 to 15% of fumed sulfuric acid at 50° C. to 120° C., the anthrapyridone compound of Formula (24-6)

[Chem. 50]

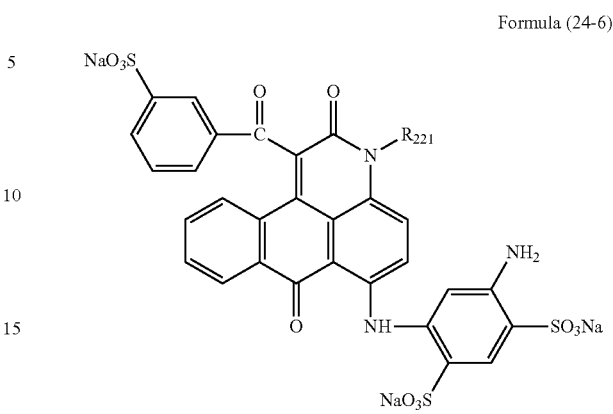
Formula (24-6)

(In the formula, R$_{221}$ represents the same meaning as described above) may be obtained.

[Compound Represented by Formula (25)]

[Chem. 51]

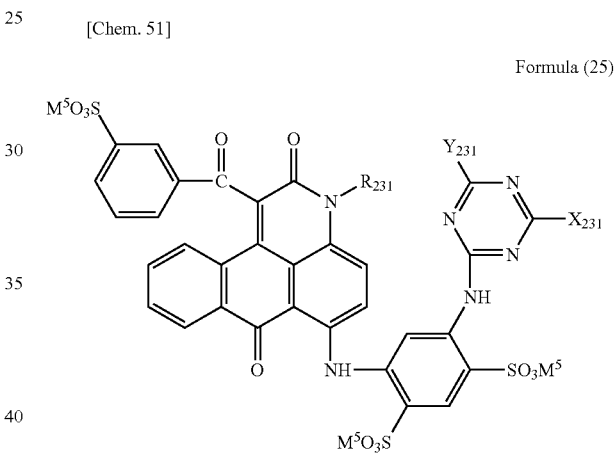
Formula (25)

In Formula (25), R$_{231}$ represents a hydrogen atom or a substituted or unsubstituted alkyl group.

Y$_{231}$ represents a chlorine atom, a hydroxyl group, a substituted or unsubstituted amino group or a morpholino group.

M$^5$ represents a hydrogen atom or a counter cation. A plurality of M$^5$'s may be the same or different.

X$_{231}$ represents a group represented by the following Formula (25-1).

[Chem. 52]

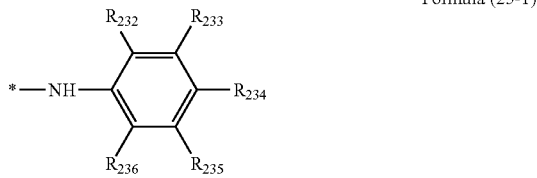
Formula (25-1)

In Formula (25-1), R$_{232}$, R$_{233}$, R$_{234}$, R$_{235}$ and R$_{236}$ each independently represent a hydrogen atom, an alkyl group having 1 to 8 carbon atoms or —COOM' (M' represents a hydrogen atom or a counter cation). Provided that at least one of $R_{232}$, $R_{233}$, $R_{234}$, $R_{235}$ and $R_{236}$ represents an alkyl group having 1 to 8 carbon atoms or —COOM'.

In Formula (25), $R_{231}$ represents a hydrogen atom or a substituted or unsubstituted alkyl group.

Specific examples of the alkyl group and the substituent in the case where $R_{231}$ represents a substituted or unsubstituted alkyl group are the same as those of $R_{221}$ in Formula (24).

As $R_{231}$, a hydrogen atom or an unsubstituted alkyl group is preferred, a hydrogen atom or a methyl group is more preferred, and a methyl group is even more preferred, from the viewpoint of the availability of raw materials.

In Formula (25), $Y_{231}$ represents a chlorine atom, a hydroxyl group, a substituted or unsubstituted amino group or a morpholino group.

Specific examples and preferred ranges of the case where $R_{231}$ represents a substituted or unsubstituted amino group are the same as those of $R_{221}$ in Formula (24).

As $R_{231}$, a chlorine atom, a hydroxyl group or an amino group is preferred, a hydroxyl group or an amino group is more preferred, and a hydroxyl group is even more preferred, from the viewpoint of moisture resistance.

In Formula (25), $X_{231}$ represents a group (a substituted anilino group) represented by the following Formula (25-1).

[Chem. 53]

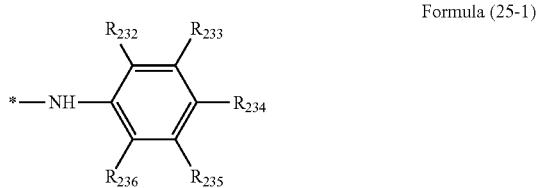

Formula (25-1)

In Formula (25-1), $R_{232}$, $R_{233}$, $R_{234}$, $R_{235}$ and $R_{236}$ each independently represent a hydrogen atom, an alkyl group having 1 to 8 carbon atoms or —COOM' (M' represents a hydrogen atom or a counter cation). Provided that at least one of $R_{232}$, $R_{233}$, $R_{234}$, $R_{235}$ and $R_{236}$ represents an alkyl group having 1 to 8 carbon atoms or —COOM'.

When $R_{232}$, $R_{233}$, $R_{234}$, $R_{235}$ and $R_{236}$ represent an alkyl group having 1 to 8 carbon atoms, the alkyl group having 1 to 8 carbon atoms is preferably a straight or branched alkyl group, and examples thereof include a methyl group, an ethyl group, an n-propyl group, an isopropyl group, an n-butyl group, a t-butyl group, an n-hexyl group, an n-octyl group and the like.

In the case of the alkyl group, it is preferred that at least one of $R_{232}$ and $R_{236}$ is an alkyl group, and the other is a hydrogen atom, in consideration of hue. Furthermore, as the alkyl group, a methyl group, an ethyl group, an n-propyl group or an isopropyl group is preferred.

M' represents a hydrogen atom or a counter cation. Examples of the counter cation include a monovalent counter cation, and an alkali metal ion (preferably a lithium ion, a sodium ion and a potassium ion, and more preferably a sodium ion), an ammonium ion, an organic cation and the like are preferred. Examples of the organic cation include a cation in which a hydrogen ion is added to alkylamine or alkanolamine, examples of the alkylamine include trimethylamine, triethylamine and the like, and examples of the alkanolamine include monoethanolamine, diethanolamine, triethanolamine, monoisopropanolamine, diisopropanolamine, triisopropanolamine and the like.

It is preferred that M' is a hydrogen atom or an alkali metal ion.

As $R_{232}$ to $R_{236}$, an alkyl group having 1 to 8 carbon atoms or —COOM' is preferred, and the case where one to three, more preferably one to two of $R_{232}$ to $R_{236}$ are these groups, and the others are a hydrogen atom is preferred.

When two of these groups are a group other than a hydrogen atom, the case where $R_{232}$ and $R_{236}$ or $R_{233}$ and $R_{235}$ are a group other than a hydrogen atom is preferred, and when three of these groups are a group other than a hydrogen atom, it is preferred that $R_{232}$, $R_{234}$ and $R_{236}$ are a group other than a hydrogen atom. More preferably, one to three of $R_{232}$ to $R_{236}$ are —COOM', and the others are a hydrogen atom. Even more preferably, at least one of $R_{232}$, $R_{233}$ or $R_{235}$ is —COOM'.

Specific examples of $X_{231}$ include, for example, a 2-methylanilino group, a 2,6-dimethylanilino group, a 2,5-dimethylanilino group, a 2,4,6-trimethylanilino group, a 2,6-diethylanilino group, a 2,5-diethylanilino group, a 2,6-di-iso-propylanilino group, a 2,5-di-iso-propylanilino group, a 2-carboxyanilino group, a 3-carboxyanilino group, a 4-carboxyanilino group, a 2,5-dicarboxyanilino group, a 3,5-dicarboxyanilino group, a 5-carboxy-2-methylanilino group, a 5-carboxy-2-ethylanilino group and the like.

As $X_{231}$, a 2,6-dimethylanilino group, a 2,4,6-trimethylanilino group, a 2,6-diethylanilino group, a 2,6-di-iso-propylanilino group, a 2-carboxyanilino group or a 3,5-dicarboxyanilino group is preferred, a 2,6-dimethylanilino group, a 2,6-diethylanilino group, a 2,6-di-iso-propylanilino group, a 2-carboxyanilino group or a 3,5-dicarboxyanilino group is more preferred, and a 2-carboxyanilino group or a 3,5-dicarboxyanilino group is even more preferred.

In Formula (25), $M^5$ represents a hydrogen atom or a counter cation. A plurality of $M^5$'s may be the same or different.

In Formula (25), when $M^5$ is a hydrogen atom, the hydrogen atom is in a form of a free acid, and when $M^5$ is a counter cation, the counter cation is in a form of a salt.

Examples of the counter cation that forms a salt include a monovalent counter cation, and preferably an alkali metal ion, an ammonium ion, an organic cation and the like.

Examples of the organic cation include a cation in which a hydrogen ion is added to alkylamine or alkanolamine, examples of the alkylamine include trimethylamine, triethylamine and the like, and examples of the alkanolamine include monoethanolamine, diethanolamine, triethanolamine, monoisopropanolamine, diisopropanolamine, triisopropanolamine and the like.

From the viewpoint of water solubility, an alkali metal ion is preferred, and a lithium ion, a sodium ion and a potassium ion are more preferred. In particular, the sodium ion is preferred from the viewpoint of inexpensive production.

In Formula (25), a plurality of $M^5$'s may be the same or different. That is, the compound represented by Formula (25) in a form of a salt includes a case where all sulfo groups are salts, and a case where some sulfo groups are in a form of a free acid and some sulfo groups are salts. Further, the counter cation forming a salt may be present either alone or in plurality.

In addition, the same applies to those (for example, a carboxyl group) which may be in a form of a salt as a group other than a sulfo group.

Specific examples of the anthrapyridone compound represented by Formula (25) are shown in Table 3. In Table 3, (K) and 2(K) mean a carboxy group and a dicarboxy group, respectively. Meanwhile, in the following specific examples, the sulfo group may be in a state of a salt.

TABLE 3

| No. | $R_{221}, R_{222}$ | $X_2$ | $Y_{221}, Y_{222}$ |
|---|---|---|---|
| 3-0-1 | $CH_3$ | 2,6-dimethylanilino | OH |
| 3-0-2 | $CH_3$ | 2,6-dimethylanilino | $NH_2$ |
| 3-0-3 | $CH_3$ | 2,5-dimethylanilino | OH |
| 3-0-4 | $CH_3$ | 2-methylanilino | OH |
| 3-0-5 | $CH_3$ | 2,4,6-trimethylanilino | OH |
| 3-0-6 | $CH_3$ | 2,4,6-trimethylanilino | $NH_2$ |
| 3-0-7 | H | 2,4,6-trimethylanilino | Cl |
| 3-0-8 | $CH_3$ | 2,4,6-trimethylanilino | 2-methylhexylamino |
| 3-0-9 | $CH_3$ | 2,6-diisopropylanilino | OH |
| 3-0-10 | $CH_3$ | 2,6-diisopropylanilino | $NH_2$ |
| 3-0-11 | $C_2H_5$ | 2,6-diisopropylanilino | Cl |
| 3-0-12 | $CH_3$ | 2,6-diisopropylanilino | monoethanolamino |
| 3-0-13 | $CH_3$ | 2,5-diisopropylanilino | OH |
| 3-0-14 | $CH_3$ | 2,6-diethylanilino | OH |
| 3-0-15 | $CH_3$ | 2,6-diethylanilino | $NH_2$ |
| 3-0-16 | $CH_3$ | 2,6-diethylanilino | Cl |
| 3-0-17 | $CH_3$ | 2,6-diethylanilino | 2-ethylhexylamino |
| 3-0-18 | $CH_3$ | 2,6-diethylanilino | monoethanolamino |
| 3-0-19 | $CH_3$ | 2,6-diethylanilino | diethanolamino |
| 3-0-20 | $C_2H_4OH$ | 2,6-diethylanilino | morpholino |
| 3-0-21 | $CH_3$ | 2,5-diethylanilino | OH |
| 3-0-22 | $CH_3$ | 2,5-diethylanilino | $NH_2$ |
| 3-0-23 | $CH_3$ | 2-(K)-anilino | OH |
| 3-0-24 | $CH_3$ | 2-(K)-anilino | $NH_2$ |
| 3-0-25 | $CH_3$ | 2,5-2(K)-anilino | OH |
| 3-0-26 | $C_4H_9$ | 2,5-2(K)-anilino | $NH_2$ |
| 3-0-27 | $CH_3$ | 3,5-2(K)-anilino | OH |
| 3-0-28 | $CH_3$ | 3-(K)-anilino | OH |
| 3-0-29 | $CH_3$ | 4-(K)-anilino | OH |
| 3-0-30 | $CH_3$ | 5-(K)-2-methylanilino | OH |
| 3-0-31 | $CH_3$ | 5-(K)-2-ethylanilino | OH |
| 3-0-32 | $CH_3$ | 2,5-diisopropylanilino | Cl |
| 3-0-33 | $CH_3$ | 2,4,6-trimethylanilino | Cl |
| 3-0-34 | $CH_3$ | 2-(K)-anilino | Cl |
| 3-0-35 | $CH_3$ | 3,5-2(K)-anilino | Cl |
| 3-0-36 | $CH_3$ | 4-(K)-anilino | Cl |
| 3-0-37 | $CH_3$ | 3-(K)-anilino | Cl |

A method of synthesizing the compound represented by Formula (25) will be described.

The anthrapyridone compound of Formula (25) is prepared by, for example, the following method. That is, by reacting the compound of Formula (25-3) (in the formula, $R_{231}$ represents the same meaning as described above) which is a primary condensate obtained by reaction of 1 mole of the compound of the following Formula (25-2)

[Chem. 54]

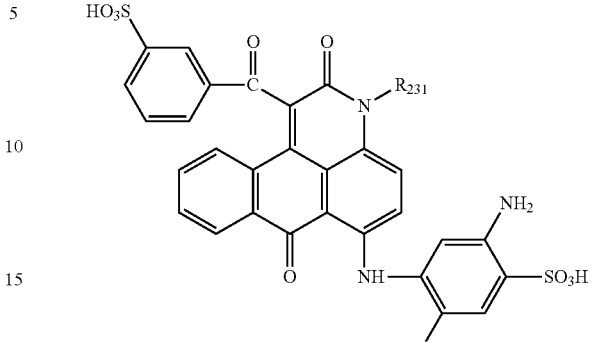

(25-2)

(in the formula, $R_{231}$ represents the same meaning as described above) with 1 to 1.3 moles of 2,4,6-trichloro-S-triazine (cyanuric chloride) in water at a pH of 2 to 7 and 5° C. to 35 C for 2 to 8 hours,

[Chem. 55]

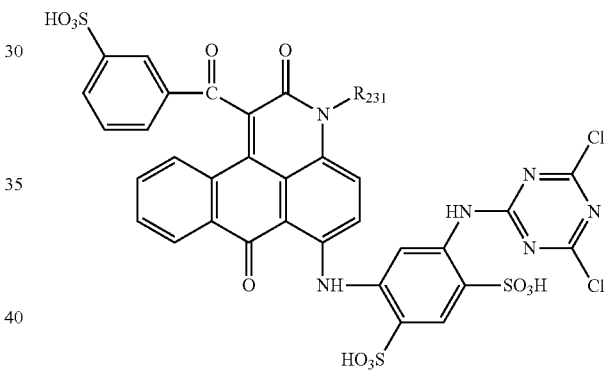

(25-3)

with 1 mole of corresponding anilines at a pH of 4 to 9 and 5° C. to 90° C. for 10 minutes to 5 hours, the compound of Formula (25-4) in which $Y_{231}$ is a chlorine atom

[Chem. 56]

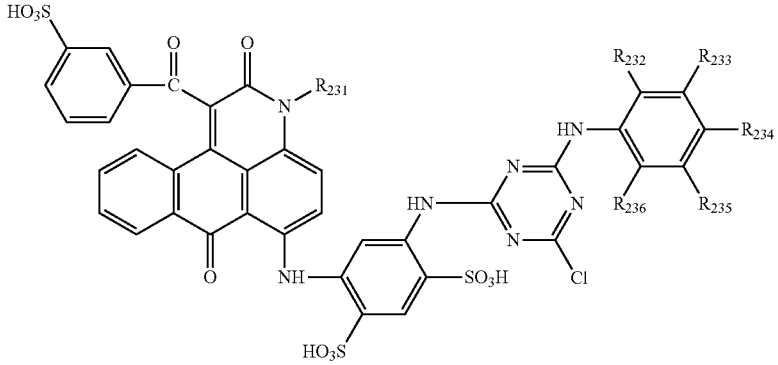

(25-4)

(in the formula, $R_{231}$ to $R_{236}$ have the same meaning as described above) is obtained as a secondary condensate. Subsequently, by performing hydrolysis at a pH of 9 to 12 and 50° C. to 100° C. for 10 minutes to 5 hours, or reacting ammonium or the corresponding amines at a pH of 8 to 10 and 50° C. to 100° C. for 10 minutes to 8 hours, a compound of Formula (25-5) in which $Y_{231}$ is other than a chlorine atom

[Chem. 57]

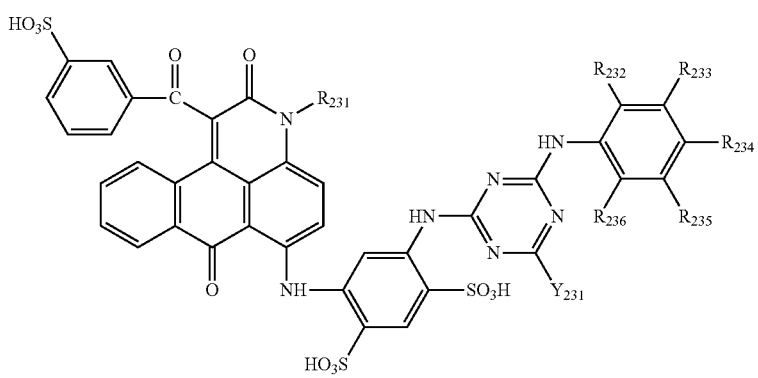

(25-5)

(In the formula, $R_{231}$ to $R_{236}$ and $Y_{231}$ represents the same meaning as described above) is obtained as a tertiary condensate.

Meanwhile, the order of the condensation is appropriately determined depending on the reactivities of various compounds, but is not limited to the above order.

The compound thus obtained is present in a form of free acid, or in a form of the salt thereof. The method of producing a salt is the same as the method of producing a salt in the compound represented by Formula (24).

Meanwhile, the anthrapyridone compound of Formula (25-2) may be obtained in the same manner as in the Synthetic Example of the anthrapyridone compound of Formula (24-6) in the synthesis method of Formula (24). Meanwhile, $R_{221}$ in Formula (24-6) is reread as $R_{231}$, and $R_{231}$ in Formula (25-2) represents the same meaning as described above.

[Compound Represented by Formula (34)]

Subsequently, a compound represented by the following Formula (34) will be described. The coloring composition including the compound having the specific xanthene skeleton represented by Formula (11) or a salt thereof, and a compound represented by the following Formula (34) are excellent in moisture resistance, and are also excellent in hue, saturation and ozone resistance.

Since a synergistic effect due to interaction (control of permeability in a print medium, or becoming a preferred absorption waveform in the design of hue) is exhibited by using the compound represented by Formula (11) and the compound represented by Formula (34) or the salt thereof in combination, it is thought that a coloring composition which is particularly excellent in moisture resistance, hue and chroma may be prepared.

[Chem. 58]

Formula (34)

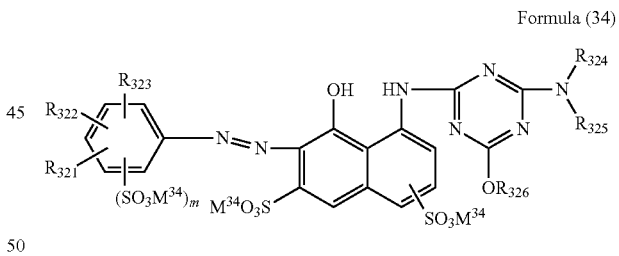

In Formula (34), $R_{321}$, $R_{322}$ and $R_{323}$ each independently represent a hydrogen atom, a substituted or unsubstituted alkyl group having 1 to 9 carbon atoms, an alkoxy group having 1 to 9 carbon atoms, a halogen atom, a hydroxyl group, a substituted or unsubstituted carbamoyl group, a substituted or unsubstituted sulfamoyl group, a substituted or unsubstituted amino group, a nitro group, a sulfonic acid ester group, a substituted or unsubstituted alkylsulfonyl group having 1 to 9 carbon atoms, an arylsulfonyl group having 6 to 15 carbon atoms, a carboxyl group or a carboxylic acid ester group.
m represents 0, 1 or 2.

$R_{324}$, $R_{325}$ and $R_{326}$ each independently represents a hydrogen atom, a substituted or unsubstituted alkyl group having 1 to 18 carbon atoms, a substituted or unsubstituted alkenyl group having 2 to 18 carbon atoms, a substituted or unsubstituted aryl group, a substituted or unsubstituted aralkyl group or a substituted or unsubstituted heterocyclic group.

$M^{34}$ represents a hydrogen atom or a counter cation. A plurality of $M^{34}$'s may be the same or different.

In Formula (34), $R_{321}$, $R_{322}$ and $R_{323}$ each independently represent a hydrogen atom, a substituted or unsubstituted alkyl group having 1 to 9 carbon atoms, an alkoxy group having 1 to 9 carbon atoms, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonic acid ester group, a substituted or unsubstituted alkylsulfonyl group having 1 to 9 carbon atoms, an arylsulfonyl group having 6 to 15 carbon atoms, a carboxyl group or a carboxylic acid ester group.

The alkyl group having 1 to 9 carbon atoms may be any one of straight, branched or cyclic (a cycloalkyl group) alkyl group, and examples thereof include a methyl group, an ethyl group, an n-propyl group, an isopropyl group, an n-butyl group, a cyclohexyl group and the like.

The alkyl group having 1 to 9 carbon atoms is preferably a straight or branched alkyl group, and more preferably a straight or branched alkyl group having 1 to 4 carbon atoms.

The alkyl group may have a substituent, examples of the substituent include the substituents described in the Group A of substituents, and preferred examples thereof include a halogen atom, an amino group and the like. These substituents may be further substituted with the substituents described in the Group A of substituents.

Examples of the alkyl group having a substituent include a trifluoromethyl group, a dimethylaminomethyl group and the like.

Examples of the alkoxy group having 1 to 9 carbon atoms include a methoxy group, an ethoxy group, an isopropoxy group, an n-butoxy group and the like, an alkoxy group having 1 to 4 carbon atoms is preferred, and a methoxy group or an ethoxy group is more preferred.

Examples of the halogen atom may include a fluorine atom, a chlorine atom, a bromine atom and the like, and the halogen atom is preferably a chlorine atom.

Examples of the carbamoyl group include a carbamoyl group having a substituent in addition to an unsubstituted carbamoyl group.

Examples of the substituent include the substituents described in the Group A of substituents, and preferred examples thereof include an alkyl group, an aryl group and the like.

Examples of the carbamoyl group having a substituent include an N,N-dimethylcarbamoyl group, a phenylcarbamoyl group and the like.

Examples of the sulfamoyl group include a sulfamoyl group having a substituent in addition to an unsubstituted sulfamoyl group.

Examples of the substituent include the substituents described in the Group A of substituents, and preferred examples thereof include an alkyl group, an aryl group and the like. These substituents may be further substituted with the substituents described in the Group A of substituents.

Examples of the sulfamoyl group having a substitutent include an N-methylsulfamoyl group, an N-ethylsulfamoyl group, an N-ethyl-N-phenylsulfamoyl group, an N,N-dimethylsulfamoyl group, a p-carboxyphenylsulfamoyl group and the like.

Examples of the amino group include an amino group having a substituent in addition to an unsubstituted amino group.

Examples of the substituent include the substituents described in the Group A of substituents, and preferred examples thereof include an alkyl group, a carbamoyl group, an acyl group and the like.

Examples of the amino group having a substituent include an N-methylamino group, a carbamoylamino group, an N,N-diethylamino group, an acetylamino group and the like.

Examples of the sulfonic acid ester group include an alkyloxysulfonyl group, an aryloxysulfonyl group and the like, and for example, a phenoxysulfonyl group and the like.

The alkylsulfonyl group having 1 to 9 carbon atoms is preferably an alkylsulfonyl group having 1 to 4 carbon atoms, and examples thereof include a methylsulfonyl group, an ethylsulfonyl group and the like.

The alkylsulfonyl group having 1 to 9 carbon atoms may have a substituent, examples of the substituent include the substituents described in the Group A of substituents, and preferred examples thereof include an aryl group, a hydroxyl group and the like.

Examples of the alkylsulfonyl group having a substituent include a hydroxyethylsulfonyl group, a benzylsulfonyl group and the like.

Examples of the arylsulfonyl group having 6 to 15 carbon atoms include a phenylsulfonyl group and the like.

Examples of the carboxylic acid ester group include an alkyloxycarbonyl group, an aryloxycarbonyl group and the like, an alkyloxycarbonyl group is preferred, and examples thereof include a methoxycarbonyl group and the like.

For reasons of the availability of raw materials and hue, light fastness, ozone resistance and moisture resistance in a printed matter, $R_{321}$, $R_{322}$ and $R_{323}$ are each independently preferably an alkyl group having 1 to 3 carbon atoms, a halogen atom, a hydrogen atom or a carboxyl group, more preferably a halogen atom, a hydrogen atom or a carboxyl group, and even more preferably a hydrogen atom or a carboxyl group.

Furthermore, it is preferred that one or two of $R_{321}$, $R_{322}$ and $R_{323}$ is or are a hydrogen atom.

In Formula (34), m represents 0, 1 or 2.

For a reason of striking a balance between both moisture resistance and water solubility, m is preferably 0 or 1, and more preferably 0.

In Formula (34), $R_{324}$, $R_{325}$ and $R_{326}$ each independently represents a hydrogen atom, a substituted or unsubstituted alkyl group having 1 to 18 carbon atoms, a substituted or unsubstituted alkenyl group having 2 to 18 carbon atoms, a substituted or unsubstituted aryl group, a substituted or unsubstituted aralkyl group or a substituted or unsubstituted heterocyclic group.

The alkyl group having 1 to 18 carbon atoms may be any one of straight, branched or cyclic (a cycloalkyl group) alkyl group, and examples thereof include a methyl group, an ethyl group, an n-propyl group, an isopropyl group, an n-butyl group, a t-butyl group, an n-hexyl group, an n-octyl group, an ethylhexyl group, a methylbutyl group, a cyclohexyl group and the like.

The alkyl group having 1 to 18 carbon atoms is preferably a straight or branched alkyl group, and more preferably a straight or branched alkyl group having 1 to 8 carbon atoms.

The alkyl group may have a substituent, examples of the substituent include the substituents described in the Group A of substituents, and preferred examples thereof include an aryl group, a hydroxyl group, a carboxyl group, a carbamoyl group, a mercapto group, a morpholinyl group and the like.

Examples of the alkyl group having a substituent include a hydroxyethyl group, a carboxypropyl group, a carboxycyclohexylmethyl group, a 1-carboxy-2-mercaptoethyl group, a 1-carboxy-2-carbamoyl-ethyl group, a 1-isopropyl-1-carboxymethyl group, a 1,2-dicarboxypropyl group and the like.

The alkenyl group having 2 to 18 carbon atoms is preferably an alkenyl group having 2 to 8 carbon atoms, and examples thereof include a vinyl group, an allyl group and the like.

The alkenyl group may have a substituent, examples of the substituent include the substituents described in the Group A of substituents, and preferred examples thereof include an alkyl group, a carboxyl group and the like.

Examples of the alkenyl group having a substituent include a 2-methyl-1-propenyl group and the like.

The aryl group is preferably an aryl group having 6 to 20 carbon atoms, examples thereof include a phenyl group, a naphthyl group and the like, and a phenyl group is particularly preferred.

The aryl group may have a substituent, examples of the substituent include the substituents described in the Group A of substituents, and preferred examples thereof include an alkyl group, a carboxyl group, a substituted or unsubstituted sulfamoyl group, a substituted or unsubstituted carbamoyl group, a nitro group, a hydroxyl group, a halogen atom and the like.

Examples of the aryl group having a substituent include a 3,4-dicarboxyphenyl group, a 4-butylphenyl group, a 4-carboxyphenyl group and the like.

Examples of the aralkyl group include a benzyl group and the like.

The aralkyl group may have a substituent, examples of the substituent include the substituents described in the Group A of substituents, and preferred examples thereof include a hydroxyl group, a carboxyl group and the like. These substituents may be further substituted with the substituents described in the Group A of substituents.

Examples of the aralkyl group having a substituent include a 1-carboxy-2-phenyl-ethyl group, a 1-carboxy-2-hydroxyphenylethyl group, a 4-carboxybenzyl group and the like.

Examples of the heterocyclic group include a pyridyl group, a pyrazinyl group, a thienyl group, a thiadiazolyl group, a benzothiazolyl group and the like.

The heterocyclic group may have a substituent, examples of the substituent include the substituents described in the Group A of substituents, and preferred examples thereof include an alkyl group, a carboxyl group and the like.

Examples of the heterocyclic group having a substituent include a 2,2,6,6-tetramethylpiperidinyl group and the like.

From the viewpoint of the availability of raw materials, the ease of synthesis, water solubility and moisture resistance, at least one of $R_{324}$, $R_{325}$ and $R_{326}$ is preferably an alkyl group, an alkenyl group, an aryl group, an aralkyl group or a heterocyclic group, which is substituted with 1 to 4 carboxyl groups, and at least one of $R_{324}$, $R_{325}$ and $R_{326}$ is more preferably an alkyl group, an alkenyl group, an aryl group or an aralkyl group, which is substituted with 1 to 4 carboxyl groups.

Further, it is preferred that one of $R_{324}$ and $R_{325}$ represents a hydrogen atom and the other is an alkyl group, an alkenyl group, an aryl group or an aralkyl group, which is substituted with 1 to 4 carboxyl groups, and it is more preferred that one of $R_{324}$ and $R_{325}$ represents a hydrogen atom and the other is an aryl group which is substituted with 1 to 4 carboxyl groups.

In addition, in order to prepare a recording liquid of a preferred magenta color, it is preferred that $R_{324}$ and $R_{325}$ are each independently a hydrogen atom or a group represented by the following Formula (34-1).

[Chem. 59]

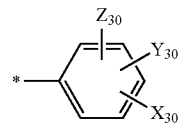

Formula (34-1)

In Formula (34-1), $X_{30}$, $Y_{30}$ and $Z_{30}$ each independently represent a hydrogen atom, a halogen atom, a hydroxyl group, a substituted or unsubstituted alkyl group having 1 to 9 carbon atoms, an alkoxy group having 1 to 9 carbon atoms, a substituted or unsubstituted carbamoyl group, a substituted or unsubstituted sulfamoyl group, a substituted or unsubstituted amino group, a nitro group, a sulfonic acid ester group or a carboxylic acid ester group.

Specific examples and preferred examples of each group which $X_{30}$, $Y_{30}$ and $Z_{30}$ represent are the same as the specific examples and preferred examples of each group which $R_{321}$, $R_{322}$ and $R_{323}$ represent.

In Formula (34), $M^{34}$ represents a hydrogen atom or a counter cation. A plurality of $M^{34}$'s may be the same or different.

In Formula (34), when $M^{34}$ is a hydrogen atom, the hydrogen atom is in a form of a free acid, and when $M^{34}$ is a counter cation, the counter cation is in a form of a salt.

Examples of the counter cation that forms a salt include a monovalent counter cation, and the counter cation is preferably an alkali metal ion, an ammonium ion, an organic cation and the like.

Examples of the organic cation include an ammonium ion (for example, an ammonium ion substituted with an alkyl group or a hydroxyalkyl group) having a substituent, and a cation in which a hydrogen ion is added to an organic amine (for example, a cation and the like in which a hydrogen ion is added to a lower alkylamine, a hydroxy-substituted lower alkylamine, a carboxy-substituted lower alkylamine, and a polyamine having from 2 to 10 alkyleneimine units each having from 2 to 4 carbon atoms and the like).

From the viewpoint of water solubility, an alkali metal ion is preferred, and a lithium ion, a sodium ion and a potassium ion are more preferred. In particular, the sodium ion is preferred from the viewpoint of inexpensive production.

In Formula (34), a plurality of $M^{34}$'s may be the same or different. That is, the compound represented by Formula (34) in a form of a salt includes a case where all sulfo groups are salts, and a case where some sulfo groups are in a form of a free acid and some sulfo groups are salts. Furthermore, the counter cation forming a salt may be present either alone or in plurality.

Further, the same applies to those (for example, a carboxyl group) which may be in a form of a salt as a group other than a sulfo group.

It is particularly preferred that the compound represented by Formula (34) has 6 or less, preferably 5 or less, and particularly preferably 4 or less of the sum of a sulfo group, a carboxyl group or a group of the salt of an acid thereof in the structure thereof.

The compound used in the present invention may be used in the form of the free acid represented by Formula (34) as it is, but when the compound is obtained in the form of a salt during the preparation, the compound may be used as it is, and may be modified into the form of a desired salt. In addition, some of the acidic group may be in the form of a salt, and a compound in the form of a salt and a compound in the form of a free acid may be present in a mixed state.

Specific examples of the compound represented by Formula (34) include compounds having a structure shown in the following No. 2-1 to 2-58.

[Chem. 60]
2-1
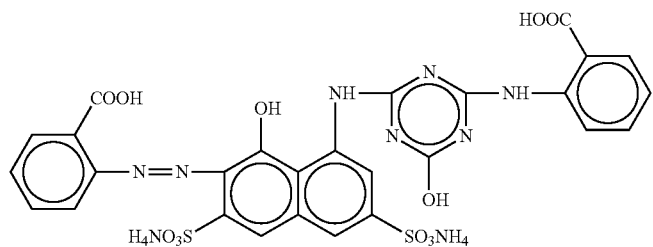
2-2
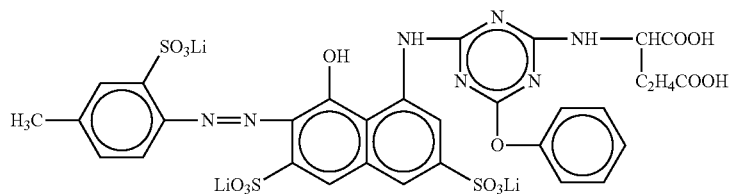
2-3
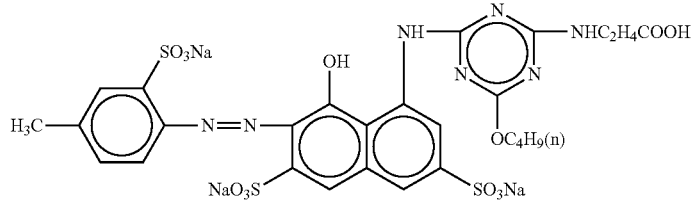
2-4
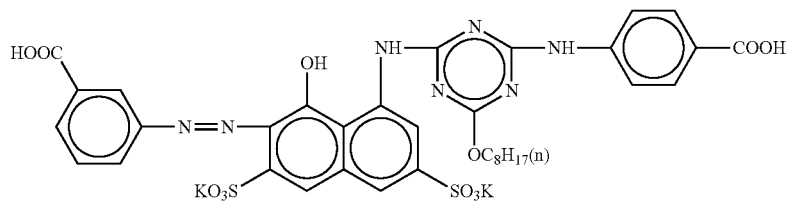
2-5
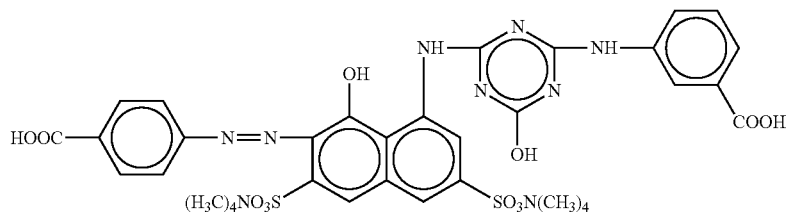
2-6
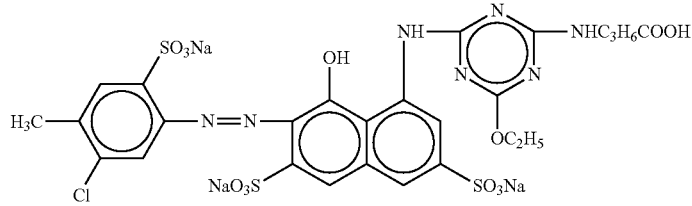
[Chem. 61]
2-7
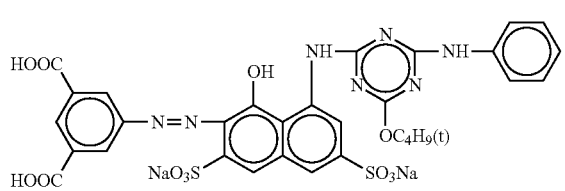
2-8
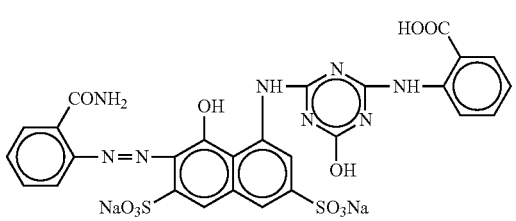

-continued
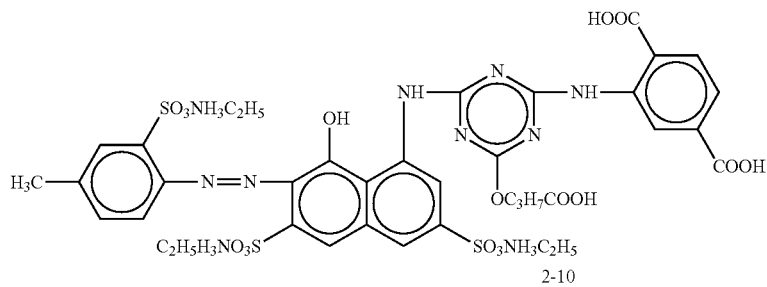
2-9
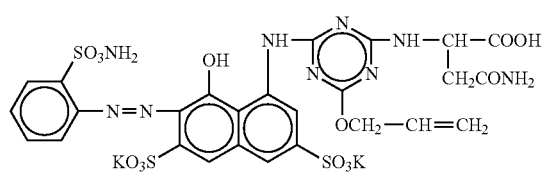
2-10
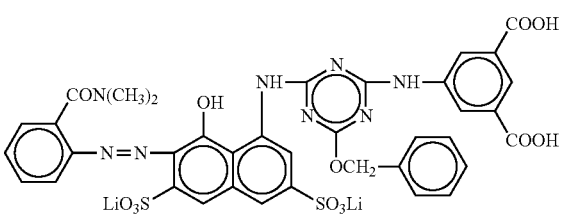
2-11
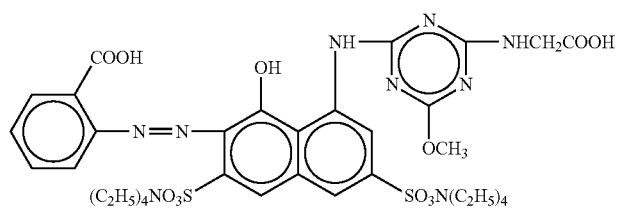
2-12
[Chem. 62]
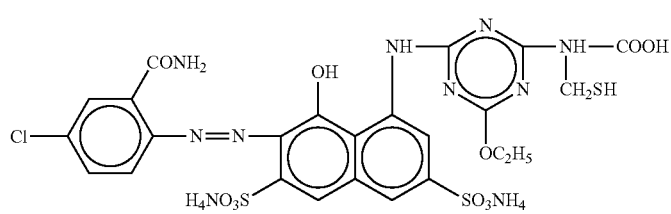
2-13
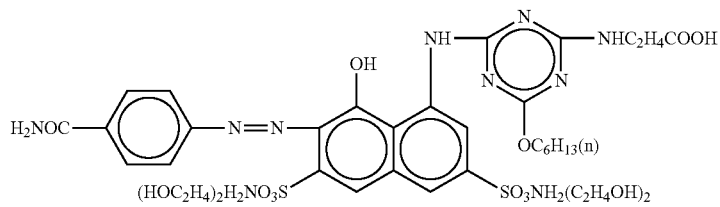
2-14
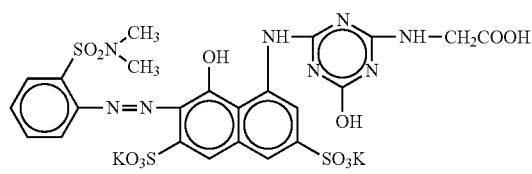
2-15
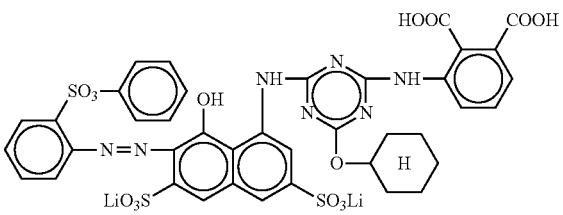
2-16
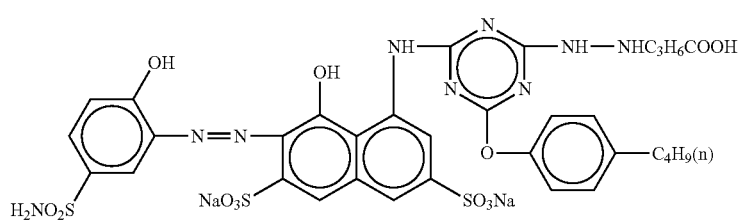
2-17

-continued
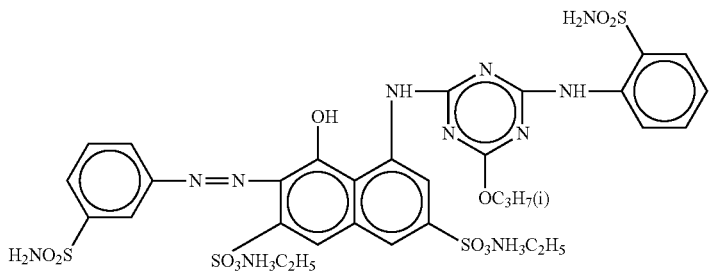
2-18
[Chem.63]
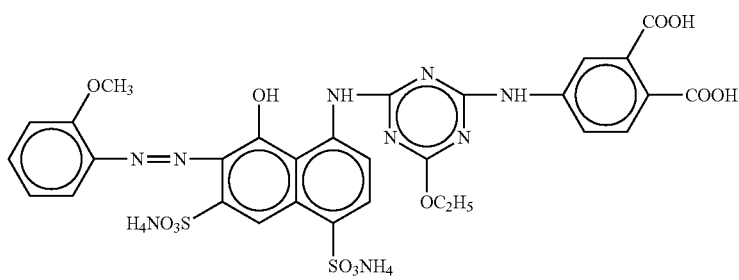
2-19
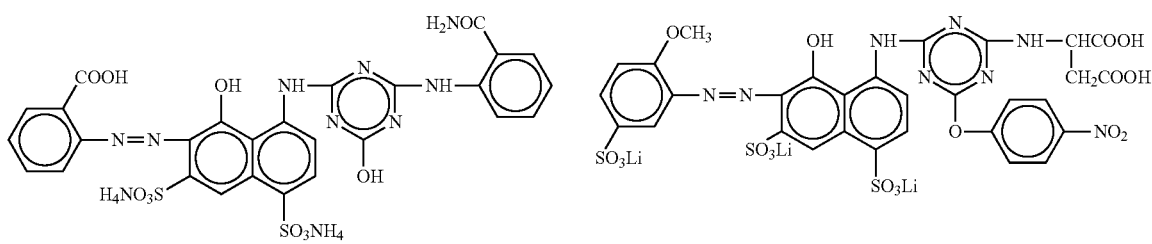
2-20            2-21
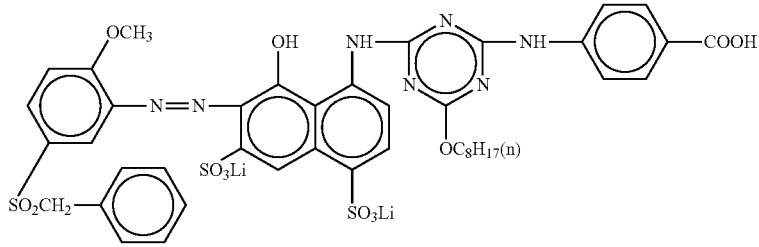
2-22
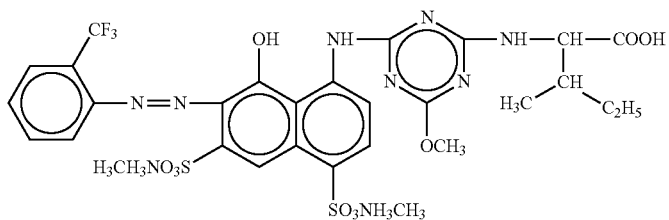
2-23
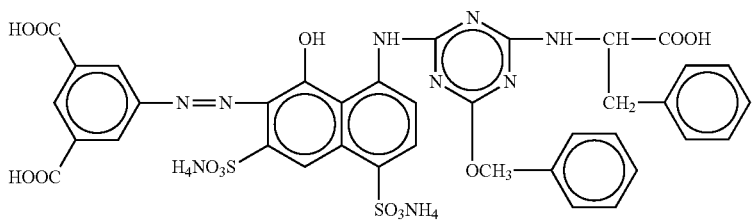
2-24

[Chem. 64]
2-25
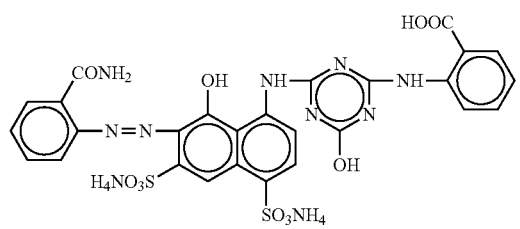
2-26
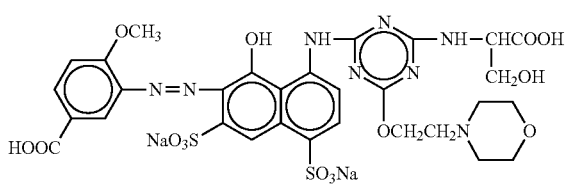
2-27
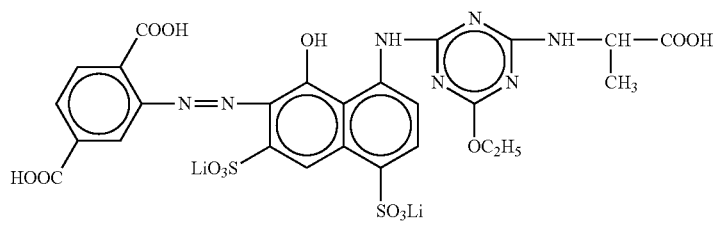
2-28
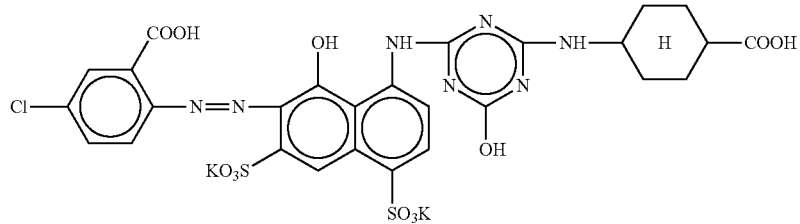
2-29
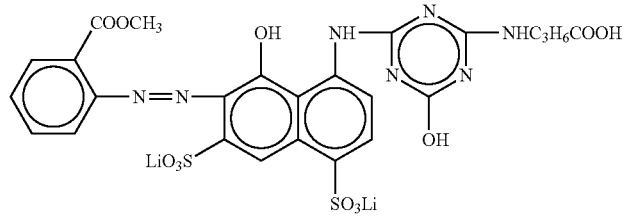
2-30
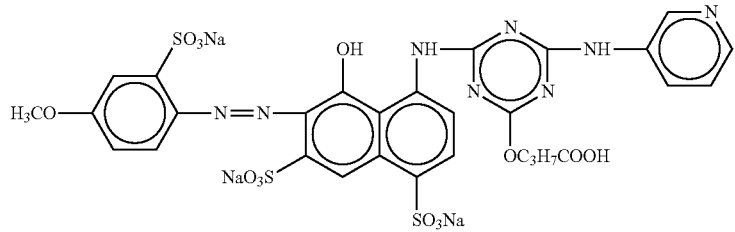
[Chem. 65]
2-31
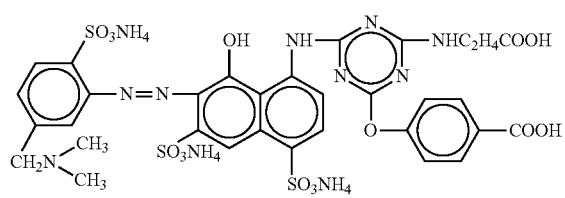
2-32
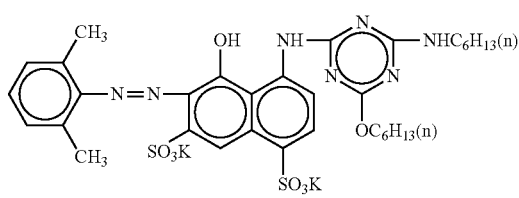

-continued
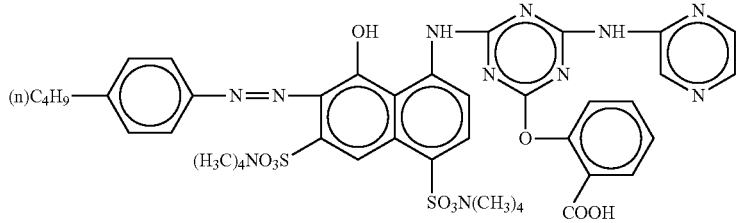
2-33
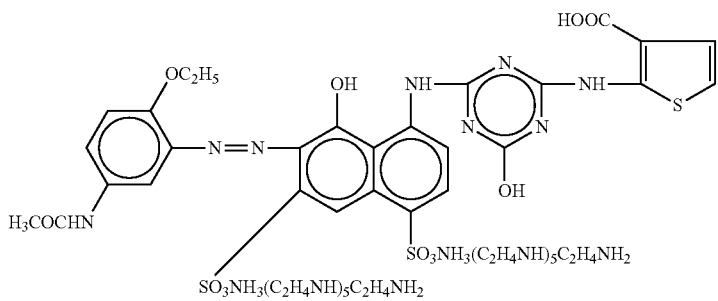
2-34
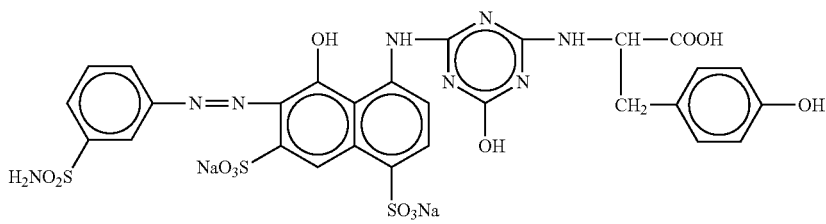
2-35
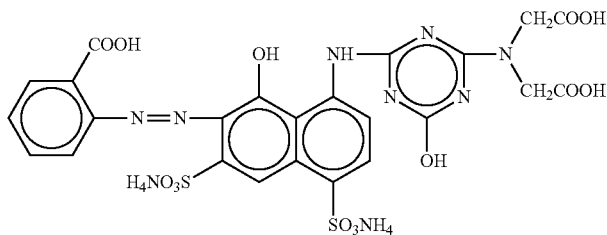
2-36
[Chem. 66]
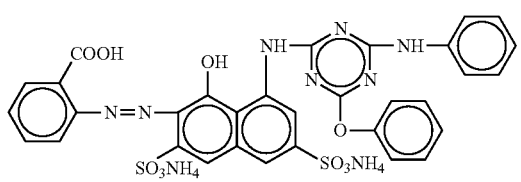
2-37
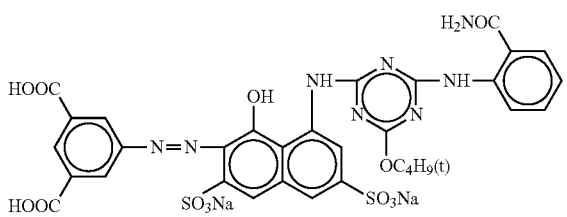
2-38
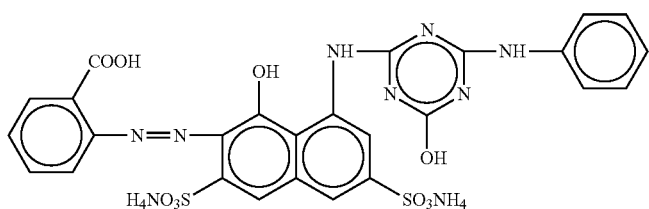
2-39

-continued
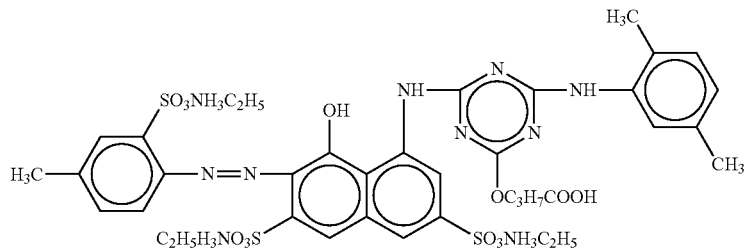
2-40
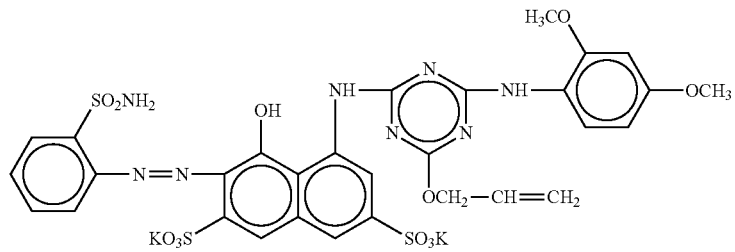
2-41
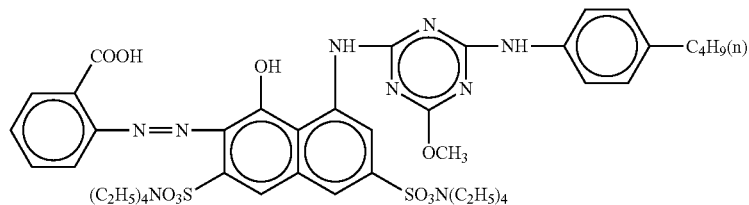
2-42
[Chem. 67]
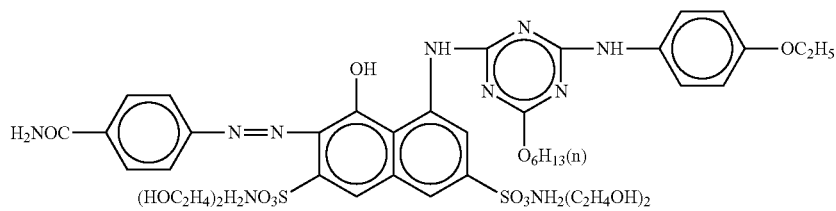
2-43
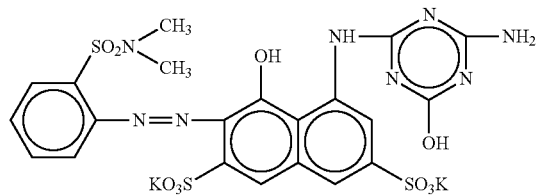
2-44
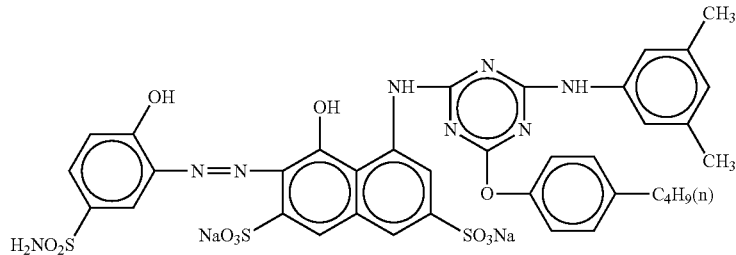
2-45

-continued
2-46
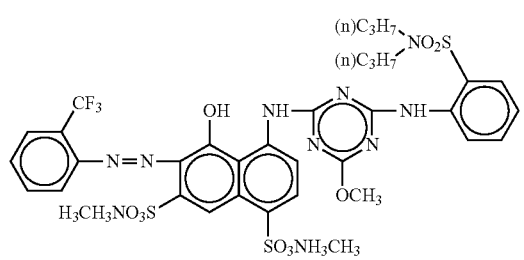
2-47
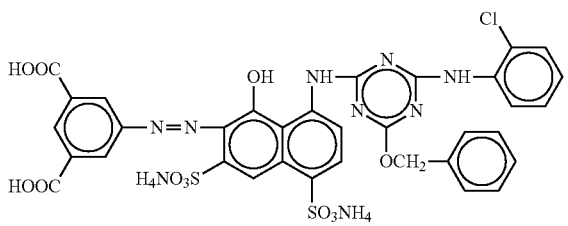
[Chem. 68]
2-48
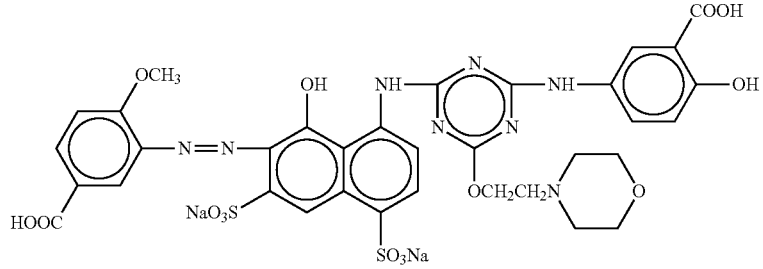
2-49
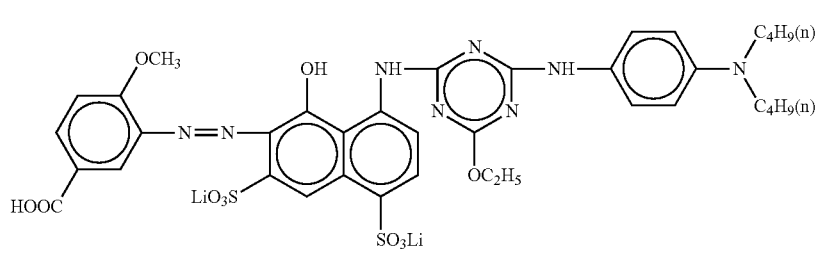
2-50
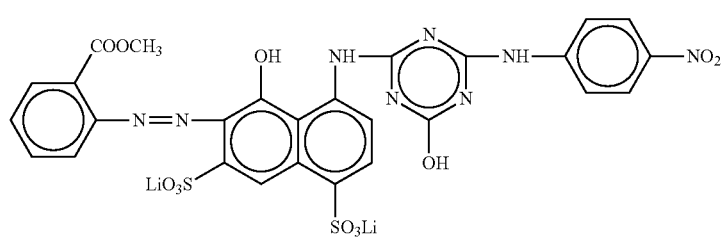
2-51
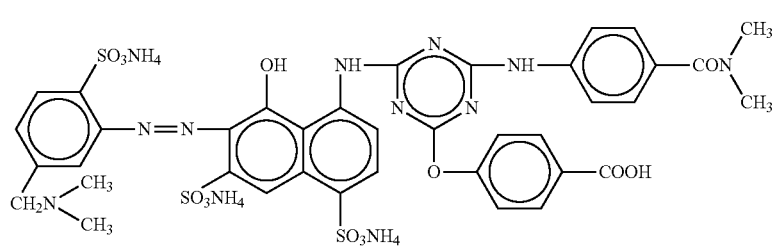
2-52
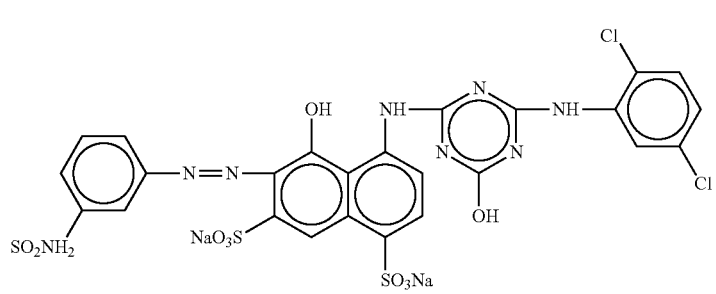

[Chem. 69]

2-53
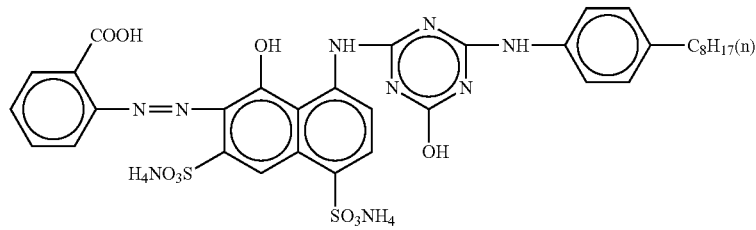

2-54
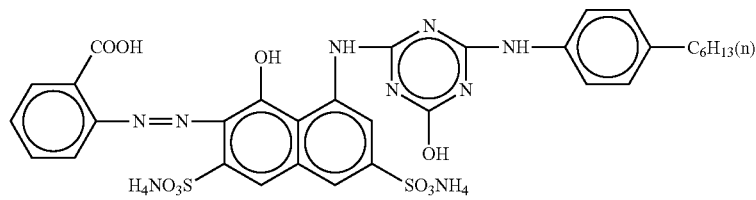

2-55
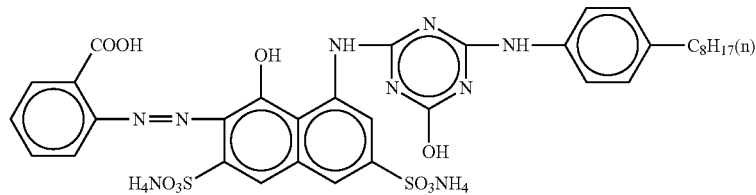

2-56
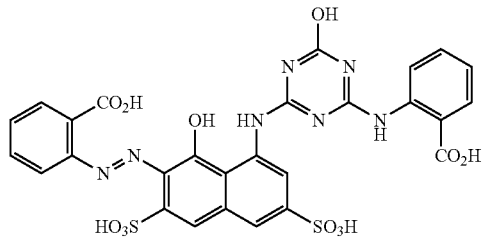

2-57
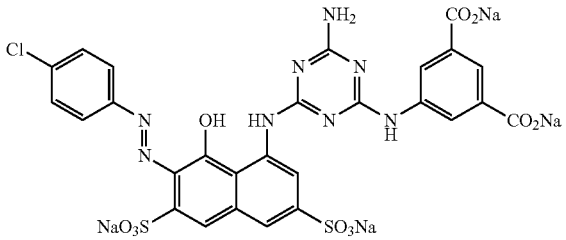

2-58
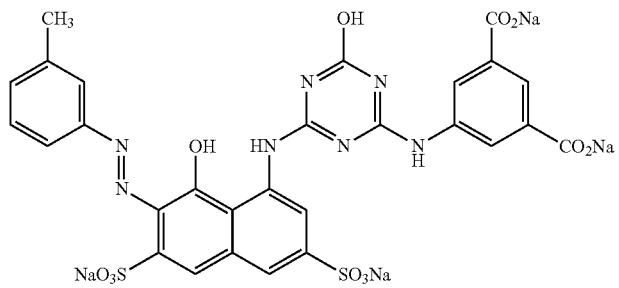

The compound represented by Formula (34) may be prepared by a publicly known method. For example, the colorant represented by No. 2-1 may be prepared by the following (A) to (C) processes.

(A) From 2-aminobenzoic acid (anthranilic acid) and 1-amino-8-hydroxy-3,6-naphthalenedisulfonic acid (H-acid), a monoazocompound is prepared through the steps of diazotization and coupling according to a typical method [see, for example, pp. 396 to 409 of "New Dyestuff Chemistry" written by Yutaka Hosoda (published by Gihodo Co., Dec. 21, 1973)].

(B) The obtained monoazocompound is added to a cyanuric chloride suspension while maintaining the pH at 4 to 6 and the temperature at 0° C. to 5° C., and reacted for several hours. Subsequently, an aqueous solution of 2-aminobenzoic acid (anthranilic acid) is added to the reaction mixture at room temperature such that the reaction mixture does not become alkaline, and the reaction mixture is subjected to condensation reaction for several hours. Subsequently, a 25% sodium hydroxide aqueous solution is added thereto at 50° C. to 60° C. to make the reaction mixture strongly alkaline, thereby causing a hydrolysis reaction to complete the reaction.

(C) After cooling, the reaction product may be subjected to salting out with sodium chloride to obtain a target compound No. 2-1.

[Coloring Composition]

An example of the coloring composition of the present invention contains at least one of the compound represented by Formula (1) of the present invention.

Another example of the coloring composition of the present invention contains at least one of the compound represented by Formula (11) of the present invention and at least one of the compound represented by Formula (14) of the present invention. Both good fastness and good hue may be compatible by a synergistic effect of the compound represented by Formula (11) and the compound represented by Formula (14).

Still another example of the coloring composition of the present invention contains the compound represented by Formula (11) and at least one selected from the group consisting of the compound represented by Formula (24) and the compound represented by Formula (25). Any one or both of the compound represented by Formula (24) and Formula (25) may be used. Both good fastness and good print concentration may be compatible by a synergistic effect due to interaction (deactivation by intermolecular energy shift of excited energy, control of permeability in a print medium and the like) by using the compound represented by Formula (11) and at least one selected from the group consisting of the compound represented by Formula (24) and the compound represented by Formula (25) in combination.

Yet another example of the coloring composition of the present invention contains the compound represented by Formula (11) and the compound represented by Formula (34). A synergistic effect is exhibited by interaction (control of permeability in a print medium, or becoming a preferred absorption waveform in the design of hue) by using the compound represented by Formula (11) and the compound represented by Formula (34) in combination, so that good moisture resistance, ozone resistance, hue and chroma may be obtained.

The coloring composition of the present invention may contain a medium, and is particularly suitable as an ink for inkjet recording in the case of using a solvent as the medium. The coloring composition of the present invention may be manufactured by using a lipophilic medium or an aqueous medium as a medium, and dissolving and/or dispersing the compound in the medium. The coloring composition of the present invention is preferably manufactured by using an aqueous medium. A composition for ink except for the medium is also included in the coloring composition of the present invention.

In the present invention, the content of the compound of the present invention included in the coloring composition may be determined by the kind of substituent in Formula (1) to be used, the kind of solvent component used to prepare the coloring composition and the like, and the content of the compound represented by Formula (1) in the coloring composition is preferably 1 to 20% by mass, more preferably 1 to 10% by mass and even more preferably 2 to 6% by mass, based on the total mass of the coloring composition.

A required image concentration may be secured while improving chromogenic property of ink on a recording medium during printing by setting the content of the compound represented by Formula (1) included in the coloring composition to 1% by mass or more. In addition, discharge property of the coloring composition used in the inkjet recording method may be improved by setting the total amount of the compound represented by Formula (1) included in the coloring composition to 10% by mass or less, and furthermore, an effect in that it is difficult for the inkjet nozzle to be clogged and the like may be obtained.

In the present invention, the content of the compound of the present invention included in the coloring composition may be determined by the kind of substituent in Formulae (11), (14), (24), (25) and (34) to be used, the kind of solvent component used to prepare the coloring composition and the like, and the content of the compound represented by Formula (11) in the coloring composition is preferably 1 to 20% by mass, more preferably 1 to 10% by mass and even more preferably 2 to 6% by mass, based on the total mass of the coloring composition.

Chromogenic property of ink on a recording medium during printing may be improved by setting the content of the compound represented by Formula (11) included in the coloring composition to 1% by mass or more, and further, a required image concentration may be secured. In addition, discharge property of the coloring composition used in the inkjet recording method may be improved by setting the total amount of the compound represented by Formula (11) included in the coloring composition to 20% by mass or less, and furthermore, an effect in that it is difficult for the inkjet nozzle to be clogged and the like may be obtained.

When the coloring composition includes the compound represented by Formula (14), the content of the compound represented by Formula (14) in the coloring composition is preferably 1 to 18% by mass and more preferably 1 to 10% by mass based on the total mass of the coloring composition from the viewpoint of hue.

In the coloring composition, the mass ratio of the compound represented by Formula (14) to the compound represented by Formula (14) is preferably 9/1 to 1/9, more preferably 2/8 to 8/2, and even more preferably 2/8 to 6/4. It is preferred to set the mass ratio within the aforementioned ranges from the viewpoint of the balance of light fastness, ozone resistance and hue.

When the coloring composition includes one or both of the compounds represented by Formulae (24) and (25), the combined content ratio of the compound represented by Formula (24) to the compound represented by Formula (25) in the coloring composition is preferably 1 to 20% by mass, more preferably 1 to 10% by mass, and even more preferably 1 to 6% by mass based on the total mass of the coloring composition, from the viewpoint of stability over time and discharging property of the coloring composition when used in an inkjet recording method.

In the coloring composition, the mass ratio of the content of the compound represented by Formula (11) to the combined content of the compound represented by Formula (24) and the compound represented by Formula (25) is preferably 9/1 to 1/9, more preferably 8/2 to 1/9, and even more preferably 5/5 to 1/9. It is preferred to set the mass ratio within the aforementioned ranges from the viewpoint of establishing ozone resistance, light fastness, moisture resistance and print concentration.

When the coloring composition includes the compound represented by Formula (34), the content ratio of the compound represented by Formula (34) in the coloring composition is preferably 1 to 20% by mass, more preferably 1 to 10% by mass, and even more preferably 2 to 6% by mass based on the total mass of the coloring composition, from the viewpoint of discharging property of the coloring composition when used in the inkjet recording method.

In the coloring composition, the mass ratio of the content of the compound represented by Formula (11) to the content of the compound represented by Formula (34) is preferably 9/1 to 1/9, more preferably 8/2 to 1/9, and even more preferably 5/5 to 1/9. It is preferred to set the mass ratio within the aforementioned ranges from the viewpoint of the balance of moisture resistance, print concentration, ozone resistance and light fastness.

The coloring composition of the present invention may contain other additives within a range not impairing the effect of the present invention, if necessary. Examples of the other additives include additives which may be used in the ink for inkjet recording to be described below.

[Ink for Inkjet Recording]

Subsequently, an ink for inkjet recording of the present invention will be described.

The present invention also relates to an ink for inkjet recording which contains the coloring composition of the present invention.

The ink for inkjet recording may be manufactured by dissolving and/or dispersing the compound (mixture) of the present invention in a lipophilic medium or an aqueous medium. The ink is preferably an ink using an aqueous medium.

If necessary, other additives may be contained within a range not impairing the effect of the present invention. Examples of the other additives include publicly known additives such as a drying inhibitor (wetting agent), a discoloration inhibitor, an emulsification stabilizer, a permeation accelerator, an ultraviolet absorbent, an antiseptic, a fungicide, a pH adjusting agent, a surface tension adjusting agent, a defoaming agent, a viscosity adjusting agent, a dispersing agent, a dispersion stabilizer, a rust inhibitor and a chelating agent. These various additives are directly added to an ink solution in the case of an aqueous ink. When an oil-soluble dye is used in the form of a dispersion, the additives are generally added to the dispersion after the preparation of a dye dispersion, but may be added to the oil or aqueous phase during the preparation.

The drying inhibitor is suitably used for the purpose of preventing occurrence of clogging as the ink for inkjet recording is dried in the ink jetting port of a nozzle used for an inkjet recording system.

It is preferred that the drying inhibitor is a water-soluble organic solvent having vapor pressure that is lower than that of water. Specific examples thereof include polyhydric alcohols represented by ethylene glycol, propylene glycol, diethylene glycol, polyethylene glycol, thiodi glycol, dithiodi glycol, 2-methyl-1,3-propandiol, 1,2,6-hexanetriol, an acetylene glycol derivative, glycerin, trimethylolpropane and the like, low alkylethers of polyhydric alcohol such as ethylene glycol monomethyl (or ethyl)ether, diethylene glycol monomethyl (or ethyl)ether and triethylene glycol monoethyl (or butyl) ether, heterocyclic rings such as 2-pyrrolidone, N-methyl-2-pyrrolidone, 1,3-dimethyl-2-imidazolidinone and N-ethylmorpholine, a sulfur-containing compound such as sulfolane, dimethylsulfoxide and 3-sulfolene, a polyfunctional compound such as diacetone alcohol and diethanol amine, and a urea derivative. Among the examples, polyhydric alcohol such as diethylene glycol is more preferred. Further, the drying inhibitor may be used either alone or two or more kinds thereof in combination. The drying inhibitor is preferably contained in an amount of 10 to 50% by mass in the ink.

The permeation accelerator is suitably used for the purpose of obtaining higher permeation of the ink for inkjet recording into paper. As the permeation accelerator, it is possible to use alcohols such as ethanol, isopropanol, butanol, di(tri)ethylene glycol monobutyl ether, and 1,2-hexanediol, sodium lauryl sulfate, sodium oleate, a nonionic surfactant, and the like. When the aforementioned permeation accelerator is contained in an amount of 10 to 30 mass % in the ink, there is typically a sufficient effect, so that it is preferred to use the permeation accelerator within an addition amount range causing no blurring of printed letter or no print through.

The ultraviolet absorbent is used for the purpose of enhancing the preservability of image. As the ultraviolet absorbent, it is possible to use a benzotriazole-based compound described in Japanese Patent Application Laid-Open Nos. S58-185677 and S61-190537, Japanese Patent Application Laid-Open Nos. H2-782, H5-197075, and H9-34057 and the like, a benzophenone-based compound described in Japanese Patent Application Laid-Open Nos. S46-2784 and H5-194483, U.S. Pat. No. 3,214,463 and the like, a cinnamic acid-based compound described in Japanese Patent Publication Nos. S48-30492 and S56-21141, Japanese Patent Application Laid-Open No. H10-88106 and the like, a triazine-based compound described in Japanese Patent Application Nos. H4-298503, H8-53427, H8-239368 and H10-182621, Japanese Unexamined Patent Application Publication No. H8-501291 and the like, a compound described in Research Disclosure No. 24239, or also a compound which absorbs UV to emit fluorescence, a so-called fluorescent brightening agent, which is represented by a stilbene-based compound and a benzoxazole-based compound.

The discoloration inhibitor is used for the purpose of enhancing the preservability of image. As the discoloration inhibitor, various organic discoloration inhibitors and metal complex-based discoloration inhibitors may be used. Examples of the organic discoloration inhibitor include hydroquinones, alkoxyphenols, dialkoxyphenols, phenols, anilines, amines, indanes, chromans, alkoxyanilines, heterocyclic rings and the like, and examples of the metal complex include a nickel complex, a zinc complex and the like. More specifically, it is possible to use compounds described in patents cited in Research Disclosure, Nos. 17643 (Items VII-I to VII-J), 15162, 18716 (page 650, left column), 36544 (page 527), 307105 (page 872) and 15162, or compounds included in formulae of representative compounds and in the examples of compounds described in Japanese Patent Application Laid-Open No. S62-215272 (pages 127 to 137).

Examples of the fungicide include sodium dehydroacetate, sodium benzoate, sodium pyridinethione-1-oxide, p-hydroxybenzoate ethyl ester, 1,2-benzisothiazolin-3-one, salts thereof and the like. The fungicide is preferably used in an amount of 0.02 to 1.00% by mass in the ink.

The aforementioned neutralizer (an organic salt group, and inorganic alkali) may be used as the pH adjusting agent. For the purpose of enhancing storage stability to an ink for inkjet recording, the pH adjusting agent is added such that the ink for inkjet recording has a pH of preferably 6 to 10, and more preferably 7 to 10.

Examples of the surface tension adjusting agent include nonionic, cationic or anionic surfactants. Meanwhile, the surface tension of the ink for inkjet recording of the present invention is preferably 25 to 70 mN/m. The surface tension is more preferably 25 to 60 mN/m. Furthermore, the viscosity of the ink for inkjet recording of the present invention is preferably 30 mPa·s or less. Further, the viscosity is more preferably adjusted to 20 mPa·s or less. Preferred examples of the surfactant include anionic surfactants such as fatty acid salt, alkylsulfuric ester salt, alkylbenzene sulfonate, alkylnaphthalene sulfonate, dialkyl sulfosuccinate, alkyl ester phosphate, naphthalene sulfonic acid formaline condensate, and polyoxyethylenealkyl ester sulfate, and non-ionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethyleneoxypropylene block copolymer. In addition, SURFYNOLS (Air Products & Chemicals Co., Ltd.) that is an acetylene-based polyoxyethylene oxide surfactant is also preferably used. Furthermore, amine oxide type ampholytic surfactants such as N,N-dimethyl-N-alkylamine oxide are also preferred. Further, it is also possible to use a surfactant exemplified as the surfactants in pages (37) and (38) of Japanese Patent Application Laid-Open No. S59-157,636 and Research Disclosure No. 308119 (1989).

As the defoaming agent, a chelating agent represented by fluorine- or silicon-based compounds or EDTA may also be used, if necessary.

When the compound of the present invention is dispersed in an aqueous medium, it is preferred that a colored particle containing the compound and an oil-soluble polymer is dispersed in an aqueous medium as described in Japanese Patent Application Laid-Open No. H11-286637, Japanese Patent Application Nos. H2000-78491, H2000-80259 and H2000-62370, or the compound of the present invention dissolved in a high-boiling point organic solvent is dispersed in an aqueous medium as described in Japanese Patent Application Nos. H2000-78454, H2000-78491, H2000-203856 and H2000-203857. When the compound of the present invention is dispersed in an aqueous medium, as a specific method, an oil-soluble polymer, a high-boiling point organic solvent and an additive, which are to be used, and the use amounts thereof, those described in the patent documents and the like may be preferably used. Otherwise, the compound of the present invention may be dispersed in the form of a solid as it is in a particle state. At the time of dispersing, a dispersing agent or a surfactant may be used. As the dispersing device, it is possible to use a simple stirrer, an impeller stirring system, an in-line stirring system, a mill system (for example, colloid mill, ball mill, sand mill, attritor, roll mill, agitator and the like), an ultrasonic system, and a high-pressure emulsion dispersion system (high-pressure homogenizer; Gaulin homogenizer, Microfluidizer, DeBEE 2000 and the like as a specific commercially available device). The aforementioned preparation method of the ink for inkjet recording is described in detail, in addition to the above-described patents, in Japanese Patent Application Laid-Open Nos. H5-148436, H5-295312, H7-97541, H7-82515, H7-118584 and H11-286637 and Japanese Patent Application No. 2000-87539, and may be used even for the preparation of the ink for inkjet recording of the present invention.

As the aqueous medium, a mixture containing water as a major component and added with a water-miscible organic solvent, if desired, may be used. Examples of the water-miscible organic solvent include alcohol (for example, methanol, ethanol, propanol, isopropanol, butanol, isobutanol, sec-butanol, t-butanol, pentanol, hexanol, cyclohexanol and benzylalcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodi glycol), a glycol derivative (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether and ethylene glycol monophenyl ether), amine (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine and tetramethylpropylenediamine), and other polar solvents (for example, formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone). Meanwhile, two or more water-miscible organic solvents may be used in combination.

The compound of the present invention is contained in an amount of preferably 0.2 part by mass to 10 parts by mass and more preferably 1 part by mass to 6 parts by mass in 100 parts by mass of the ink for inkjet recording of the present invention. In addition, other colorants may be used in combination with the compound of the present invention in the ink for inkjet recording of the present invention. When two or more colorants are used in combination, it is preferred that the sum of the contents of the colorants is in the aforementioned range.

It is preferred that the ink for inkjet recording of the present invention has a viscosity of 30 mPa·s or less. In addition, the surface tension thereof is preferably 25 mN/m to 70 mN/m. The viscosity and the surface tension may be adjusted by adding various additives, for example, a viscosity adjusting agent, a surface tension adjusting agent, a resistivity adjusting agent, a film adjusting agent, an ultraviolet absorbent, an antioxidant, a discoloration inhibitor, a fungicide, a rust inhibitor, a dispersant and a surfactant.

The ink for inkjet recording of the present invention may be used not only in forming a monochromatic image, but also in forming a full-color image. In order to form a full-color image, a magenta tone ink, a cyan tone ink and a yellow tone ink may be used, and also in order to adjust the tone, a black tone ink may be further used.

As an applicable yellow dye, any dye may be used. Examples of the yellow dye include an aryl or heterylazo dye having, for example, phenols, naphthols, anilines, heterocyclic rings such as pyrazolone or pyridone, chain-opening active methylene compounds and the like as a coupling component (hereinafter, referred to as "coupler component"); an azomethine dye having, for example, chain-opening active methylene compounds and the like as the coupler component; a methine dye such as, for example, a benzylidene dye or a monomethineoxonol dye; a quinone-based dye such as, for example, a naphthoquinone dye or an anthraquinone dye, and examples of the other dyes include a quinophthalone dye, nitro and nitroso dyes, an acridine dye, an acridinone dye and the like.

As an applicable magenta dye, any dye may be used. Examples thereof include an aryl or heterylazo dye having, for example, phenols, naphthols, anilines and the like as the coupler component; an azomethine dye having, for example, pyrazolones, pyrazolotriazoles and the like as the coupler component; a methine dye such as, for example, an arylidene dye, a styryl dye, a melocyanine dye, a cyanine dye and an oxonol dye; a carbonium dye such as a diphenylmethane dye, a triphenylmethane dye and a xanthene dye; an quinone dye such as, for example, naphthoquinone, anthraquinone and anthrapyridone; and a condensated polycyclic dye such as, for example, a dioxazine dye, and the like.

As an applicable cyan dye, any dye may be used. Examples thereof include an aryl or heterylazo dye having, for example, phenols, naphthols, anilines and the like as the coupler component; an azomethine dye having heterocyclic rings and the like such as, for example, phenols, naphthols and pyrrolotriazole as the coupler component; a polymethine dye such as a cyanine dye, an oxonol dye and a melocyanine dye; a carbonium dye such as a diphenylmethane dye, a triphenylmethane dye and a xanthene dye; a phthalocyanine dye; an anthraquinone dye; indigo and thioindigo dyes and the like.

Each dye as described above may be a dye that exhibits each color of yellow, magenta and cyan only after a part of the chromophore is dissociated, and in that case, the counter cation may be an inorganic cation such as an alkali metal or ammonium, and an organic cation such pyridinium and a quaternary ammonium salt, and furthermore may be a polymer cation having these compounds in the partial structure thereof.

Examples of an applicable black material include a dispersing element of carbon black in addition to disazo, trisazo and tetraazo dyes.

The ink composition of the present invention may be used in recording methods such as printing, copying, marking, writing, drafting and stamping, and is particularly suitable for use in the inkjet recording method.

[Inkjet Recording Method]

The present invention also relates to an inkjet recording method of forming an image by using the coloring composition or ink for inkjet recording of the present invention.

The inkjet recording method of the present invention donates energy to the ink for inkjet recording, and forms an image on publicly known image-receiving materials, that is, plain paper, resin-coated paper, exclusive inkjet paper described in, for example, Japanese Patent Application Laid-Open Nos. H8-169172, H8-27693, H2-276670, H7-276789, H9-323475, S62-238783, H10-153989, H10-217473, H10-235995, H10-337947, H10-217597 and H10-337947, and the like, a film, electrophotographic common paper, fabric, glass, metal, ceramics and the like.

When an image is formed, a polymer particle dispersion (also referred to as a polymer latex) may be used in combination for the purpose of imparting glossiness or water resistance or improving weather resistance. A time point when a polymer latex is imparted to an image-receiving material may be before and after a coloring agent is imparted, or a simultaneous time point, and accordingly, a place where the polymer latex is added thereto may also be in the image-receiving paper or in an ink, or the polymer latex may be used alone as a liquid material. Specifically, it is possible to preferably use the methods described in each specification of Japanese Patent Application Nos. 2000-363090, 2000-315231, 2000-354380, 2000-343944, 2000-268952, 2000-299465 and 2000-297365.

Hereinafter, the recording paper and the recording film used to perform inkjet printing by using the ink of the present invention will be described.

In the recording paper and the recording film, a support is formed of a chemical pulp such as LBKP and NBKP, a mechanical pulp such as GP, PGW, RMP, TMP, CTMP, CMP and CGP, a used-paper pulp such as DIP, and the like, and if necessary, it is possible to use a support manufactured by various devices such as a Fourdrinier paper machine and a cylinder paper machine by mixing additives, such as a pigment, a binder, a sizing agent, a fixing agent, a cationic agent and a paper strengthening agent, which are publicly known in the related art. In addition to the aforementioned support, any matter of a synthetic paper and a plastic film sheet may be used, and it is preferred that the thickness of the support is 10 to 250 m and the basis weight thereof is 10 to 250 g/m$^2$.

An ink absorbing layer and a backcoat layer may be formed on the support as it is, or after a size press or an anchor coat layer is formed by starch, polyvinyl alcohol and the like, the ink absorbing layer and the backcoat layer may be formed. Further, the support may be subjected to planarization treatment by a calendar device such as a machine calendar, a TG calendar, or a soft calendar. In the present invention, paper and plastic films in which polyolefins (for example, polyethylene, polystyrene, polyethylene terephthalate, polybutene and a copolymer thereof) are laminated on both surfaces thereof are more preferably used as the support.

It is preferred that a white pigment (for example, titanium oxide and zinc oxide) or a tinting dye (for example, cobalt blue, ultramarine blue and neodymium oxide) is added to polyolefins.

A pigment or an aqueous binder is contained in an ink absorbing layer to be formed on a support. As the pigment, a white pigment is preferred, and examples of the white pigment include a white inorganic pigment such as calcium carbonate, kaolin, talc, clay, diatomite, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate, an organic pigment such as a styrene-based pigment, an acrylic pigment, a urea resin and a melamine resin, and the like. As the white pigment contained in the ink absorbing layer, a porous inorganic pigment is preferred, and a synthetic amorphous silica having a large pore area and the like are particularly suitable. As the synthetic amorphous silica, it is possible to use either a silicic acid anhydride obtained by a dry production method or a water-containing silicic acid obtained by a wet production method, but it is particularly preferred that a water-containing silicic acid is used.

The aqueous binder contained in the ink absorbing layer may be a water-soluble polymer such as polyvinyl alcohol, silanol-modified polyvinyl alcohol, starch, cationic starch, casein, gelatin, carboxymethyl cellulose, hydroxyethyl cellulose, polyvinylpyrrolidone, polyalkylene oxide, or a polyalkylene oxide derivative, a water-dispersible polymer such as a styrenebutadiene latex or an acryl emulsion, and the like. These aqueous binders may be used either alone or two or more thereof in combination. In the present invention, among the aqueous binders, polyvinyl alcohol or silanol-modified polyvinyl alcohol is particularly suitable from the viewpoint of an attachment property to the pigment and peeling resistance of an ink absorbing layer.

The ink absorbing layer may contain a mordant, a water-resistant agent, a light fastness enhancer, a surfactant and other additives in addition to the pigment and the aqueous binder.

It is preferred that the mordant added to the ink absorbing layer is immobilized. To this end, a polymer-mordant is preferably used.

The polymer-mordant is described in Japanese Patent Application Laid-Open Nos. S48-28325, S54-74430, S54-124726, S55-22766, S55-142339, S60-23850, S60-23851, S60-23852, S60-23853, S60-57836, S60-60643, S60-118834, S60-122940, S60-122941, S60-122942, and S60-235134, and H1-161236, and each specification of U.S. Pat. Nos. 2,484,430, 2,548,564, 3,148,061, 3,309,690, 4,115,124, 4,124,386, 4,193,800, 4,273,853, 4,282,305, and 4,450,224. An image-receiving material including the polymer-mordant described on pages 212 to 215 of Japanese Patent Application Laid-Open No. H1-161236 is particularly preferred. When the polymer-mordant described in the same document is used, an image having excellent image quality may be obtained, and light fastness of the image is also improved.

The water-resistant agent is effective for making the image water-resistant, and as the water-resistant agent, a cationic resin is particularly preferred. Examples of the cationic resin include polyamide polyamine epichlorohydrin, polyethyleneimine, polyaminesulfone, a dimethyldiallyl ammonium chloride polymer, cationic polyacrylamide, colloidal silica and the like, and among these cationic resins, polyamide polyamine epichlorohydrin is particularly suitable. The content of the cation resin is preferably 1 to 15% by mass and particularly preferably 3 to 10% by mass based on the total solid content of the ink absorbing layer.

Examples of the light fastness enhancer include zinc sulfate, zinc oxide, hindered amine-based antioxidants, benzotriazole-based ultraviolet absorbents such as benzophenone, and the like. Among them, zinc sulfate is particularly suitable.

The surfactant functions as a coating aid, a peeling improving agent, a slipping improving agent, or an antistatic agent. The surfactant is described in Japanese Patent Application Laid-Open Nos. S62-173463 and S62-183457. An organic fluoro compound may be used instead of the surfactant. It is preferred that the organic fluoro compound is hydrophobic. Examples of the organic fluoro compound include a fluorine-based surfactant, an oil type fluorine-based compound (for example, fluorine oil), and a solid type fluorine compound resin (for example, a tetrafluoro ethylene resin). The organic fluoro compound is described in Japanese Patent Publication No. S57-9053 (8th to 17th columns), and Japanese Patent Application Laid-Open Nos. S61-20994 and S62-135826. Examples of other additives added to the ink absorbing layer include a pigment dispersant, a thickener, a defoaming agent, a dye, a fluorescent brightening agent, an antiseptic, a pH adjusting agent, a matting agent, a film hardening agent and the like. Meanwhile, the ink absorbing layer may have one layer or two layers.

A backcoat layer may also be formed onto the recording paper and the recording film, and examples of the component that may be added to the layer include a white pigment, an aqueous binder, and other components. Examples of the white pigment contained in the backcoat layer include a white inorganic pigment such as precipitated calcium carbonate light, calcium carbonate heavy, kaolin, talc, calcium sulfate, barium sulfate, titanium dioxide, zinc oxide, zinc sulfide, zinc carbonate, satin white, aluminum silicate, diatomite, calcium silicate, magnesium silicate, synthetic amorphous silica, colloidal silica, colloidal alumina, pseudoboehmite, aluminum hydroxide, alumina, lithopone, zeolite, hydrated halloysite, magnesium carbonate and magnesium hydroxide, an organic pigment such as a styrene-based plastic pigment, an acrylic plastic pigment, polyethylene, microcapsules, a urea resin and a melamine resin, and the like.

Examples of the aqueous binder contained in the backcoat layer include a water-soluble polymer such as a styrene/maleate copolymer, a styrene/acrylate copolymer, polyvinyl alcohol, silanol-modified polyvinyl alcohol, starch, cationic starch, casein, gelatin, carboxymethyl cellulose, hydroxyethyl cellulose and polyvinylpyrrolidone, a water-dispersible polymer such as a styrenebutadiene latex or an acryl emulsion, and the like. Examples of the other components contained in the backcoat layer include a defoaming agent, a foam inhibitor, a dye, a fluorescent brightening agent, an antiseptic, a water-resistant agent and the like.

A polymer latex may be added to the constituent layer (including the backcoat layer) of the inkjet recording paper and the recording film. The polymer latex is used for the purpose of improving physical properties, such as dimensional stabilization, curling prevention, adherence prevention, and crack prevention of the film. The polymer latex is described in Japanese Patent Application Laid-Open Nos. S62-245258, S62-136648, and S62-110066. When a polymer latex having a low glass transition temperature (40° C. or less) is added to a layer including the mordant, cracks or curling of the layer may be prevented. Furthermore, even though a polymer latex having a high glass transition temperature is added to the backcoat layer, curling may be prevented.

The ink of the present invention has no limitation on the recording system of the inkjet, and is used in a known system, for example, a charge control system of discharging an ink using an electrostatic attraction force, a drop-on-demand system (pressure pulse system) using the oscillating pressure of a piezoelectric element, an acoustic inkjet system of discharging ink by converting electrical signals into acoustic beams to irradiate the acoustic beams on the ink and using radiation pressure, a thermal inkjet system of using pressure produced by heating ink to form bubbles, and the like. Examples of the inkjet recording system include a system of injecting a number of small volumes of ink with low concentration, which is called photo ink, a system of improving image quality using a plurality of inks having substantially the same color and different concentrations, or a system of using colorless and transparent ink.

EXAMPLES

Hereinafter, the present invention will be described in detail with reference to Examples, but the present invention is not limited to the Examples. Unless otherwise indicated, "%" and "parts" in the Examples are % by mass and parts by mass. In addition, Examples 115, 213 and 312 shall be deemed to be replaced with "Reference Example".

Synthesis Example

Synthesis of Compound (1A)

At the time point when 60 g of chlorosulfonic acid (manufactured by AKROS Co., Ltd.) and 6.2 g of phosphorus oxychloride (manufactured by Fisher Co., Ltd.) were added to a 150 ml 3-necked flask and the resulting mixture were stirred at room temperature, 9.54 g of Acid Red 289 (manufactured by Chugai Kasei Co., Ltd., CHUGAI AMINOL FAST PINKR) was cautiously added thereto, and then the resulting mixture was warmed to 70° C. to react the mixture for 1 hour. The reaction mixture was cooled to room temperature and quenched with 300 g of iced water, and precipitated crystal was separated by filtration and washed with a cold saturated brine solution. The crystals obtained were dispersed in 150 mL of water, and 2 mol/L of sodium hydroxide was used to continuously add dropwise the resulting dispersion until the pH becomes constant as 9.0. At the time point when the change in pH was disappeared, the pH was adjusted to 8.5 by using 0.2 mol/L of diluted hydrochloric acid, desalting was performed by using a dialysis tube, dust was filtered off with a GF/F filter (manufactured by WATT MANN CO., LTD.) and dried at 60° C. by a fan dryer to obtain 6 g of a green gloss crystal. The absorption maximum wavelength in the dilute aqueous solution was 529 nm. By the LC-MS spectrum measured under the following conditions, three components were observed by maintaining the resulting crystal for 7.12 minutes, 8.32 minutes and 10.08 minutes, and the molecular weights thereof were all recorded to be 894 (Posi: 895 $[M+1]^+$, Nega: 446.2 $[M-2H]^{2-}$).

(LC-MS Conditions)

| | |
|---|---|
| Column | GenesisC18 (100 × 4.6 mm) |
| Temperature | 40° C. |
| Eluent A | 10 mM ammonium acetate aqueous solution |
| Eluent B | 10 mM ammonium acetate acetonitrile/waster (90/10) solution |
| Gradient | 0 minute (B concentration 5%), 2 minutes (B concentration 5%), 25 minutes (B concentration 50%), 30 minutes (B concentration 95%), 31 minutes (B concentration 5%) and 40 minutes (B concentration 5%) |

-continued

| Flow rate | 1.0 mL/minute |
| --- | --- |
| Detection wavelength | 200 to 700 nm |
| MS (range) | 200 to 1200 |
| Injection amount | 10 μL |

The $^1$H NMR spectrum in heavy dimethyl sulfoxide of Compound (1A) is shown in FIG. 1.

The other exemplified compounds may be synthesized in accordance with the method.

Example 1

Deionized water was added to the following components to bring the total weight of the mixture to 100 g, and then the mixture was stirred for 1 hour while being heated to 30° C. to 40° C. Thereafter, preparation was performed with KOH of 10 mol/L and pH=9, and a magenta ink solution was prepared by performing filtration under reduced pressure with a micro filter having an average pore diameter of 0.25 μm.

| Composition of Ink Solution 1 | |
| --- | --- |
| Dye (following compound (1A)) | 3.50 g |
| Diethylene glycol | 10.65 g |
| Gycerin | 14.70 g |
| Diethylene glycol monobutyl ether | 12.70 g |
| Triethanolamine | 0.65 g |
| OLFINE E1010 (manufactured by Nissin Chemical Industry Co., Ltd.) | 0.9 g |

Examples 2 to 7 and Comparative Example 1

The ink solutions 2 to 7 and the ink solution using C.I. Acid Red 289 (AR289) as an ink solution for comparison were adjusted by performing the preparation in the same manner as in the preparation of Ink Solution 1, except that the dyes were modified as shown in the following Table 4.

(Image Recording and Evaluation)

The inks for inkjet recording of the Examples and the Comparative Examples described above were subjected to the following evaluations. The results are shown in Table 4.

Meanwhile, in Table 4, hue, ozone resistance and light fastness were evaluated after each ink for inkjet recording is used to record an image on a photo gloss paper (PM photo paper <Glossy> (KA420PSK, EPSON) manufactured by EPSON Co., Ltd.) by an inkjet printer (manufactured by EPSON Co., Ltd.; PM-700C).

<Hue>

The hue was evaluated by a three-stage rating of best, good and poor by confirming with the eyes. The evaluation results are shown in the following Table 4. In the following Table 4, A, B and C indicate that hue is the best, good and poor, respectively.

<Ozone Resistance>

In a box which was set to an ozone gas concentration of 0.5±0.1 ppm, room temperature and a dark place using a Siemens-type ozonizer to which an alternating current voltage of 5 kV was applied while passing dry air through the double glass tube thereof, the photo gloss paper having the image formed thereon was left to stand for 7 days, and the image concentration before and after standing under an ozone gas was measured by a reflection densitometer (X-Rite 310TR) and evaluated as a colorant residual ratio. Meanwhile, the reflection concentration was measured at three points of 1, 1.5 and 2.0. The ozone gas concentration in the box was set using an ozone gas monitor (Model: OZG-EM-01) manufactured by APPLICS.

The evaluation was performed in a three-stage rating by defining a colorant residual ratio of 70% or more at any concentration as A, a colorant residual ratio less than 70% at one or two points as B, and a colorant residual ratio less than 70% at all concentrations as C.

<Light Fastness>

After the image concentration Ci immediately after recording was measured, the image was irradiated with a xenon light (85,000 lux) for 7 days using a weather meter (Atlas C.165), and then the image concentration Cf was measured again and the colorant residual ratio ({(Ci−Cf)/Ci}×100%) was calculated from the difference between image concentrations before and after irradiation with the xenon light to perform evaluation. The image concentration was measured using a reflection densitometer (X-Rite 310TR).

The colorant residual ratio was measured at three points of 1, 1.5 and 2.0 in reflection concentration. The evaluation was performed in a three-stage rating by defining a colorant residual ratio of 80% or more at any concentration as A, a colorant residual ratio less than 80% at one or two points as B, and a colorant residual ratio less than 80% at all concentrations as C.

TABLE 4

| | Dye | | Light fastness | Ozone resistance | Hue |
| --- | --- | --- | --- | --- | --- |
| Example 1 | (1A) | 3.5 g | A | A | A |
| Example 2 | (1B) | 3.5 g | A | A | A |
| Example 3 | (1D) | 3.5 g | A | A | A |
| Example 4 | (1E) | 3.5 g | A | A | A |
| Example 5 | (1F) | 3.5 g | A | A | A |
| Example 6 | (1G) | 3.5 g | A | A | A |
| Example 7 | (1H) | 3.5 g | A | A | A |
| Comp. Ex. 1 | AR289 | 3.5 g | C | C | A |

As clear from the result in Table 4, it can be seen that the inks of the Examples in which the compound of the present invention is used are excellent in hue, and also have very high performance compared to the Comparative Examples in terms of ozone resistance and light fastness.

Example 101

Deionized water was added to the following components to bring the total weight of the mixture to 100 g, and then the mixture was stirred for 1 hour while being heated to 30° C. to 40° C. Thereafter, preparation was performed with KOH of 10 mol/L and pH=9, and a magenta ink solution was prepared by performing filtration under reduced pressure with a micro filter having an average pore diameter of 0.25 μm.

| Compound of Formula (11) (the following compound (1A)) | 0.5 g |
| --- | --- |
| Compound of Formula (14) (the following compound (2A)) | 3.0 g |
| Diethylene glycol | 10.65 g |
| Gycerin | 14.70 g |
| Diethylene glycol monobutyl ether | 12.70 g |
| Triethanolamine | 0.65 g |
| OLFINE E1010 (manufactured by Nissin Chemical Industry Co., Ltd.) | 0.9 g |

Examples 102 to 115 and Comparative Examples 101 and 103

Ink solutions of Examples 102 to 115 and Comparative Examples 101 to 103 were prepared by performing preparation in the same manner as in the preparation of the ink solution of Example 101, except that the dye and the dye addition amount were changed as shown in the following Table 5. As a dye for comparison, C.I. Acid Red 289 (AR289) was used.

(Image Recording and Evaluation)

The inks for inkjet recording of the Examples and the Comparative Examples described above were subjected to the following evaluations. The results are shown in Table 5.

Meanwhile, in Table 5, ozone resistance and light fastness are evaluated after each ink for inkjet recording was used to record an image on a photo gloss paper (PM photo paper <Glossy> (KA420PSK, EPSON) manufactured by EPSON Co., Ltd.) by an inkjet printer (manufactured by EPSON Co., Ltd.; PM-700C).

<Ozone Resistance>

In a box which was set to an ozone gas concentration of 5±0.1 ppm, room temperature and a dark place using a Siemens-type ozonizer to which an alternating current voltage of 5 kV was applied while passing dry air through the double glass tube thereof, the photo gloss paper having the image formed thereon was left to stand for 7 days, and the image concentration before and after standing under an ozone gas was measured by a reflection densitometer (X-Rite 310TR) and evaluated as a colorant residual ratio. Meanwhile, the reflection concentration was measured at three points of 1, 1.5 and 2.0. The ozone gas concentration in the box was set using an ozone gas monitor (Model: OZG-EM-01) manufactured by APPLICS.

The evaluation was performed in a three-stage rating by defining a colorant residual ratio of 70% or more at any concentration as A, a colorant residual ratio less than 70% at one or two points as B, and a colorant residual ratio less than 70% at all concentrations as C.

<Light Fastness>

After the image concentration Ci immediately after recording was measured, the image was irradiated with a xenon light (85,000 lux) for 7 days using a weather meter (Atlas C.165), and then the image concentration Cf was measured again and the dye residual ratio ($\{(Ci-Cf)/Ci\}\times 100\%$) was calculated from the difference between image concentrations before and after irradiation with the xenon light to perform evaluation. The image concentration was measured using a reflection densitometer (X-Rite 310TR).

The dye residual ratio was measured at three points of 1, 1.5 and 2.0 in reflection concentration. The evaluation was performed in a three-stage rating by defining a colorant residual ratio of 80% or more at any concentration as A, a colorant residual ratio less than 80% at one or two points as B, and a colorant residual ratio less than 80% at all concentrations as C.

<Hue>

The hue was evaluated by a three-stage rating of best, good and poor by confirming with the eyes. The evaluation results are shown in the following Table 5. In the following Table 5, A, B and C indicate that hue is the best, good and poor, respectively.

TABLE 5

| | Dye of Formula (11) | | Dye of Formula (14) | | Light fastness | Ozone resistance | Hue |
|---|---|---|---|---|---|---|---|
| Example 101 | 1A | 0.5 g | 2A | 3.0 g | A | A | B |
| Example 102 | 1A | 1.0 g | 2A | 2.5 g | A | A | A |
| Example 103 | 1A | 1.5 g | 2A | 2.0 g | A | A | A |
| Example 104 | 1A | 2.0 g | 2A | 1.5 g | B | A | A |

TABLE 5-continued

| | Dye of Formula (11) | | Dye of Formula (14) | | Light fastness | Ozone resistance | Hue |
|---|---|---|---|---|---|---|---|
| Example 105 | 1B | 1.0 g | 2A | 2.5 g | A | A | A |
| Example 106 | 1C | 1.0 g | 2B | 2.5 g | A | A | A |
| Example 107 | 1D | 1.0 g | 2A | 2.5 g | A | A | A |
| Example 108 | 1E | 1.0 g | 2B | 2.5 g | A | A | A |
| Example 109 | 1F | 1.0 g | 2A | 2.5 g | A | A | A |
| Example 110 | 1G | 1.0 g | 2B | 2.5 g | A | A | A |
| Example 111 | 1H | 1.0 g | 2A | 2.5 g | A | A | A |
| Example 112 | 1A | 1.0 g | 2C | 2.5 g | A | A | A |
| Example 113 | 1B | 1.0 g | 2C | 2.5 g | A | A | A |
| Example 114 | 1C | 1.0 g | 2C | 2.5 g | A | A | A |
| Example 115 | 1I | 1.0 g | 2A | 2.5 g | B | B | A |
| Comparative. Example. 101 | — | — | 2A | 3.5 g | A | A | C |
| Comparative. Example 102 | AR289 | 3.5 g | — | — | C | C | A |
| Comparative Example 103 | AR289 | 1.5 g | 2A | 2.0 g | C | C | A |

As clear from the result in Table 5, it can be seen that the inks of the Examples in which the coloring composition of the present invention is used have very high performance in terms of ozone resistance, light fastness and hue compared to the inks of the Comparative Examples.

Example 201

Deionized water was added to the following components to bring the total weight of the mixture to 100 g, and then the mixture was stirred for 1 hour while being heated to 30° C. to 40° C. Thereafter, preparation was performed with KOH of 10 mol/L and pH=9, and a magenta ink solution was prepared by performing filtration under reduced pressure with a micro filter having an average pore diameter of 0.25 μm.

| | |
|---|---|
| Compound of Formula (11) (the following compound (1A)) | 0.5 g |
| Compound of Formula (24) (the following compound (4A)) | 3.0 g |
| Diethylene glycol | 10.65 g |
| Gycerin | 14.70 g |
| Diethylene glycol monobutyl ether | 12.70 g |
| Triethanolamine | 0.65 g |
| OLFINE E1010 (manufactured by Nissin Chemical Industry Co., Ltd.) | 0.9 g |

Examples 202 to 217 and Comparative Examples 201 and 204

Ink solutions of Examples 202 to 217 and Comparative Examples 202 to 204 were prepared by performing preparation in the same manner as in the preparation of the ink solution of Example 201, except that the dye and the dye addition amount were changed as shown in the following Table 6. As a dye for comparison, C.I. Acid Red 289 (AR289) was used.

The following compound (4A), (4B) and (4C) were synthesized with reference to Japanese Patent Application Laid-Open No. 2003-192930.

The following compounds (5A), (5B) and (5C) were synthesized with reference to International Publication No. 04/104108.

(Image Recording and Evaluation)

The inks for inkjet recording of the Examples and the Comparative Examples described above are subjected to the following evaluations. The results are shown in Table 6.

Meanwhile, in Table 6, ozone resistance, light fastness and moisture resistance were evaluated after each ink for inkjet recording was used to record an image on a photo gloss paper (PM photo paper <Glossy> (KA420PSK, EPSON) manufactured by EPSON Co., Ltd.) by an inkjet printer (manufactured by EPSON Co., Ltd.; PM-700C). Print concentration was evaluated after each ink for inkjet recording was used to record an image on a plain paper (plain paper (GF500, Canon) manufactured by Canon, Inc.) by an inkjet printer (manufactured by EPSON Co., Ltd.; PM-700C).

<Ozone Resistance>

In a box which was set to an ozone gas concentration of 5±0.1 ppm, room temperature and a dark place using a Siemens-type ozonizer to which an alternating current voltage of 5 kV was applied while passing dry air through the double glass tube thereof, the photo gloss paper having the image formed thereon was left to stand for 7 days, and the image concentration before and after standing under an ozone gas was measured by a reflection densitometer (X-Rite 310TR) and evaluated as a dye residual ratio. Meanwhile, the reflection concentration was measured at three points of 1, 1.5 and 2.0. The ozone gas concentration in the box was set using an ozone gas monitor (Model: OZG-EM-01) manufactured by APPLICS.

The evaluation was performed in a three-stage rating by defining a colorant residual ratio of 70% or more at any concentration as A, a colorant residual ratio less than 70% at one or two points as B, and a colorant residual ratio less than 70% at all concentrations as C.

residual ratio of 80% or more at any concentration as A, a colorant residual ratio less than 80% at one or two points as B, and a colorant residual ratio less than 80% at all concentrations as C.

<Moisture Resistance>

During an inkjet recording, a check pattern (pattern obtained by alternately combining regular squares having a 1.5 mm angle at concentrations of 100% and 0%) was prepared, and a printed matter with a check pattern of magenta-white which was high in contrast was obtained. After printing, the printed matter with a check pattern, which had been dried for 24 hours, was left to stand under conditions of 80° C. and 70% RH for 3 days, and the degree of blurring from a colored portion to a white portion was evaluated by confirming with the eyes to perform evaluation by a three-stage rating in which A was the case where blurring rarely occurred, B was the case where blurring slightly occurred, and C was the case where blurring clearly occurred.

<Print Concentration>

The reflection concentration scaled to 100% in print concentration was measured using an image concentration with a reflection densitometer (X-Rite 310TR), and the evaluation was performed in a three-stage rating by defining a print concentration of 2.2 or more as A, a print concentration of 2.0 or more and less than 2.2 as B, and a print concentration less than 2.0 as C.

TABLE 6

|  | Dye of Formula (11) |  | Dyes of Formulae (24) and (25) |  | Light fastness | Ozone resistance | Print concentration | Moisture resistance |
|---|---|---|---|---|---|---|---|---|
| Example 201 | 1A | 0.5 g | 4A | 3.0 g | A | A | B | A |
| Example 202 | 1A | 1.0 g | 4A | 2.5 g | A | A | A | A |
| Example 203 | 1A | 1.5 g | 4A | 2.0 g | A | A | A | A |
| Example 204 | 1A | 2.0 g | 4A | 1.5 g | B | A | A | B |
| Example 205 | 1A | 1.5 g | 5A | 2.0 g | A | A | A | A |
| Example 206 | 1B | 1.0 g | 4A | 2.5 g | A | A | A | A |
| Example 207 | 1C | 1.0 g | 5A | 2.5 g | A | A | A | A |
| Example 208 | 1D | 1.0 g | 4A | 2.5 g | A | A | A | A |
| Example 209 | 1E | 1.0 g | 5A | 2.5 g | A | A | A | A |
| Example 210 | 1F | 1.0 g | 4A | 2.5 g | A | A | A | A |
| Example 211 | 1G | 1.0 g | 5A | 2.5 g | A | A | A | A |
| Example 212 | 1H | 1.0 g | 4A | 2.5 g | A | A | A | A |
| Example 213 | 1I | 1.5 g | 5A | 2.0 g | B | B | A | B |
| Example 214 | 1A | 1.0 g | 4B | 2.2 g | A | A | A | A |
| Example 215 | 1A | 1.5 g | 4C | 1.5 g | A | A | A | A |
| Example 216 | 1A | 1.0 g | 5B | 4.5 g | A | A | A | A |
| Example 217 | 1H | 1.0 g | 5C | 4.0 g | A | A | A | A |
| Comparative. Example 201 | — | — | 5A | 3.5 g | A | A | C | A |
| Comparative. Example 202 | — | — | 4A | 3.5 g | A | A | C | A |
| Comparative Example 203 | AR289 | 3.5 g | — | — | C | C | A | C |
| Comparative Example 204 | AR289 | 1.5 g | 5A | 2.0 g | B | C | A | B |

<Light Fastness>

After the image concentration Ci immediately after recording was measured, the image was irradiated with a xenon light (85,000 lux) for 7 days using a weather meter (Atlas C.165), and then the image concentration Cf was measured again and the dye residual ratio ({(Ci−Cf)/Ci}×100%) was calculated from the difference between image concentrations before and after irradiation with the xenon light to perform evaluation. The image concentration was measured using a reflection densitometer (X-Rite 310TR).

The dye residual ratio was measured at three points of 1, 1.5 and 2.0 in reflection concentration. The evaluation was performed in a three-stage rating by defining a colorant As clear from the result in Table 6, it can be seen that the inks of the Examples in which the coloring composition of the present invention is used have very high performance in terms of ozone resistance, light fastness, moisture resistance and print concentration compared to the inks of the Comparative Examples.

Example 301

Deionized water was added to the following components to bring the total weight of the mixture to 100 g, and then the mixture was stirred for 1 hour while being heated to 30° C. to 40° C. Thereafter, preparation was performed with KOH of 10 mol/L and pH=9, and a magenta ink solution was prepared by performing filtration under reduced pressure with a micro filter having an average pore diameter of 0.25 μm.

| | |
|---|---|
| Compound of Formula (11) (the following compound (1A)) | 0.5 g |
| Compound of Formula (34) (the following compound (32A)) | 3.0 g |
| Diethylene glycol | 10.65 g |
| Glycerin | 14.70 g |
| Diethylene glycol monobutyl ether | 12.70 g |
| Triethanolamine | 0.65 g |
| OLFINE E1010 (manufactured by Nissin Chemical Industry Co., Ltd.) | 0.9 g |

Examples 302 to 314 and Comparative Examples 301 to 303

Ink solutions of Examples 302 to 314 and Comparative Examples 301 to 303 were prepared by performing preparation in the same manner as in the preparation of the ink solution of Example 301, except that the dye and the dye addition amount were changed as shown in the following Table 7. As a dye for comparison, C.I. Acid Red 289 (AR289) was used.

The following compounds (32A), (32B) and (32C) were synthesized with reference to Japanese Patent Application Laid-Open No. H8-73791.

(Image Recording and Evaluation)

The inks for inkjet recording of the Examples and the Comparative Examples described above were subjected to the following evaluations. The results are shown in Table 7.

Meanwhile, in Table 7, moisture resistance, chroma, hue angle and ozone resistance were evaluated after each ink for inkjet recording was used to record an image on a photo gloss paper (PM photo paper <Glossy> (KA420PSK, EPSON) manufactured by EPSON Co., Ltd.) by an inkjet printer (manufactured by EPSON Co., Ltd.; PM-700C).

<Moisture Resistance>

During an inkjet recording, a check pattern (pattern obtained by alternately combining regular squares having a 1.5 mm angle at concentrations of 100% and 0%) was prepared, and a printed matter with a check pattern of magenta-white which was high in contrast was obtained. After printing, the printed matter with a check pattern, which had been dried for 24 hours, was left to stand under conditions of 80° C. and 70% RH for 3 days, and the degree of blurring from a colored portion to a white portion was evaluated by confirming with the eyes to perform evaluation by a three-stage rating in which A was the case where blurring rarely occurred, B was the case where blurring slightly occurred, and C was the case where blurring clearly occurred.

Each recorded matter obtained by the method described above was subjected to the following evaluations by measuring the L*, a* and b* in the L*a*b* color system defined by CIE (International Commission on Illumination) for an image portion having a recording duty of 100% with a reflection densitometer Spectrolino (manufactured by Gretag-Macbeth AG) under the conditions of a light source: D50 and a visual field: 2 degrees.

(Evaluation of Chroma)

The chroma (c*) of the recorded matter was subjected to the following evaluation by performing calculation by the following Equation based on the measured values of color characteristics.

For an image portion having a recording duty of 100% in the recorded matter (gloss paper) obtained above, the values of L*, a* and b* were measured. From the values of L*, a* and b* obtained, the evaluation was performed by obtaining the chroma (c*) based on the following equation.

$$\text{Chroma}(c^*) = \sqrt{a^{*2} + b^{*2}} \qquad [\text{Eq. 1}]$$

A: c* is 80 or more.
B: c* is 70 or more and less than 80.
C: c* is less than 70.

<Evaluation of Hue Angle>

Further, the hue angle (h°) when a* is 75 to 80 was obtained from the result of the chroma (L*, a* and b*) according to the following equation, and evaluated.

$$\text{Hue Angle}(h°) = 360 + \tan^{-1}\frac{b^*}{a^*} \qquad [\text{Eq. 2}]$$

A: h° is 340 or more and less than 345.
B: h° is 335 or more and less than 340.
C: h° is less than 335.

It was determined that when a chroma (c*) and a hue angle (h°) of an image of each recorded matter, which are obtained as described above, are 80 or more and 340 or more and less than 345, respectively, the image having a high magenta chromogenic property may be obtained.

<Ozone Resistance>

In a box which was set to an ozone gas concentration of 2.0±0.1 ppm, room temperature and a dark place using a Siemens-type ozonizer to which an alternating current voltage of 5 kV was applied while passing dry air through the double glass tube thereof, the photo gloss paper having the image formed thereon was left to stand for 7 days, and the image concentration before and after standing under an ozone gas was measured by a reflection densitometer (X-Rite 310TR) and evaluated as a dye residual ratio. Meanwhile, the reflection concentration was measured at three points of 1, 1.5 and 2.0. The ozone gas concentration in the box was set using an ozone gas monitor (Model: OZG-EM-01) manufactured by APPLICS.

The evaluation was performed in a three-stage rating by defining a colorant residual ratio of 70% or more at any concentration as A, a colorant residual ratio less than 70% at one or two points as B, and a colorant residual ratio less than 70% at all concentrations as C.

TABLE 7

| | Dye of Formula (11) | | Dye of Formulae (34) | | Hue angle | Chroma | Moisture resistance | Ozone resistance |
|---|---|---|---|---|---|---|---|---|
| Example 301 | 1A | 0.5 g | 32A | 3.0 g | A | A | A | B |
| Example 302 | 1A | 1.0 g | 32A | 2.5 g | A | A | A | A |
| Example 303 | 1A | 1.5 g | 32A | 2.0 g | A | A | A | A |
| Example 304 | 1A | 2.0 g | 32A | 1.5 g | A | B | A | B |
| Example 305 | 1B | 1.5 g | 32A | 2.0 g | A | A | A | A |
| Example 306 | 1C | 1.5 g | 32A | 2.0 g | A | A | A | A |

TABLE 7-continued

|  | Dye of Formula (11) | | Dye of Formulae (34) | | Hue angle | Chroma | Moisture resistance | Ozone resistance |
|---|---|---|---|---|---|---|---|---|
| Example 307 | 1D | 1.5 g | 32A | 2.0 g | A | A | A | A |
| Example 308 | 1E | 1.5 g | 32A | 2.0 g | A | A | A | A |
| Example 309 | 1F | 1.5 g | 32A | 2.0 g | A | A | A | A |
| Example 310 | 1G | 1.5 g | 32A | 2.0 g | A | A | A | A |
| Example 311 | 1H | 1.5 g | 32A | 2.0 g | A | A | A | A |
| Example 312 | 1I | 1.5 g | 32A | 2.0 g | A | A | A | B |
| Example 313 | 1A | 1.2 g | 32A | 1.8 g | A | A | A | A |
| Example 314 | 1A | 1.8 g | 32A | 2.0 g | A | A | A | A |
| Comparative Example 301 | — | — | 32A | 3.5 g | C | A | C | C |
| Comparative Example 302 | AR289 | — | 32A | 2.0 g | A | B | A | C |
| Comparative Example 303 | AR289 | 3.5 g | — | — | A | C | A | C |

As clear from the result in Table 7, it can be seen that the inks of the Examples in which the coloring composition of the present invention is used have very high performance in terms of moisture resistance, ozone resistance, hue and chroma compared to the inks of the Comparative Examples.

[Chem. 70]

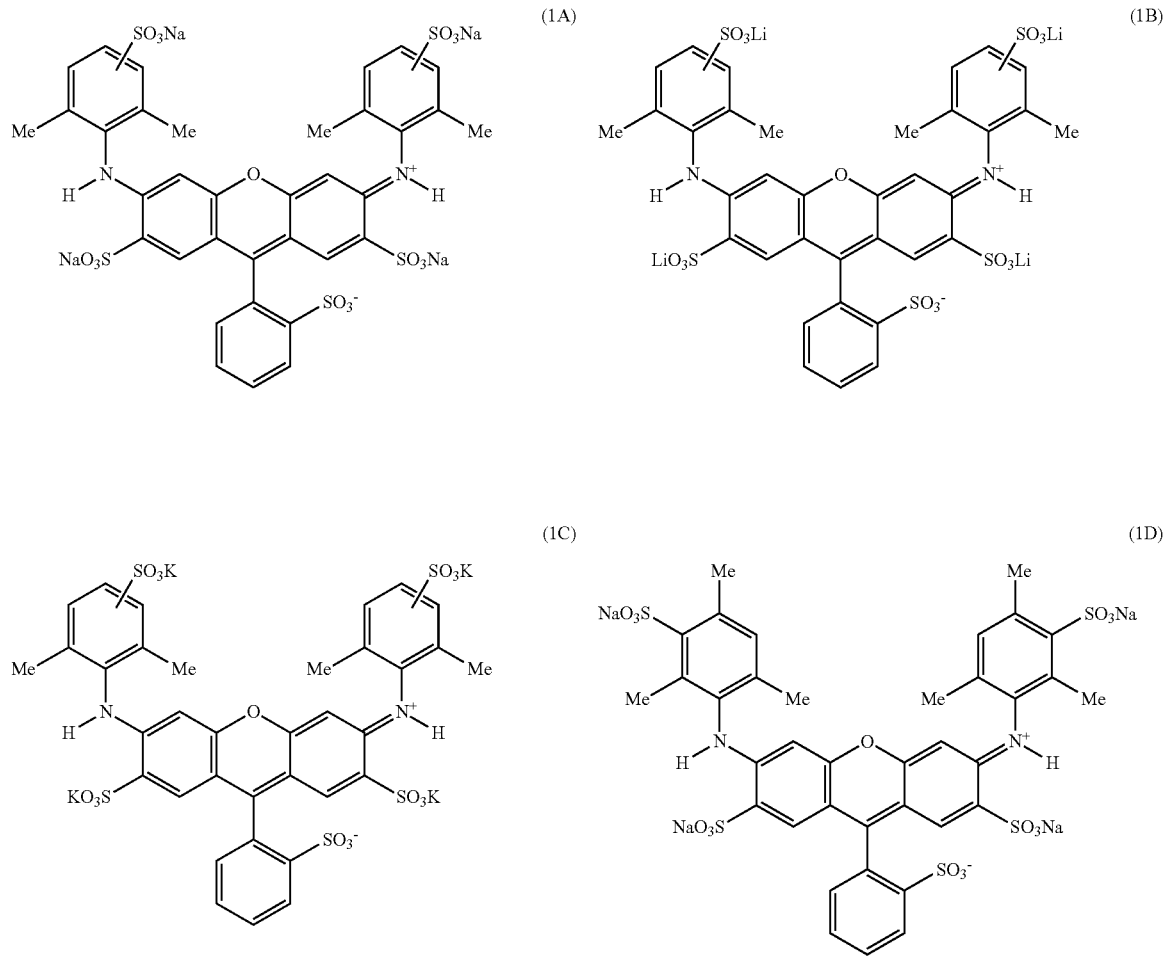

-continued
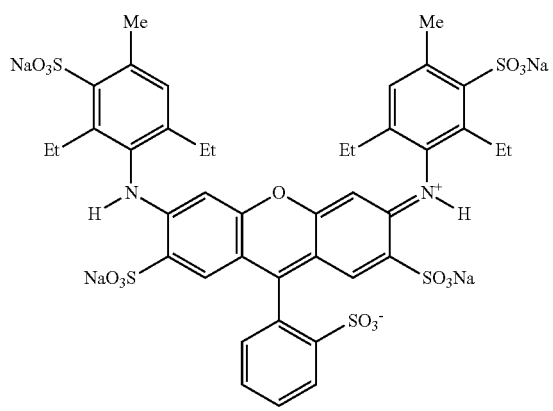
(1E)
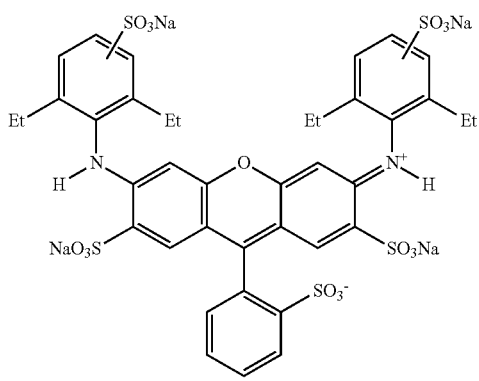
(1F)
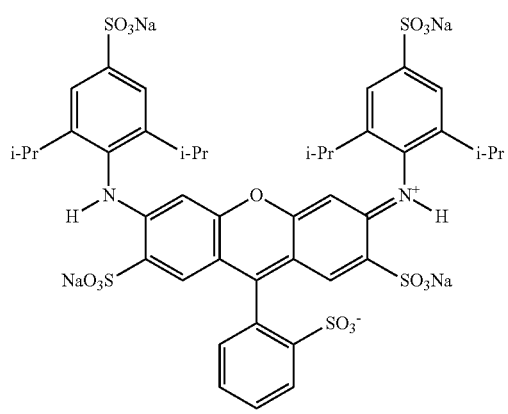
(1G)
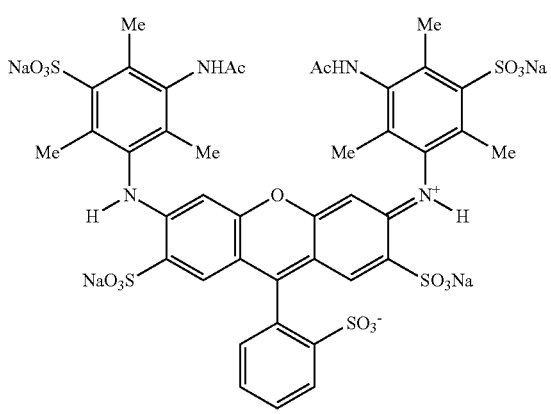
(1H)
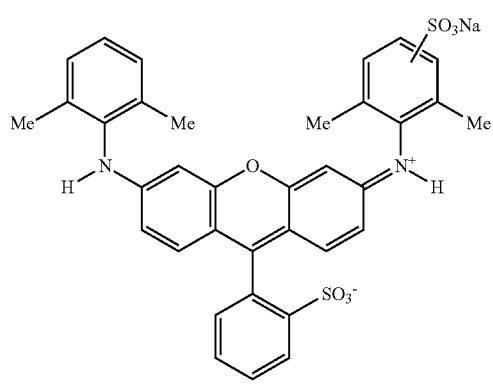
(Comparative Example, C.I. Acid Red 289)
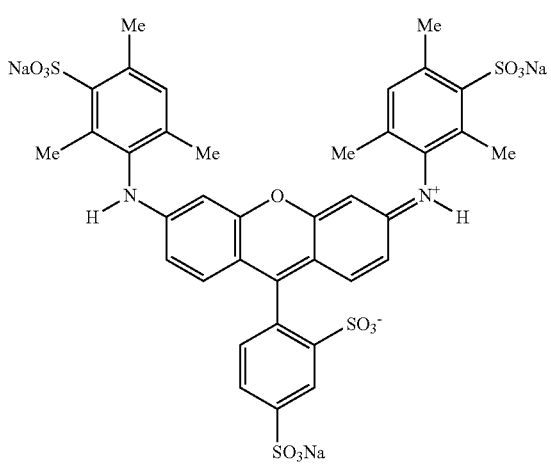
(1I)

-continued
[Chem. 71]
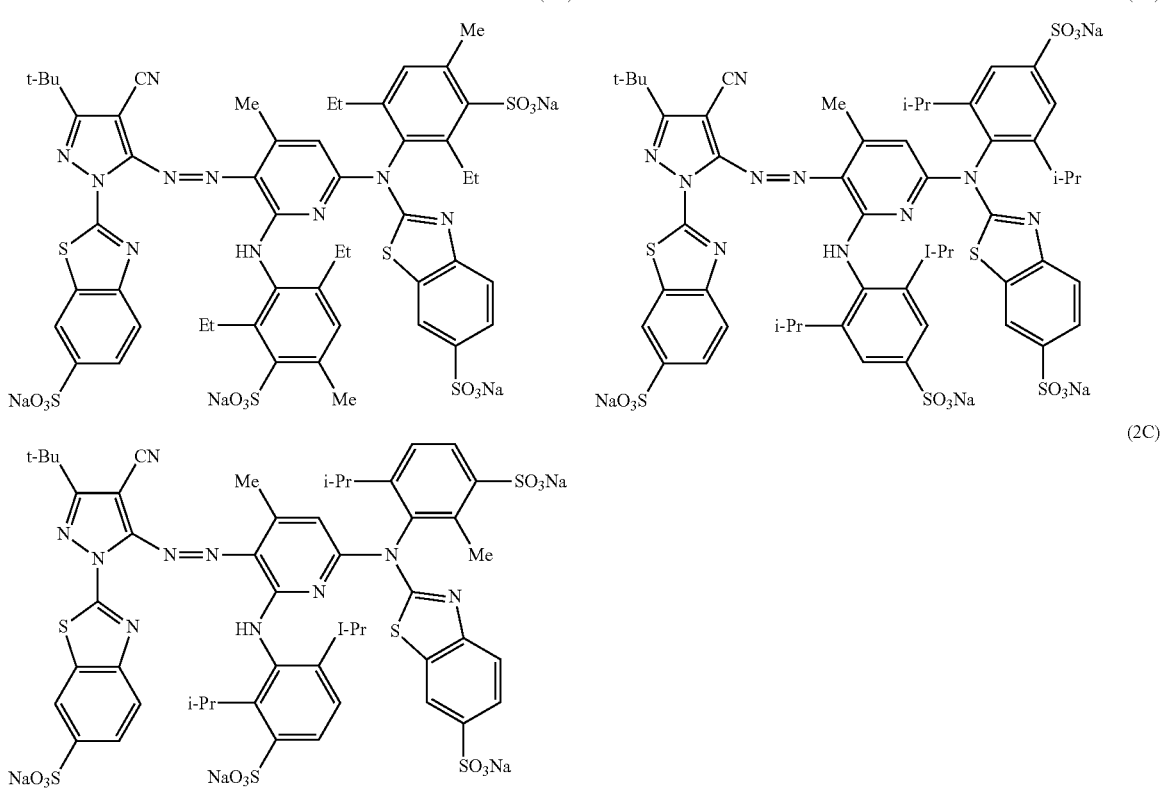
[Chem. 72]
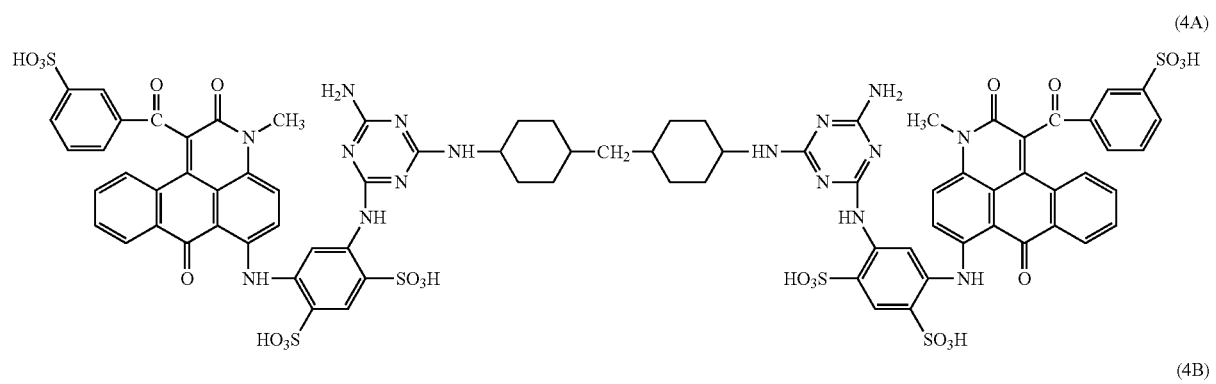
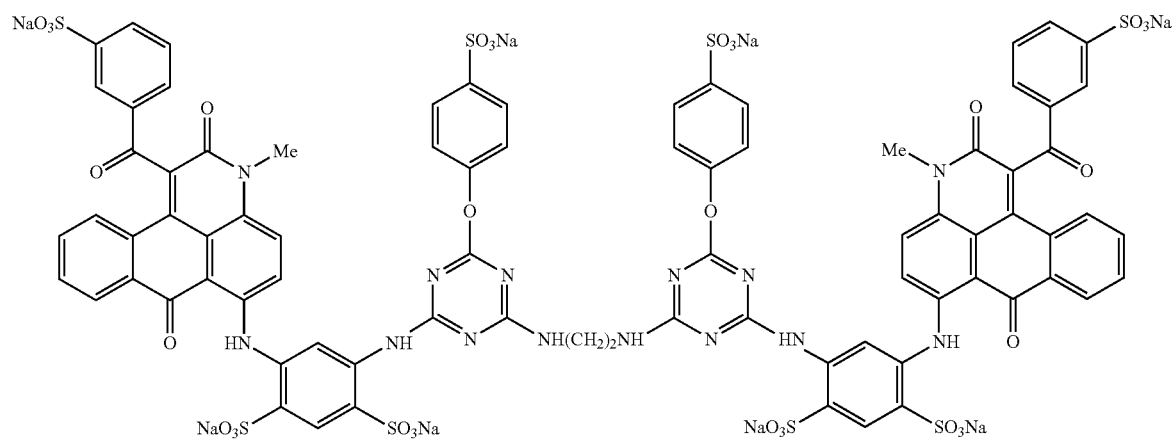

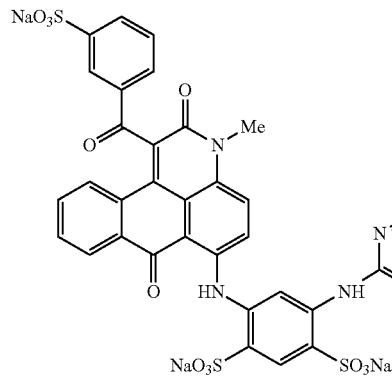
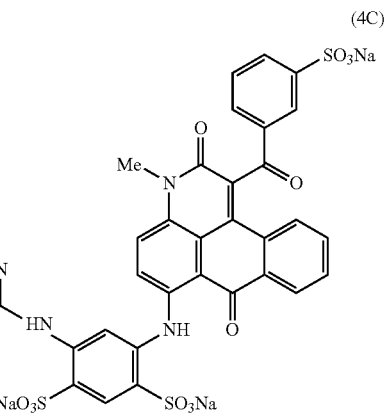
(4C)
[Chem. 73]
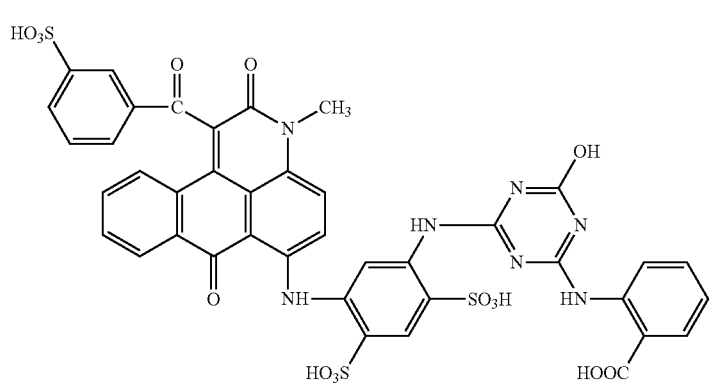
(5A)
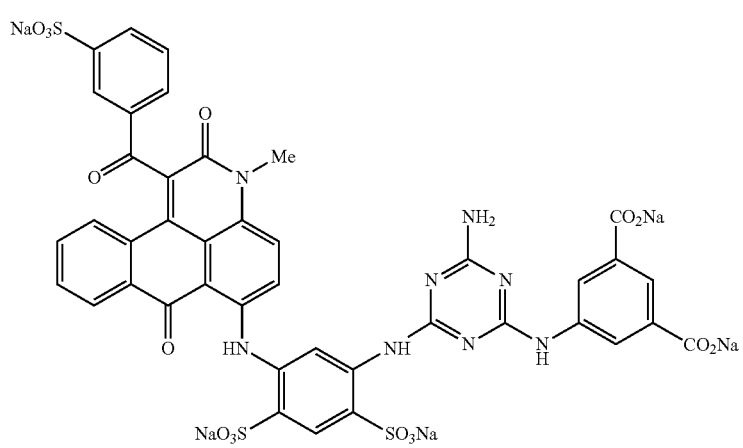
(5B)

(5C)

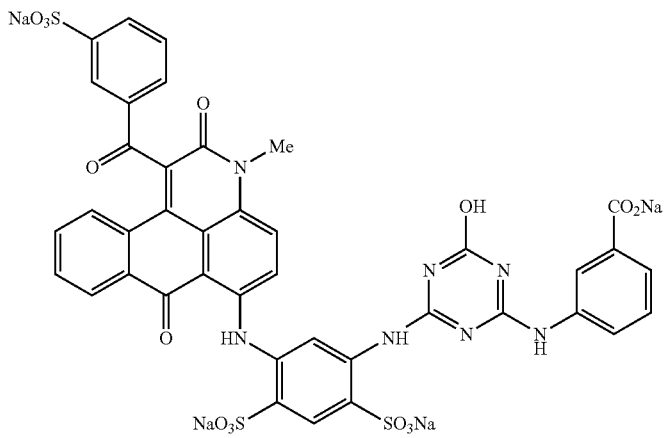

[Chem. 74]

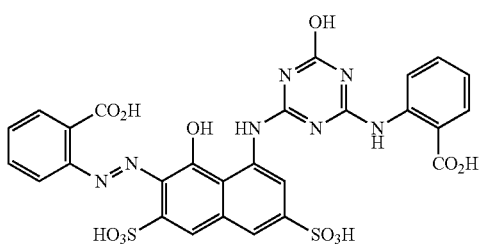
(32A)

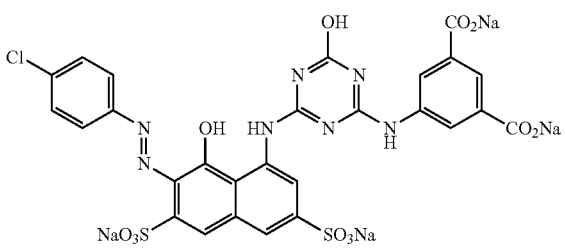
(32B)

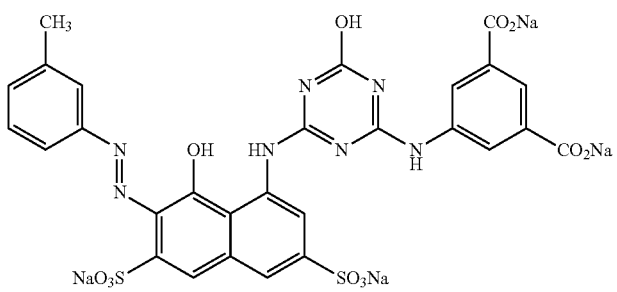
(32C)

INDUSTRIAL APPLICABILITY

The compound and the coloring composition of the present invention are useful as a colorant (particularly, a magenta dye), and may be used in a compound capable of forming an image which is excellent in ozone resistance as well as image fastness such as light fastness, moisture resistance, print concentration, saturation and hue, a coloring composition, an ink for inkjet recording and the like.

Although the present invention has been described in detail with reference to specific embodiments, it is obvious to those skilled in the art that various changes or modifications may be made without departing from the spirit and scope of the present invention.

The present application is based on Japanese Patent Application (Patent Application No. 2011-284369) filed on Dec. 26, 2011, Japanese Patent Application (Patent Application No. 2011-284370) filed on Dec. 26, 2011, Japanese Patent Application (Patent Application No. 2011-284371) filed on Dec. 26, 2011, and Japanese Patent Application (Patent Application No. 2011-284372) filed on Dec. 26, 2011, the content of which is herein incorporated by reference.

The invention claimed is:

1. A compound represented by the following Formula (3):

Formula (3)

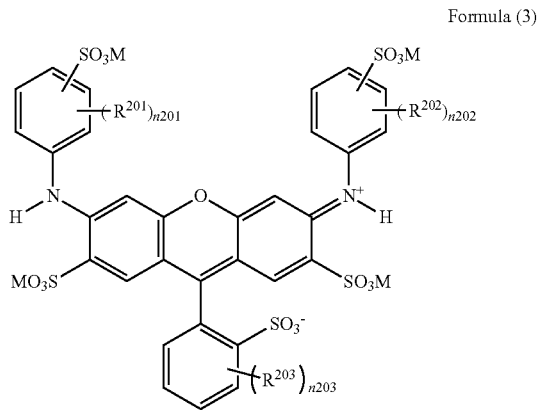

wherein in Formula (3),

R$^{201}$, R$^{202}$ and R$^{203}$ each independently represent a monovalent substituent, n201 and n202 each independently represent a number of 0 to 4, and n203 represents a number of 0 to 4, when n201, n202 and n203 each represent a number of 2 or more, a plurality of R$^{201}$'s, R$^{202}$'s and R$^{203}$'s may be the same or different, M represents a hydrogen atom or a counter cation, and M's may be the same or different.

2. The compound according to claim 1,
wherein R$^{203}$ represents a halogen atom, an aryl group, an alkoxy group, an alkyl group or an acylamino group.

3. The compound according to claim 1,
wherein R$^{201}$, R$^{202}$ and R$^{203}$ each independently represent an alkyl group or an acylamino group.

4. The compound according to claim 1,
wherein R$^{201}$, R$^{202}$ and R$^{203}$ each independently represent an alkyl group having 1 to 6 carbon atoms.

5. The compound according to claim 1,
wherein n201 and n202 each independently represent a number of 2 to 4.

6. The compound according to claim 1,
wherein n203 represents 0.

7. The compound according to claim 1,
wherein M is a lithium ion, a sodium ion or a potassium ion.

8. A coloring composition containing the compound according to claim 1.

9. A coloring composition containing the compound according to claim 1 in an amount of 1% by mass to 20% by mass.

10. A coloring composition containing:
a compound represented by the following Formula (3) and a compound represented by the following Formula (14):

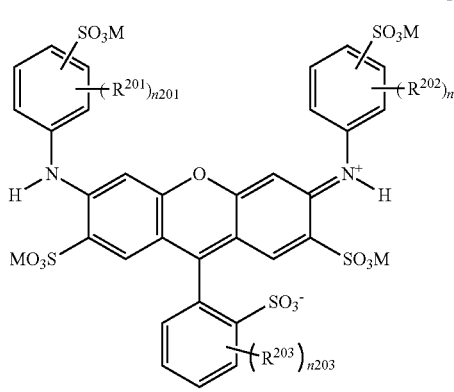

Formula (3)

wherein in Formula (3),

R$^{201}$, R$^{202}$ and R$^{203}$ each independently represent a monovalent substituent, n201 and n202 each independently represent a number of 0 to 4, n203 represents a number of 0 to 4, when n201, n202 and n203 each represent a number of 2 or more, a plurality of R$^{201}$'s, R$^{202}$'s; and R$^{203}$'s may be the same or different, M represents a hydrogen atom or a counter cation, M's may be the same or different:

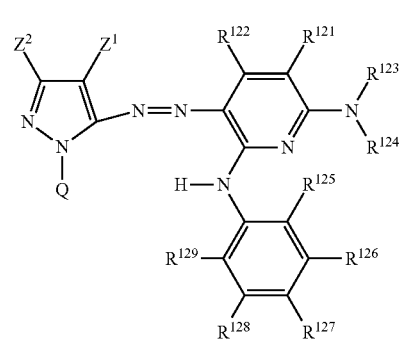

Formula (14)

in Formula (14),

Z$^1$ represents an electron-withdrawing group having a Hammett's substituent constant σp value of 0.20 or more, Z$^2$ represents a hydrogen atom, an aliphatic group, an aromatic group, an acyl group or a heterocyclic group, R$^{123}$ and R$^{124}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, provided that there is no case where both R$^{123}$ and R$^{124}$ are a hydrogen atom, R$^{121}$ and R$^{122}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an alkylamino group, an arylamino group, a heterocyclic amino group, an acylamino group, a ureido group, a sulfamoylamino group, an alkoxycarbonylamino group, an aryloxycarbonylamino group, an alkyl or arylsulfonylamino group, an aryloxycarbonylamino group, a nitro group, an alkyl or arylthio group, an alkyl or arylsulfonyl group, an alkyl or arylsulfinyl group, a sulfamoyl group, a sulfo group or a heterocyclic thio group, R$^{121}$ and R$^{123}$ or R$^{123}$ and R$^{124}$ may combine with each other to form a 5- or 6-membered ring, R$^{125}$ and R$^{129}$ each independently represent an alkyl group, an alkoxy group or a halogen atom, provided that when both R$^{125}$ and R$^{129}$ are an alkyl group, the sum of the number of carbon atoms constituting the alkyl group is 3 or more, and these groups may be further substituted, R$^{126}$, R$^{127}$ and R$^{128}$ each independently have the same meaning as R$^{121}$ and R$^{122}$, and R$^{125}$ and R$^{126}$, or R$^{128}$ and R$^{129}$ may be condensed with each other to form a ring, Q represents a hydrogen atom, an aliphatic group, an aromatic group or a heterocyclic group, each group of Z$^1$, Z$^2$, R$^{121}$, R$^{122}$, R$^{123}$, R$^{124}$ and Q may further have a substituent, provided that Formula (14) has at least one ionic hydrophilic group.

11. The coloring composition according to claim 10,
wherein the ionic hydrophilic group in Formula (14) is at least one group selected from the group consisting of a sulfo group, a carboxyl group, a phosphono group and a quaternary ammonium group.

12. The coloring composition according to claim 10, wherein in Formula (14), $R^{123}$ and $R^{124}$ each independently represent a hydrogen atom, an aromatic group or a hetero group.

13. The coloring composition according to claim 10, wherein the composition contains the compound represented by Formula (14) in an amount of 1% by mass to 10% by mass.

14. The coloring composition according to claim 10, wherein a mass ratio of the compound represented by Formula (3) to the compound represented by Formula (14) is 1/9 to 9/1.

15. A coloring composition containing:
a compound represented by the following Formula (3); and
at least one selected from the group consisting of a compound represented by the following Formula (24) and a compound represented by the following Formula (25):

Formula (3)

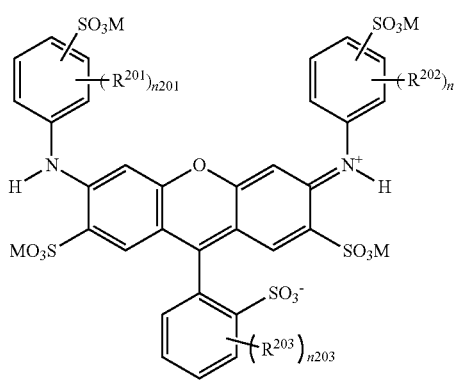

wherein in Formula (3),
$R^{201}$, $R^{202}$ and $R^{203}$ each independently represent a monovalent substituent,
n201 and n202 each independently represent a number of 0 to 4,
n203 represents a number of 0 to 4, when n201, n202 and n203 each represent a number of 2 or more, a plurality of $R^{201}$'s, $R^{202}$'s and $R^{203}$'s may be the same or different,
M represents a hydrogen atom or a counter cation, M's may be the same or different:

in Formula (24), $R_{221}$ and $R_{222}$ each independently represent a hydrogen atom or a substituted or unsubstituted alkyl group, $Y_{221}$ and $Y_{222}$ each independently represent a chlorine atom, a hydroxyl group, a substituted or unsubstituted amino group, an alkoxy group and a substituted or unsubstituted phenoxy group, $X_2$ represents a divalent linking group, $M^4$ represents a hydrogen atom or a counter cation, $M^4$'s may be the same or different:

Formula (25)

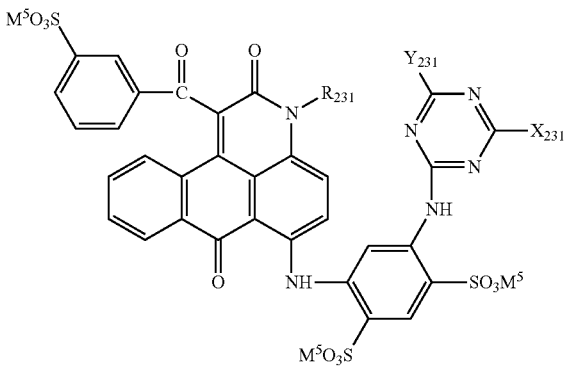

in Formula (25), $R_{231}$ represents a hydrogen atom or a substituted or unsubstituted alkyl group, $Y_{231}$ represents a chlorine atom, a hydroxyl group, a substituted or unsubstituted amino group or a morpholino group, $M^5$ represents a hydrogen atom or a counter cation, $M^5$'s may the same or different, $X_{231}$ represents a group represented by the following Formula (25-1):

Formula (24)

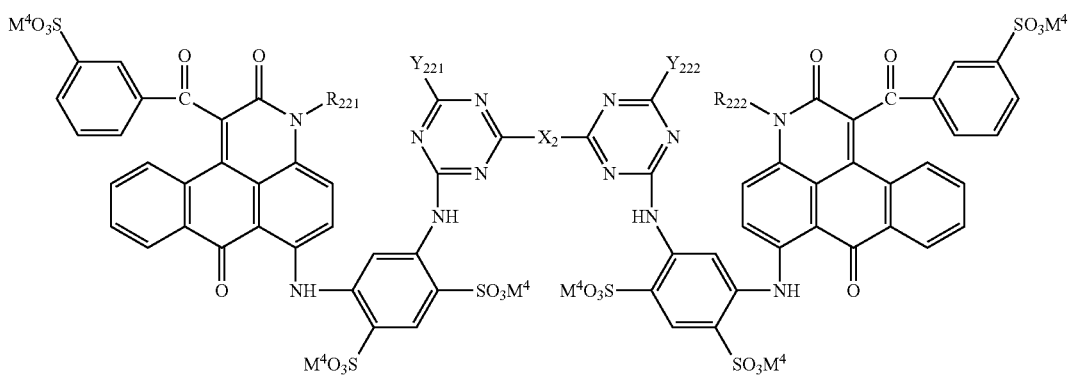

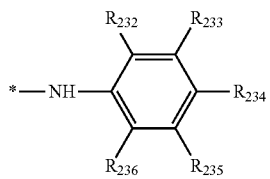

Formula (25-1)

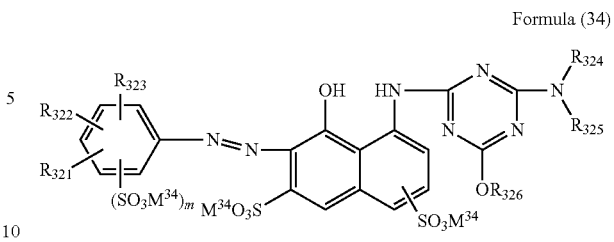

Formula (34)

in Formula (25-1), $R_{232}$, $R_{233}$, $R_{234}$, $R_{235}$ and $R_{236}$ each independently represent a hydrogen atom, an alkyl group having 1 to 8 carbon atoms or —COOM' and M' represents a hydrogen atom or a counter cation, provided that at least one of $R_{232}$, $R_{233}$, $R_{234}$, $R_{235}$ and $R_{236}$ represents an alkyl group having 1 to 8 carbon atoms or —COOM'.

16. The coloring composition according to claim 15, wherein $R_{221}$, $R_{222}$ and $R_{231}$ each independently represent a hydrogen atom or an unsubstituted alkyl group.

17. The coloring composition according to claim 15, wherein $Y_{221}$, $Y_{222}$ and $Y_{231}$ each independently represent a chlorine atom, a hydroxyl group or an unsubstituted amino group.

18. The coloring composition according to claim 15, wherein a combined content ratio of the compound represented by Formula (24) and the compound represented by Formula (25) is 1 to 20% by mass.

19. The coloring composition according to claim 15, wherein a mass ratio of a content of the compound represented by Formula (3) to a combined content of the compound represented by Formula (24) and the compound represented by Formula (25) is 9/1 to 1/9.

20. A coloring composition containing:
a compound represented by the following Formula (3); and a compound represented by the following Formula (34):

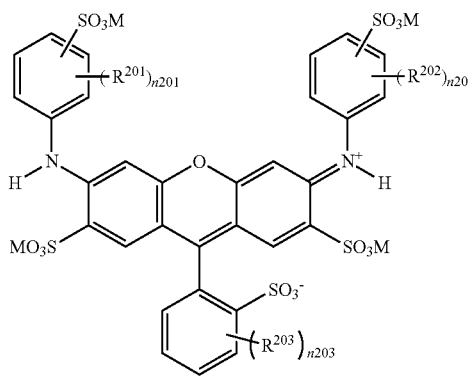

Formula (3)

wherein in Formula (3), $R^{201}$, $R^{202}$ and $R^{203}$ each independently represent a monovalent substituent, n201 and n202 each independently represent a number of 0 to 4, n203 represents a number of 0 to 4, when n201, n202 and n203 each represent a number of 2 or more, a plurality of $R^{201}$'s, $R^{202}$'s and $R^{203}$'s may be the same or different, M represents a hydrogen atom or a counter cation, M's may be the same or different:

in Formula (34), $R_{321}$, $R_{322}$ and $R_{323}$ each independently represent a hydrogen atom, a substituted or unsubstituted alkyl group having 1 to 9 carbon atoms, an alkoxy group having 1 to 9 carbon atoms, a halogen atom, a hydroxyl group, a substituted or unsubstituted carbamoyl group, a substituted or unsubstituted sulfamoyl group, a substituted or unsubstituted amino group, a nitro group, a sulfonic acid ester group, a substituted or unsubstituted alkylsulfonyl group having 1 to 9 carbon atoms, an arylsulfonyl group having 6 to 15 carbon atoms, a carboxyl group or a carboxylic acid ester group, m represents 0, 1 or 2, $R_{324}$, $R_{325}$ and $R_{326}$ each independently represent a hydrogen atom, a substituted or unsubstituted alkyl group having 1 to 18 carbon atoms, a substituted or unsubstituted alkenyl group having 2 to 18 carbon atoms, a substituted or unsubstituted aryl group, a substituted or unsubstituted aralkyl group or a substituted or unsubstituted heterocyclic group, $M^{34}$ represents a hydrogen atom or a counter cation, and $M^{34}$'s may be the same or different.

21. The coloring composition according to claim 20, wherein in Formula (34), at least one of $R_{324}$, $R_{325}$ and $R_{326}$ represents an alkyl group, an alkenyl group, an aryl group or an aralkyl group, which is substituted with 1 to 4 carboxyl groups.

22. The coloring composition according to claim 20, wherein in Formula (34), one of $R_{324}$ and $R_{325}$ represents a hydrogen group and the other represents an alkyl group, an alkenyl group, an aryl group or an aralkyl group, which is substituted with 1 to 4 carboxyl groups.

23. The coloring composition according to claim 20, wherein in Formula (34), $R_{321}$, $R_{322}$ and $R_{323}$ each independently represent a hydrogen atom, an alkyl group having 1 to 3 carbon atoms, a halogen atom or a carboxyl group.

24. The coloring composition according to claim 20, wherein in Formula (34), $R_{321}$, $R_{322}$ and $R_{323}$ each independently represent a hydrogen atom, a halogen atom or a carboxyl group.

25. The coloring composition according to claim 20, wherein a content ratio of the compound represented by Formula (34) is 1% by mass to 20% by mass.

26. The coloring composition according to claim 20, wherein a mass ratio of a content of the compound represented by Formula (3) to a content of the compound represented by Formula (34) is 9/1 to 1/9.

27. The coloring composition according to claim 10, wherein $R^{203}$ represents a halogen atom, an aryl group, an alkoxy group, an alkyl group or an acylamino group.

28. The coloring composition according to claim 10, wherein $R^{201}$, $R^{202}$ and $R^{203}$ each independently represent an alkyl group or an acylamino group.

29. The coloring composition according to claim 10, wherein $R^{201}$, $R^{202}$ and $R^{203}$ each independently represent an alkyl group having 1 to 6 carbon atoms.

30. The coloring composition according to claim 10, wherein n201 and n202 each independently represent a number of 2 to 4.

31. The coloring composition according to claim 10, wherein n203 represents 0.

32. The coloring composition according to claim 10, wherein M is a lithium ion, a sodium ion or a potassium ion.

33. The coloring composition according to claim 10, wherein a content ratio of the compound represented by Formula (3) is 1% by mass to 20% by mass.

34. An ink for inkjet recording containing the coloring composition according to claim 8.

35. An inkjet recording method which forms an image by using utilizing the coloring composition according to claim 8.

* * * * *